(12) United States Patent
Lim et al.

(10) Patent No.: US 10,303,892 B1
(45) Date of Patent: May 28, 2019

(54) VIEWING PROTECTED DOCUMENTS IN A WEB BROWSER

(71) Applicant: NextLabs, Inc., San Mateo, CA (US)

(72) Inventors: Keng Lim, Atherton, CA (US); Poon Fung, Cupertino, CA (US); Sudhindra Kumar, Jurong East (SG)

(73) Assignee: NextLabs, Inc., San Mateo, CA (US)

( * ) Notice: Subject to any disclaimer, the term of this patent is extended or adjusted under 35 U.S.C. 154(b) by 76 days.

(21) Appl. No.: 15/291,653

(22) Filed: Oct. 12, 2016

Related U.S. Application Data

(60) Provisional application No. 62/240,391, filed on Oct. 12, 2015.

(51) Int. Cl.
*G06F 21/62* (2013.01)
*G06F 17/30* (2006.01)
*H04L 29/08* (2006.01)

(52) U.S. Cl.
CPC .... *G06F 21/6218* (2013.01); *G06F 17/30011* (2013.01); *G06F 17/30864* (2013.01); *G06F 17/30896* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,130,831 B2 | 10/2006 | Howard et al. | |
| 7,171,558 B1 | 1/2007 | Mourad et al. | |
| 2003/0028801 A1 | 2/2003 | Liberman et al. | |
| 2004/0168184 A1* | 8/2004 | Steenkamp | H04N 7/163 725/31 |
| 2004/0193606 A1* | 9/2004 | Arai | G06F 21/604 |
| 2013/0219176 A1* | 8/2013 | Akella | H04L 63/0815 713/165 |
| 2013/0318589 A1* | 11/2013 | Ford | H04L 63/08 726/7 |
| 2014/0006347 A1 | 1/2014 | Qureshi et al. | |
| 2015/0310188 A1* | 10/2015 | Ford | G06F 21/10 726/28 |

* cited by examiner

*Primary Examiner* — Malcolm Cribbs
(74) *Attorney, Agent, or Firm* — Aka Chan LLP

(57) ABSTRACT

A technique and system provide protection to a protected document while being viewed on a Web browser or mobile application on a mobile device, such as a smartphone or tablet. Methods, techniques, and systems control access to protected documents and use of content in protected documents to support information management policies.

27 Claims, 31 Drawing Sheets

```
                    ┌─────────┐
                    │ Figure  │
                    │  16A    │
                    └────┬────┘
                         │
    ┌────────────────────┴────────────────────┐
    │ The content access governor produces one or more │
    │ rights granted to the user on the protected document │
    │ and optional policy obligations, wherein the one or more │
    │    rights granted does not include a copy right     │
    │                       1608                           │
    └────────────────────┬────────────────────┘
                         │
    ┌────────────────────┴────────────────────┐
    │ The content access governor returns a policy effect │
    │  ALLOW, the one or more rights granted and optional │
    │   policy obligations to the secured viewing server  │
    │                       1609                           │
    └────────────────────┬────────────────────┘
                         │
    ┌────────────────────┴────────────────────┐           Figure 16B
    │ The secured viewing server checks if the protected │
    │            document is encrypted                   │
    │                     1610                            │
    └────────────────────┬────────────────────┘
                         │
                ╱────────┴─────────╲
               ╱   Is the protected  ╲      No        ┌─────────┐
              ╱    document encrypted? ╲──────────────│ Figure  │
              ╲         1611           ╱              │  16C    │
               ╲──────────┬───────────╱               └─────────┘
                         │ Yes
    ┌────────────────────┴────────────────────┐
    │ The secured viewing server retrieves an encryption key │
    │      identifier from the protected document           │
    │                     1612                               │
    └────────────────────┬────────────────────┘
                         │
    ┌────────────────────┴────────────────────┐
    │ The secured viewing server queries the content access │
    │         governor for an encryption key                │
    │                     1613                               │
    └────────────────────┬────────────────────┘
                         │
    ┌────────────────────┴────────────────────┐
    │ The secured viewing server decrypts the protected │
    │                  document                          │
    │                   1614                              │
    └────────────────────┬────────────────────┘
                         │
```

Figure
16B

The secured viewing server converts the protected document into a format compatible with the web browser while implementing the one or more rights granted and optional policy obligations
1615

The secured viewing server constructs an HTML document to deliver the converted document while implementing the one or more rights granted and optional policy obligations, wherein the HTML document disables web browser save functions in the absence of a copy right
1616

The secured viewing server responses to the open request with the HTML document
1617

The web browser renders the HTML document with save functions disabled
1618

The user views the protected document successfully
1619

Figure 16C

```
                    ┌─────────┐
                    │ Figure  │
                    │  17A    │
                    └────┬────┘
                         │
┌────────────────────────┴────────────────────────┐
│ The content access governor returns a policy effect │
│ ALLOW and the optional first policy obligation to the │
│         secured viewing server                  │
│                   1708                          │
└────────────────────────┬────────────────────────┘
                         │
┌────────────────────────┴────────────────────────┐
│ The secured viewing server queries the content access │
│         governor on a print right               │
│                   1709                          │
└────────────────────────┬────────────────────────┘
                         │
┌────────────────────────┴────────────────────────┐
│  The content access governor evaluates a second │
│ subset of policies in a local repository to determine if │
│  the user is allowed to print the protected document │
│                   1710                          │
└────────────────────────┬────────────────────────┘
                         │
┌────────────────────────┴────────────────────────┐
│ The content access governor returns a policy effect │
│     DENY to the secured viewing server          │
│                   1711                          │
└────────────────────────┬────────────────────────┘
                         │
┌────────────────────────┴────────────────────────┐
│ The secured viewing server queries the content access │
│ governor on other rights and compiles one or more │
│   rights granted and optional policy obligations │
│                   1712                          │
└────────────────────────┬────────────────────────┘
                         │
┌────────────────────────┴────────────────────────┐
│  The secured viewing server checks if the protected │
│              document is encrypted              │
│                   1713                          │
└────────────────────────┬────────────────────────┘
                    ┌────┴────┐
                    │ Figure  │         Figure 17B
                    │  17C    │
                    └─────────┘
```

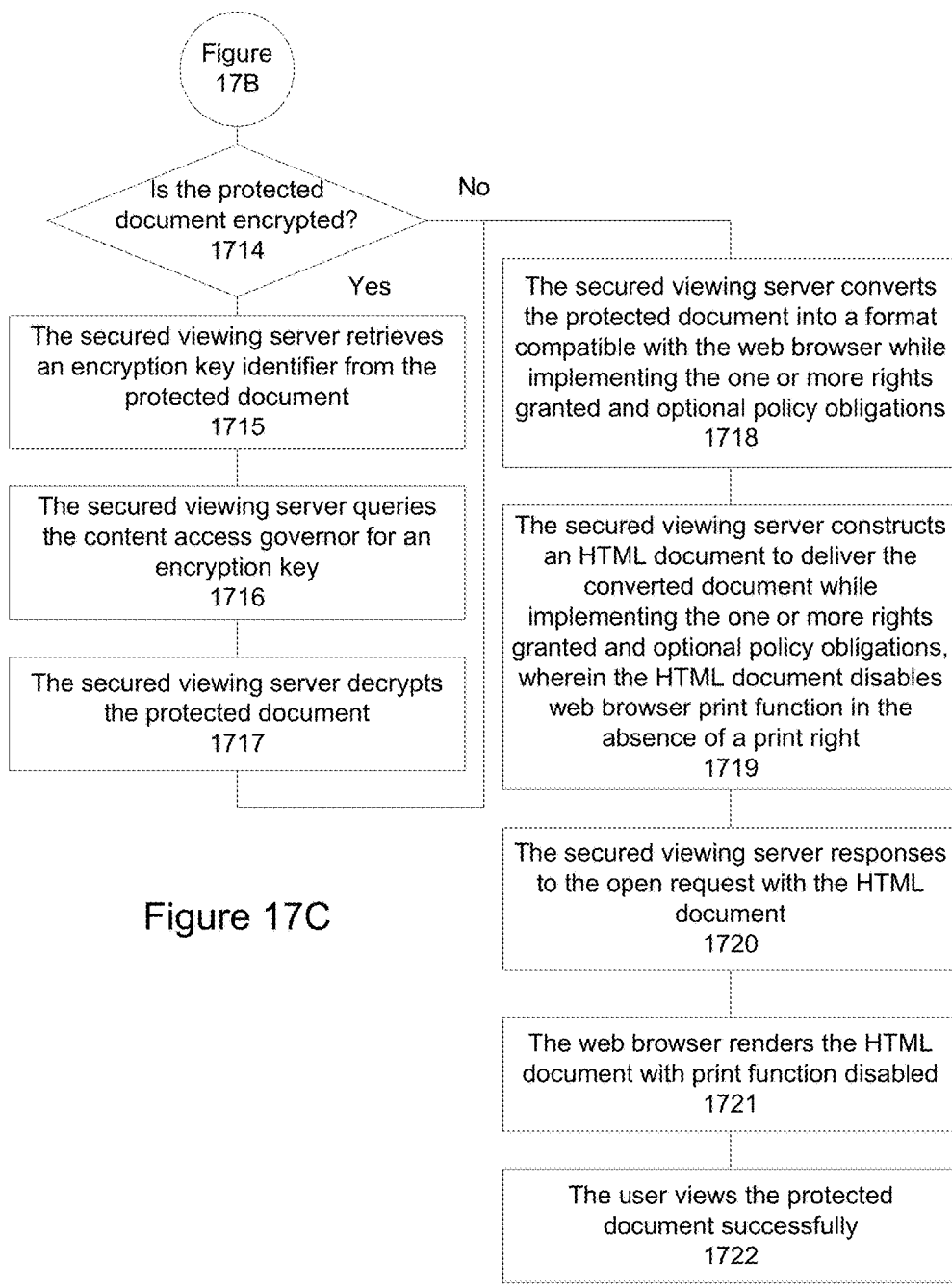

Figure 18B

```
         ┌─────────┐
         │ Figure  │
         │  18A    │
         └────┬────┘
              │
              ▼
┌──────────────────────────────────────────────┐
│ The content access governor produces one or  │
│ more rights granted to the user on the       │
│ protected document and optional policy       │
│ obligations, wherein the one or more rights  │
│ granted does not include copy or print rights│
│                    1808                      │
└──────────────────┬───────────────────────────┘
                   │
                   ▼
┌──────────────────────────────────────────────┐
│ The content access governor returns a policy │
│ effect ALLOW, the one or more rights granted │
│ and optional policy obligations to the       │
│ secured viewing server                       │
│                    1809                      │
└──────────────────┬───────────────────────────┘
                   │
                   ▼
┌──────────────────────────────────────────────┐
│ The secured viewing server checks if the     │
│ protected document is encrypted              │
│                    1810                      │
└──────────────────┬───────────────────────────┘
                   │
                   ▼
              ╱─────────╲           No        ┌─────────┐
         ╱ Is the protected ╲──────────────▶│ Figure  │
         ╲ document encrypted?╱               │  18C    │
              ╲   1811  ╱                     └─────────┘
                   │ Yes
                   ▼
┌──────────────────────────────────────────────┐
│ The secured viewing server retrieves an      │
│ encryption key identifier from the protected │
│ document                                     │
│                    1812                      │
└──────────────────┬───────────────────────────┘
                   │
                   ▼
┌──────────────────────────────────────────────┐
│ The secured viewing server queries the       │
│ content access governor for an encryption key│
│                    1813                      │
└──────────────────┬───────────────────────────┘
                   │
                   ▼
┌──────────────────────────────────────────────┐
│ The secured viewing server decrypts the      │
│ protected document                           │
│                    1814                      │
└──────────────────────────────────────────────┘
```

```
         ┌─────────┐
         │ Figure  │
         │  18B    │
         └────┬────┘
              │
```

The secured viewing server converts the protected document into a format compatible with the web browser while implementing the one or more rights granted and optional policy obligations
1815

The secured viewing server constructs an HTML document to deliver the converted document while implementing the one or more rights granted and optional policy obligations, wherein the HTML document renders a security overlay at the web browser
1816

The secured viewing server responses to the open request with the HTML document
1817

The web browser renders the HTML document with a security overlay
1818

The user views the protected document successfully
1819

Figure 18C

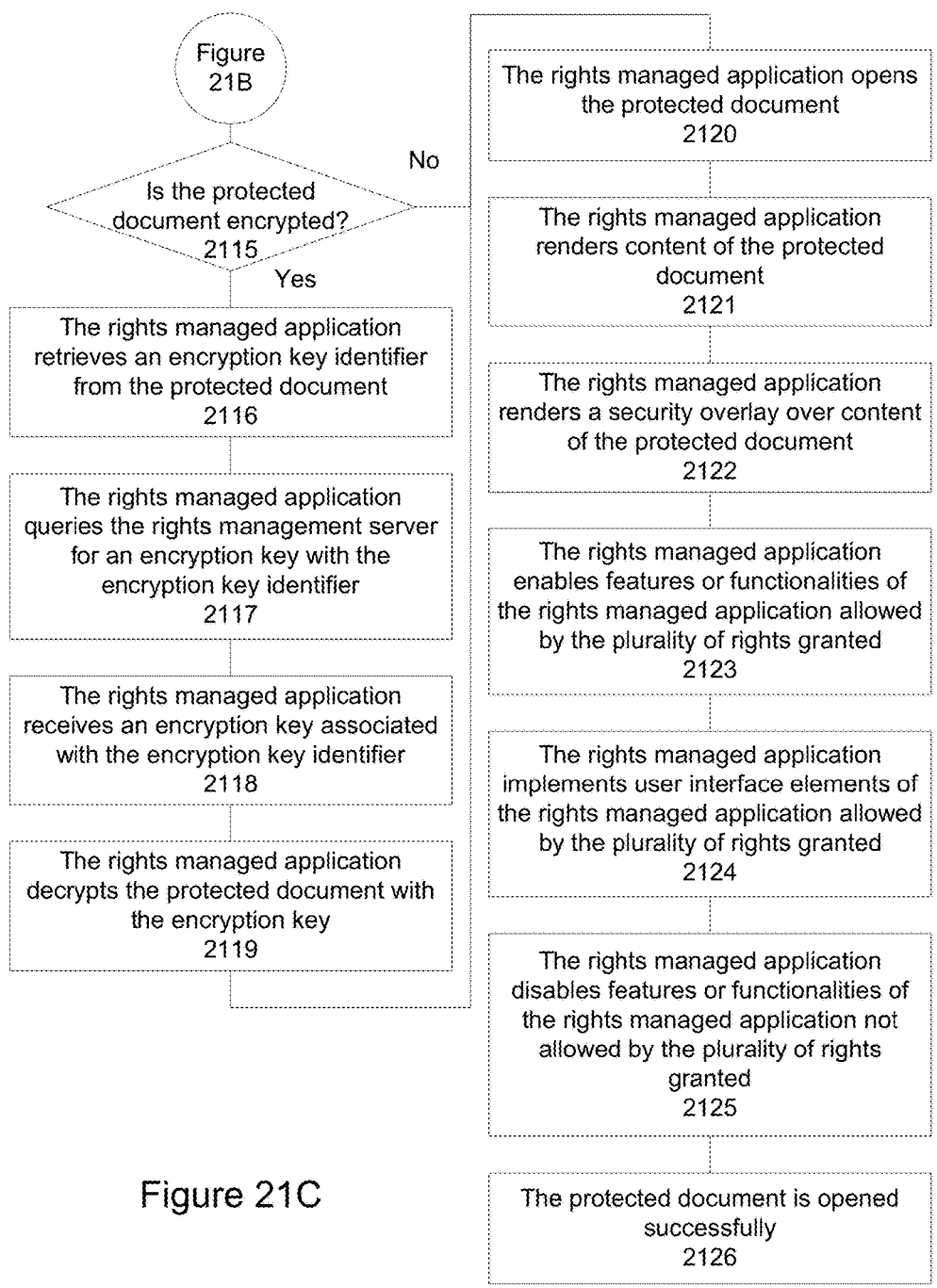

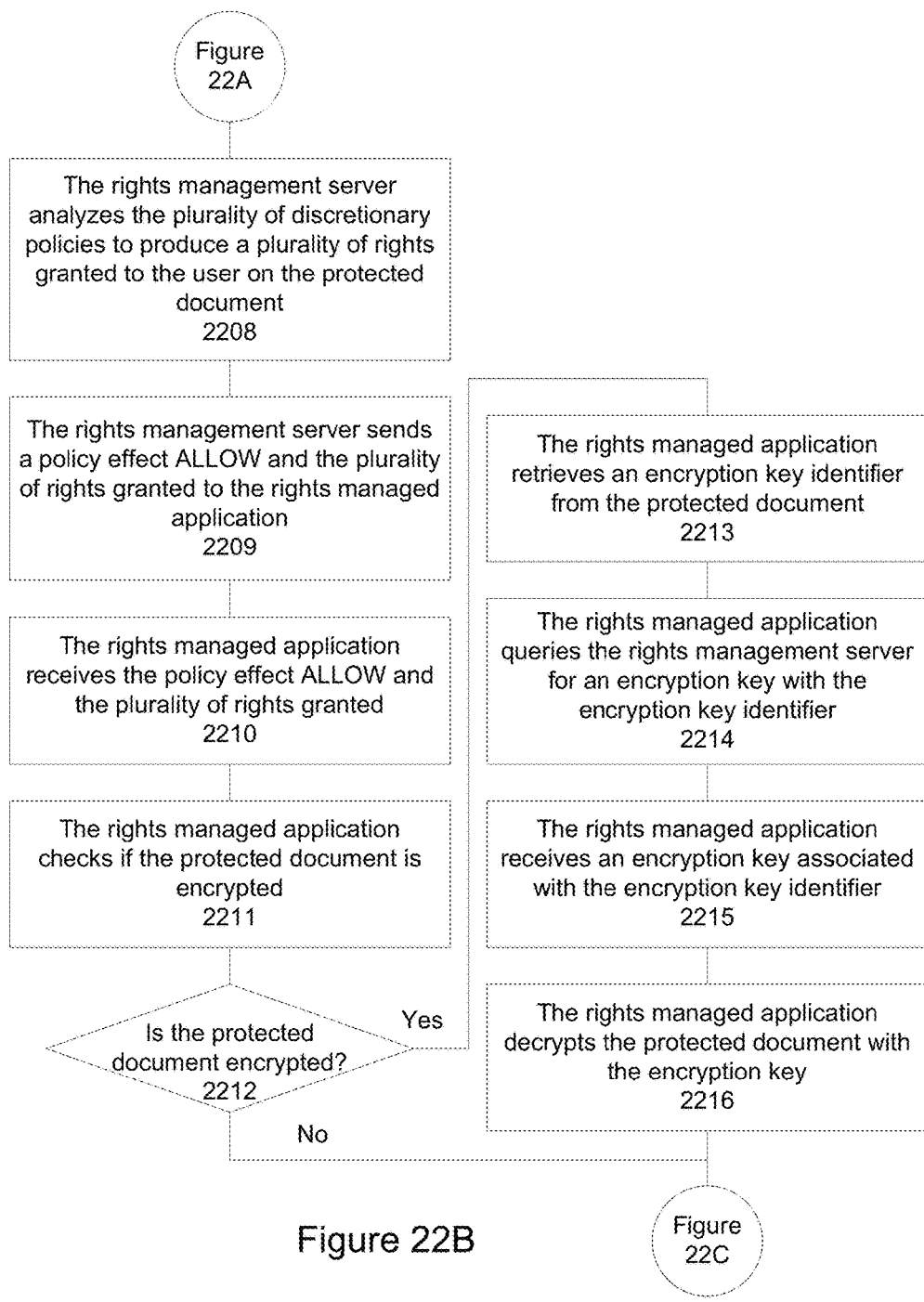

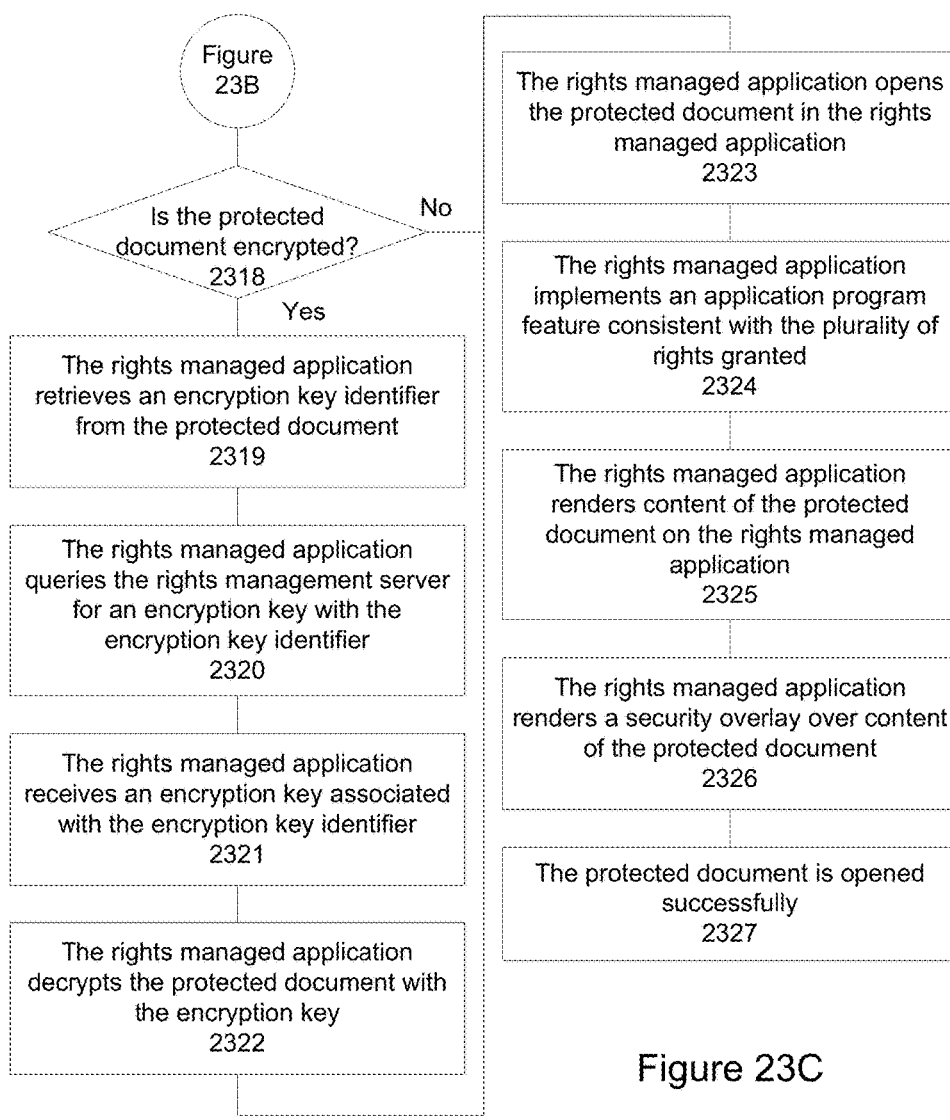

VIEWING PROTECTED DOCUMENTS IN A WEB BROWSER

CROSS-REFERENCE TO RELATED APPLICATIONS

This application claims the benefit of U.S. patent application 62/240,391, filed Oct. 12, 2015, which is incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to the field of information or document management, and more specifically, to protecting documents when viewed on a Web browser or mobile phone.

Web browsers provide an extremely convenience means to access information. While it is easy to make information accessible to a Web browser, protecting information delivered to a Web browser is difficult. Typically, a web page designer or website developer has to go through an arduous process to provide limited protection to information delivered to a Web browser. Such process is both time consuming and error prone.

Mobile applications (or mobile apps) provide another convenience means to deliver information to a user. A mobile application is a custom application program that runs on a mobile computing device such as a smartphone or tablet. Unlike a Web browser, a mobile application affords more protection to information delivered to a mobile device when it is properly implemented and integrated with an information management system.

There is a need to provide consistent protection to information or documents delivered to a Web browser or mobile device whether the information or documents are stored in the back office or on the Internet.

BRIEF SUMMARY OF THE INVENTION

A technique and system provide protection to a protected document while being viewed on a Web browser or mobile application on a mobile device, such as a smartphone or tablet. Methods, techniques, and systems control access to protected documents and use of content in protected documents to support information management policies.

In an implementation, a method includes: providing a document repository having a plurality of protected documents; providing a content access governor having a plurality of policies; providing a secured viewing server having access to the content access governor and the document repository; connecting to the secured viewing server via a web browser; at the web browser, opening a protected document in the document repository by a user; at the secured viewing server, receiving a request to open the protected document; at the secured viewing server, obtaining a decision on whether the request is allowed from the content access governor; and at the secured viewing server, if the request is allowed, obtaining a plurality of rights granted to the user on the protected document from the content access governor.

The method further includes: at the secured viewing server, if the request is allowed, converting the protected document into a converted document that is in a format suitable for display in the web browser; at the secured viewing server, if the request is allowed, constructing a code fragment to modify a web browser feature, wherein modifying the web browser feature implements in part the plurality of rights granted to the user on the protected document; at the secured viewing server, if the request is allowed, constructing a HTML document to deliver the converted document and the code fragment to the web browser; at the secured viewing server, if the request is allowed, sending the HTML document to the web browser in response to the request; and at the web browser, if the request is allowed, loading the HTML document to display content of the protected document in the web browser, wherein loading the HTML document implements the plurality of rights granted to the user on the protected document, wherein the user opens the protected document successfully.

The method further includes: at the secured viewing server, if the request is not allowed, sending a response to the web browser indicating that the user is not allowed to open the protected document; and at the web browser, if the request is not allowed, rendering the response in the web browser, wherein the user failed to open the protected document.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 16A-16C shows an example flow of viewing a protected Microsoft Excel® document on a Web browser with save functions disabled.

FIGS. 17A-17C shows an example flow of viewing a protected 3D CAD drawing in Siemens® JT data file format on a Web browser with print function disabled.

FIGS. 18A-18C shows an example flow of viewing a protected 2D CAD drawing in AutoCAD® DXF data file format on a Web browser with security overlay rendered using JavaScript.

FIGS. 21A-21C show an example flow of a user viewing a protected document with a mobile app that is a rights managed application.

FIGS. 22A-22C show an example flow of a user opening a protected document attached to an email message with a rights managed application.

FIGS. 23A-23D show an example flow of a user opening a protected document in a rights managed application with policy evaluation performed at a rights management server.

DETAILED DESCRIPTION OF THE INVENTION

Figure 1:
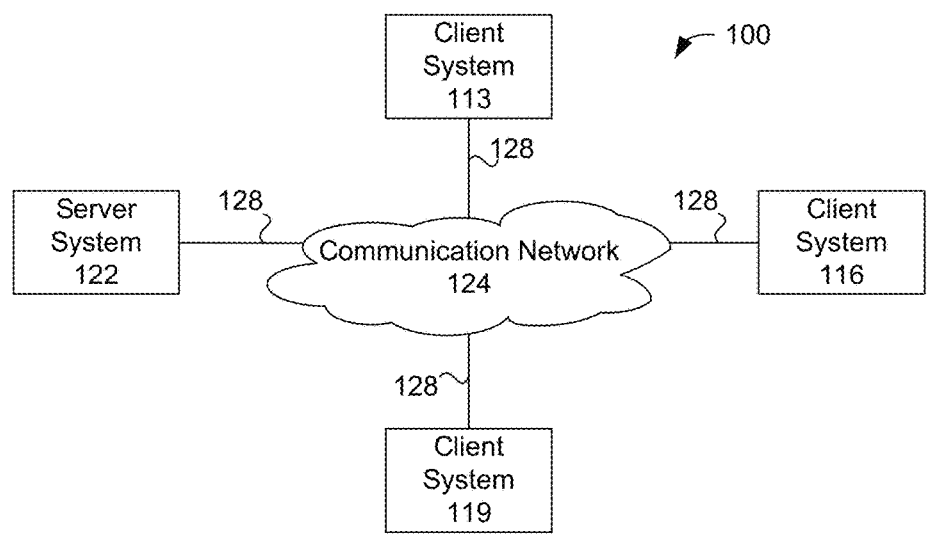
FIG. 1 shows a simplified block diagram of a distributed computer network and clients.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, or others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "Web browser" or "web browser" application executing on a client system enables users to select, access, retrieve, or query information stored by server system 122. In this patent, the terms Internet, Web, and Web browser may be written in an uncapitalized or lower-case form, such as internet, web, and web browser. Examples of Web browsers include the Internet Explorer® browser by Microsoft Corporation, the Firefox® browser by Mozilla Foundation, the Chrome™ browser by Google Inc., the Safari® browser by Apple Inc., or others. Trademarks are the property of their respective owners.

Figure 2:
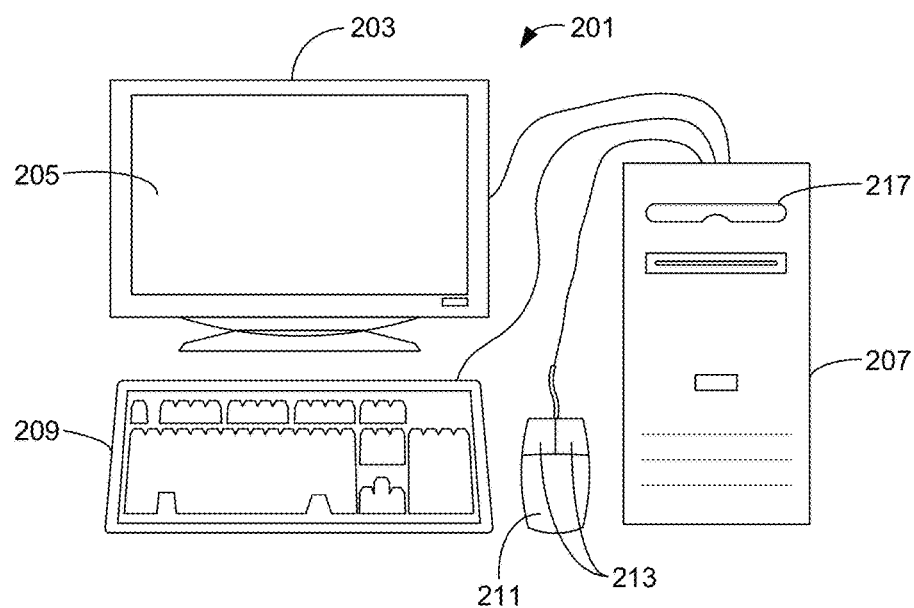
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media may also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
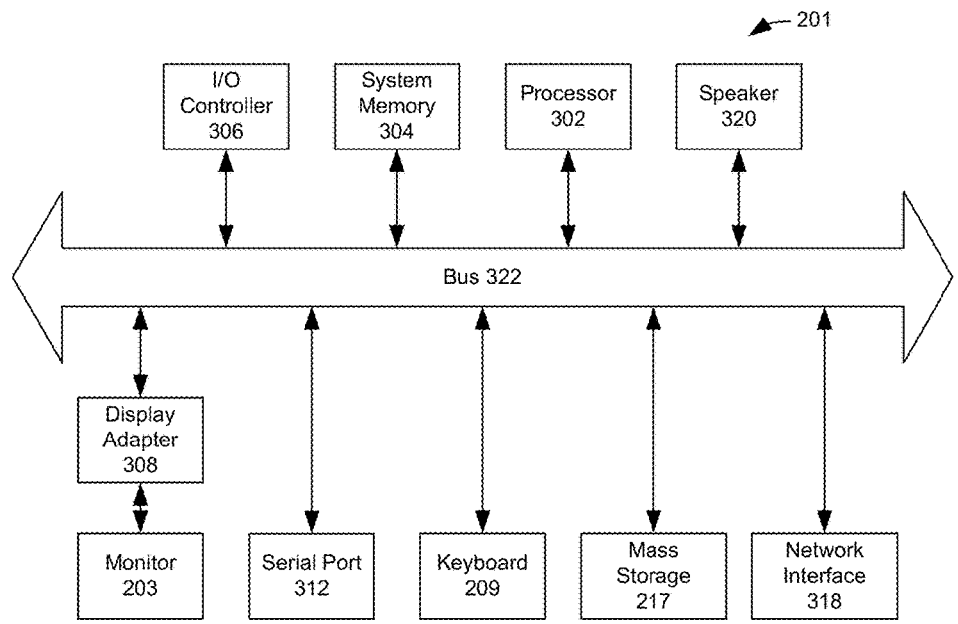
FIG. 3 shows a system block diagram of computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). An operating system for the system may be one of the Microsoft Windows® family of operating systems (e.g., Windows 95, 98, Me, Windows NT, Windows 2000, Windows XP, Windows Vista, Windows 7, Windows CE, Windows Mobile), Linux®, UNIX®, Oracle Solaris®, Canonical Ubuntu®, or Apple OS/X®. Other operating systems may be used. Microsoft Windows is a trademark of Microsoft Corporation. Trademarks are the property of their respective owners.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This application also incorporates by reference U.S. patent applications 60/755,019, filed Dec. 29, 2005; 60/776, 036, filed Dec. 29, 2005; 60/743,121, filed Jan. 11, 2006; 60/821,050, filed Aug. 1, 2006; 60/870,195, filed Dec. 15, 2006; 61/357,016, filed Jun. 21, 2010; 61/368,408, filed Jul. 28, 2010; 61/471,682, filed Apr. 4, 2011; 62/220,104, filed Sep. 17, 2015; Ser. No. 11/383,159, filed May 12, 2006; Ser. No. 11/383,159, filed May 12, 2006; Ser. No. 11/383,161, filed May 12, 2006; Ser. No. 11/383,164, filed May 12, 2006; Ser. No. 11/615,477, filed Dec. 22, 2006; Ser. No. 13/165,730, filed Jun. 21, 2011; Ser. No. 13/193,588, filed Jul. 28, 2011; Ser. No. 13/439,827, filed Apr. 4, 2012; 62/238,009, filed Oct. 6, 2015; 62/240,391, filed Oct. 11, 2015; 62/344,557, filed Jun. 2, 2016; 62/365,886, filed Jul. 22, 2016; 62/373,319, filed Aug. 10, 2016; and Ser. No. 15/268,155, filed Sep. 16, 2016.

In an embodiment, an information management system employs a plurality of policies, a secured viewing server, a plurality of data protection clients, a plurality of container service modules, a plurality of encryption service modules, or any combination thereof to provide protection to information or documents. A data protection client may include a policy enforcer, rights management client, rights managed application, content access governor, or others. An information management system may protect information or documents in place, created for temporary use, stored in managed document containers, or more. Policy, data protection client, policy enforcer, rights management client, container service module, encryption service module and managed document container are described further below.

Information includes data in a relational database; data in an enterprise resource planning (ERP) system; data in a product lifecycle management (PLM) system; data in a collaboration system such as Microsoft SharePoint®; data on a Web server; data delivered to an SAP® client application (e.g., information about an employee) by an SAP® human resource module running on a server; or others.

A document encompasses objects such as a file, compound document, e-mail message, web page, on-line report, on-line form, discussion thread, result set generated by a database query, on-line form, bitmap, file system object, data object managed by a document management system, data object managed by a content management server, data object in a product lifecycle management system, source code file or code fragment managed by a source code management system, data object managed by a configuration management system, data object managed by a project management system, data object in an enterprise resource planning system, data object in a customer relationship management system, data object managed or served, or both, by a portal server, data object served by a web server, data object managed or served by any application server, or any unit of information content stored using volatile or nonvolatile memory.

A document may be a file system or non-file system object. For example, a file system object may be a word processing file, spreadsheet file, Adobe® PDF file, 2D CAD data file, 3D CAD data file, or others. A non-file system object may be an e-mail message, attachment of an e-mail message, file in an archive such as a zip file or Adobe® Portfolio, or others. Examples of file systems include FAT, Microsoft® NTFS, Apple OS/X® Extended, CDFS, HFS, ext2, ext3, ISO 9660, ODS-5 or UDF.

A document may be stored in memory or a disk of a computing device, removable storage device, document repository, database, another document, document archive, or more. If a document is a file, the file may be stored on a disk or memory of a computing device, file server, database, document management system, intranet or Internet file store, cloud storage, removable hard disk or flash drive, CD-ROM, DVD, or others. A computing device may include a desktop computer, laptop computer, tablet computer, smartphone, file server, information kiosk, augmented reality system, navigation system, or others. A cloud storage may include Apple® iCloud, Amazon S3®, Dropbox™, Box®, Microsoft® SkyDrive, Microsoft® OneDrive, Google Drive™, or others. Trademarks are the property of their respective owners.

In an embodiment, a policy that is used to control access to and use of information or a document may be defined independent of a user, information, or a document. A policy may control access to or use of information or a plurality of documents. A policy may be defined (or created) before a user who is affected by the policy is added to an information management system. Similarly, a policy may be defined in an information management system before information or a document is created, yet access to the information or document is controlled by the policy. A new policy may be defined or an existing policy may be updated after information or a document is created. The new or existing policy will control access to or use of the information or document once it is deployed. In another word, policies in an information management system is not static which is unlike how policies work in many digital rights management systems.

Control and protection functions of information or documents may be achieved either through one policy or multiple policies defined centrally. A policy server is an intelligent system that has the ability to decide if a single or multiple policies or subset of policies are applicable to a data protection client. A plurality of policies is stored in a policy database accessible by a policy server. A policy database may be implemented using a relational database, object-oriented database, object repository XML file, data file, or others. The plurality of policies or a subset of the plurality of policies may be distributed to one or more data protection clients. At least a subset of all policies defined in an information management system is distributed to a data protection client.

Controlling access to information or documents includes allowing or denying opening a file, renaming a file, deleting a file, opening a web page, opening a document listing screen of a SAP® client application, or more.

Controlling use of information or documents includes allowing or denying copying content of a document, printing a document, saving a document into a different file, copying a file, attaching a file to an e-mail message, adding a file to an archive such as a zip file, stored a file into a document, merging two documents, sending an e-mail message to a recipient, uploading a file to a Web site, or more. In an example, if an application is an enterprise resource planning (ERP) application, use of information or a document includes creating a quote, converting a quote to an order, viewing customer information, viewing an order, viewing product pricing and discounts, viewing sales data, viewing reports or viewing employee information. In another example, if an application is a product lifecycle management (PLM) application, use of information or a document includes creating a marketing plan, viewing a product design, viewing a 3D computer-aided design (CAD) drawing, viewing production schedule, updating a bill of materials or viewing a report.

Controlling access to and use of information and documents may be implemented using access control policies (which sometimes referred to as access policies), use control policies (which sometimes referred to as usage policies), rights control policies (which sometimes referred to as rights policies or digital rights policies), or any combination thereof.

A data protection client controls access to and use of information or documents by attaching itself to (or instrumenting) an application program that accesses information or documents. The data protection client intercepts (or detects, or senses) one or more application program operations in the application program and effects the one or more application program operations. When the data protection client intercepts an application program operation, it sends the application program operation along with information relevant to the application program operation to a policy engine (described further below) to perform policy evaluation. The policy engine selects and evaluates one or more policies (or rules) relevant to the application program operation to determine if the application program operation should be carried out. For an access, use or rights control policy, a decision from policy evaluation includes policy effect ALLOW or DENY. In addition to policy effect, policy evaluation may produce a policy obligation (described further below), optionally. A data protection client enforces a policy effect of policy evaluation and implements one or more policy obligations. If policy effect is ALLOW, an enforcement action is to do nothing, thereby allowing an application program operation to be carried out to completion. If policy effect is DENY, an enforcement action is to block an application program operation.

Examples of application programs include word processor (e.g., Microsoft® Word or Apple Pages®), spreadsheet (e.g., Microsoft Excel® or Apple Numbers®), presentation program (e.g., Microsoft PowerPoint® or Apple Keynote®), document viewer (e.g., Adobe Reader® or Microsoft® XPS Viewer), web browser (e.g., Microsoft Internet Explorer®, Mozilla Firefox®, Apple Safari®, Google Chrome™ or Microsoft® Edge), e-mail client (e.g., Microsoft Outlook® or Apple® Mail), instant messenger (e.g., Microsoft® Office Communicator, Microsoft Skype®), and many others. Trademarks are the property of their respective owners.

Examples of application program operations include opening a file, copy a file, moving a file, renaming a file, deleting a file, printing a document, copying content of a document, changing document classification, saving a document into a different file, uploading a file to a Web site, opening a web page, showing a data page of an application (e.g., a component listing on a SAP® client application, a product plan or design page on an Dassault Systèmes Enovia™ client, a marketing plan or product specification on a Microsoft SharePoint® page), sending an e-mail message, attaching a file to an e-mail message, sending a message through instant messenger, inviting a user to join a video conference, capturing a screen image, and many others.

In an embodiment, a data protection client controls access to encryption keys used by an encryption service module or a managed application program to encrypt and decrypt documents. An encryption key is provided to an encryption service module and encryption or decryption occurs in the encryption service module transparent to an unmanaged application program. In another word, an encryption key is under the control of an information management system at all times and it is not exposed to an unmanaged application programs that is allowed access to unencrypted content at any time.

A managed application program is an application program provided by an information management system or trusted (i.e., authorized or certified) by the information management system to handle encryption keys and other encryption related materials securely. An unmanaged application program is an application program that is not entrusted by an information management system to handle encryption keys. An example of a managed application program is a utility application program provided by an information management to recover an encrypted document. Another example of a managed application program is NextLabs® Rights Management Client for iOS. Some examples of unmanaged application programs are Microsoft® Word, Microsoft Outlook®, Adobe Reader®, Apple Pages®, or others. Trademarks are the property of their respective owners.

In an embodiment, a container service module provides access to content of a document in a managed document container (described below) to an application program. It makes access to content of a document in a managed document container transparent to an application program, thereby an application program may access content of a document without aware of the document being stored in a managed document container. With a container service module, an application program does not need to be altered to access a document in a managed document container. A container service module also provides access to metadata and discretionary policies (described further below) in a managed document container to a data protection client.

In an embodiment, an encryption service module encrypts a document or decrypts an encrypted document independent of an application program, thereby encryption and decryption are transparent to the application program that accesses the document. An encryption service module also performs the functions of a container service module. An encryption service module does not make access control decision or perform enforcement on a document. All access control decisions and enforcements on a document are performed by a data protection client.

In an embodiment, an information management system protects information or documents in place. Protecting information or documents in place refers to an information management system providing protection to information or documents without altering the location or method on how the information or documents are being stored. In an embodiment, an information management system protects information or documents by storing the information or documents in a managed document container. Storing information or a document in a managed document container allows the information management system to protect information or a document in any data or file format across disparate computing or storage environments.

A managed document container (also referred to as a protected document in this document) is a file or data object that stores information or a document to be protected and metadata used by a data protection client to protect the information or document. A managed document container may also store metadata not used by a data protection client to protect information or a document. Metadata may include attributes, keywords, lineage, discretionary policies, access and use history, or many others. Content stored in a managed document container may be encrypted.

A managed document container may be a universal document container or a retrofitted document container. A universal document container is a file or data object created by an information management system to store information or a document it protects. A universal document container may also store metadata used by a data protection client to protect information or a document. Information or a document of any format may be stored in a universal document container. An example of a universal document container is NextLabs® portable encrypted document. Portable encrypted document is described in details in U.S. patent application Ser. No. 13/439,827, filed Apr. 4, 2012, which is incorporated by reference. Whereas, a retrofitted document container is a file or data object created by an application program (e.g., Microsoft® Word) and the file or data object is not created for the purpose of providing information security. Metadata used by a data protection client to protect information or a document is stored in the file or data object. Examples of retrofitted document containers include Microsoft® Office document (e.g., .docx, .xlsx and .pptx files), Adobe® PDF file, XML document, MIME object (e.g., an e-mail message), or many others. In another word, a Microsoft® Word or Microsoft Excel® document is a managed document container because the document contains metadata that may be used by a data protection client to enforce policies.

To provide access and use controls to information or documents in a heterogeneous environment where information or documents may be accessed from different types of computing devices and the computing devices may be running different operating systems, a managed document container provides a consistent means to carry metadata necessary for an information management system to enforce access, use or rights control policies on the information or documents. By encrypting information or documents stored in managed document containers, an information management system provides persistent protection to the information or documents while they are at rest, in motion or in distribution. Some examples of operating systems include Microsoft Windows®, Apple OS/X®, Apple® iOS, Linux®, Google Android™, The Open Group UNIX®, or others. IOS is a registered trademark of Cisco Systems. Trademarks are the property of their respective owners.

In an embodiment, encryption key management is coupled with access control where encryption keys are securely managed by a data protection client on a computing device and the data protection client makes an encryption key available to an encryption service module only if a user is authorized to access information or a document and an application program that accesses the information or document is to be trusted. An application program may be trusted if it has the ability to protect unencrypted content according to policies of an information management system. More details on how to determine if an application program may be trusted is described further below.

A secured viewing server extends access to protected documents to a web browser. A user may log in to a secured viewing server using a web browser and open a protected document. The protected document is translated to a format suitable for rendering in a web browser and displayed on a web browser according to the policies governing access and use of the protected document by the user.

The present invention enforces access control policies, use control policies, rights control policies, or a combination of these to protection information or documents. In an embodiment, access, use and rights control policies are declarative policies. This means policies may be used to make declarative statement of policy without burdened by implementation details. The declarative aspect of the policy language is another benefit provided by providing abstraction. For example, an access control policy may specify who may access a resource (or information or a document) on what device in what time period. A use control policy may specify how a user may use (e.g., e-mail, print or edit) a resource in a particular computing environment or location. A rights control policy may specify who may read but not e-mail, print or duplicate a resource. A typical access or use control policy specifies one or more actions that the policy may be applied. An access or use control policy specifies what action (e.g., open, save or send) a user may perform on a resource. On the other hand, a rights control policy specifies what rights (e.g., view, save or copy) a user may have or not have (i.e., granted or revoked) on a resource. Many policy objectives may be achieved using either access, use or rights control policies. In fact, a particular policy objective may be implemented using access control policies, use control policies, rights control policies, or a combination of two or more types of policies. Access or use control policies are described in details in U.S. patent application Ser. No. 11/615,477, filed Dec. 22, 2006 and U.S. patent applications aforementioned and incorporated by reference. Rights control policies are described in details in U.S. patent application 62/220,104, filed Sep. 17, 2015, which is incorporated by reference.

NextLabs' Compliant Enterprise Active Control Policy Language™ (ACPL) is one example of a policy language of the invention and is provided to help one more easily understand the invention. There are many variations to a policy language according to the invention and such a policy language is not limited to what is described for the ACPL language. The invention includes features that are not in the ACPL language implementation presented. A policy language of the invention may include one or more features of the ACPL language. A policy language of the invention features that are not in the ACPL language. A policy language of the invention may include one or more features of the ACPL language in combination with features that are not in the ACPL language. More detailed information about the ACPL language may be found in U.S. patent application 60/870,195, filed Dec. 15, 2006 and Ser. No. 11/615,477, filed Dec. 22, 2006, which are incorporated by reference. Trademarks are the property of their respective owners.

Another aspect is the policy language may allow policies to be nested. One policy may call or delegate control to another policy. There may be multiple levels of nesting. Further, a policy may optionally contain a scope that it belongs to. Normally scoping is determined automatically.

A policy may be a reaction or maintenance policy. A reaction policy is a policy which is triggered by an application program operation (or user action) such as a user opening a file or sending an e-mail message. A maintenance (or administrative) policy is a policy that is triggered by a scheduler. A scheduler is an application program that causes a maintenance policy to execute at a certain time, such as daily, weekly, or monthly, upon another non-action event, or created by a reaction policy. Implementations of the invention may include reaction policies, maintenance policies, or both.

A policy may be defined based on a type of action, type of right, user, user group, user attribute (e.g., department, role, project, status (e.g., full-time, part-time or consultant) or user's business function), e-mail address, mailing list, host, group of computers (e.g., finance department computers), type of computer (e.g., desktop, laptop, tablet or smart phone), application program (e.g., Microsoft® Word, Microsoft Excel®, Microsoft PowerPoint®, Microsoft Visio®, Microsoft Outlook®, Microsoft Internet Explorer®, Google Chrome™ Mozilla FireFox®, Microsoft Skype® or Adobe Reader®), type of application program (e.g., word processor, spreadsheet, database, web browser, instant messenger or file viewer), application module (e.g., SAP® customer relationship management module, Microsoft SharePoint® or Oracle® accounting module), location (e.g., New York office, London office, airport, hotel, café, or customer site), connectivity (including access mechanism and bandwidth; e.g., LAN, WLAN, VPN, cellular network, Bluetooth, Internet, DSL, ISDN, dialup, remote desktop protocol (RDP), virtual network computing (VNC) protocol, latency, secure point-to-point, 56 k, broadband, 100 megabit per second or 1 gigabit per second), time of day, day of the week, file path, file name, document size, document timestamp, document owner, document properties, document type (e.g., file, web page or e-mail), document format (e.g., XLS, PDF or HTML format), document identifier, document classification (e.g., confidential document or financial report), document characteristics (e.g., contains a watermark), document content (e.g., contains social security number), database query, database query result set, database query result set properties, metadata, a combination of these, or others. Not all of these parameters are required. A data protection client may interpret any one or combination of these parameters. Trademarks are the property of their respective owners.

A policy language for the information management system of the invention includes policies and policy abstractions. Policies may also be referred to as rules or policy object, and policy abstractions may also be referred to as abstractions, abstraction objects, or variables. There may be any number of policies, abstractions, or both. Typically, an information management system has hundreds, thousands, millions, or greater number of rules. Because many rules are needed typically to manage information in a company effectively, abstractions may be used to simply maintenance of the rules and there should be a system to effectively managing the policies and abstractions.

When applied to information control, a policy object may represent a statement that describes a document access or usage situation and define what action a data protection client should take when that situation arises. In addition, a policy object may also represent a statement that describes the rights users have on documents whereby declaring what a user may do or not do with a document. In effect, a policy object represents a rule (or a plurality of rules) controlling how different categories of users in an organization are allowed to use different categories of documents. For example, one may construct policy objects as a combination of abstraction objects that are linked together with operators and other logical constraints, and then further refined the policy objects by applying contextual conditions, such as time of the day. Typically, an organization will construct enough policy objects to cover all potential business situations where some kind of information control is required.

In an embodiment, a policy object may comprise of a set of predefined building blocks (or abstraction objects) strung together according to a precise syntax. Because the abstraction objects are logical representation of specific physical entities, policy objects constructed based on the abstraction objects also possess great flexibility in covering activities (or actions) and entities in the physical network with little regard to how the activities and entities change and evolve over time.

In an embodiment where policy objects are applied to information control, three types of policies (or policy objects) may be defined: access control policies, use control policies or rights control policies. The differences between the types of policies are where the policies are deployed and what type of user activity they control.

In the implementation of information or documents use control, an entity object layer comprises of a plurality of entity objects representing any of: resource (e.g., file, e-mail message, web page, on-line report or result set of a database query), user, action, time, location, connectivity (e.g., VPN, WLAN, dialup, RDP, VNC or latency), application program (e.g., Microsoft® Word, SAP® frontend client application program, Microsoft SharePoint®, spreadsheet or instant messenger), or others. Trademarks are the property of their respective owners. An entity object may comprise of a name (or identity) and a value. A value may be an integer, floating point number, Boolean value, string or reference. Further, an entity object may also comprise of a name and multiple values, or a name and a data object. In an embodiment, entity objects may be stored in a LDAP server, database, system registry, configuration file, or a combination of these. An entity object may be reference by its name (or identity). In an embodiment, an entity object is called one of event, resource, subject or context in a policy language described further below. For example, a reference to an entity object may take the form of: user="John Doe," action=OPEN, application="Microsoft Word," computer="Jane's desktop," or location="Boston Office."

In the implementation of information or documents use control, an abstraction object layer comprises of a plurality of abstraction objects. An abstraction object is typically a logical representation of a plurality of entity objects. An abstraction object may comprise of a name (or identity) and an expression that refers to one or more entity objects. An abstraction object may also refer to another abstraction object. One or more abstraction object may refer to a particular entity object in the entity object layer. In an embodiment, an abstraction object is called a policy abstraction in a policy language described further below. For example, a reference to a policy abstraction may take the form of: user=Finance, document=Legal-Documents, computer=Guest-Workstations, application=Instant-Messenger, location=Branch-Office, or connectivity=Remote.

A policy (or rule) includes an expression. A premise may be an expression or statement. More specifically, a premise may contain an expression, and an expression may be a statement. An expression may be "a=true and b=c." An expression may also include a comma delimited list. For example, one may check whether an action is one of the actions listed in a comma delimited list. A statement may be "FOR expression ON expression BY expression DO statement," or any non-logical or mathematical expression. A statement includes expressions, potentially multiple expressions, each of which may be nested. A statement may also include nested statements.

policy:=premise+consequence+directives

An access or use control policy may be used to permit or block an application program operation access to or use of a resource. A resource includes information or a document described above. The general form of an access or use control policy includes at least one resource, one action (e.g., open or edit), one user, one effect (e.g., ALLOW or DENY) and optionally a condition. For example, an access policy may specify only a user in a group Executive may open a document classified as Financial and Confidential when a computer is connected to a network in the office. A use control policy may specify all users may not send a document classified as "top secret" in an e-mail message.

In an example, access or use control policies share the same syntax. An access control policy may be used to allow or deny access by one or more users to one or more resources. Similarly, a use control policy may be used to allow or deny an action by one or more users on one or more resources. The access or use control policy syntax is:
FOR <resource>
ON <action>
BY <user>
[WHERE <condition>]
DO ALLOW|DENY [, <obligation>]

A FOR clause specifies a collection of resources an access or use control policy is applied to. A resource includes information or a document described above. The collection of resources may include a named resource, a resource where its attribute matching a pattern, a resource abstraction, or others. A ON clause specifies a collection of actions an access or use control policy is applied to. An action often maps to an application program operation. Sometimes, an action translates to a sequence of application program operations. Some examples of actions include open, save, print, edit, copy, upload, delete, send, change attribute, classify, or others. A BY clause specifies a collection of users an access or use control policy is applied to. The collection of users may include a named user, a named user group, a user abstraction, a user where the user's attribute matching a pattern, or others. A WHERE clause specifies a condition where an access or use control policy is applicable when the condition is evaluated to true. A WHERE clause is optional. A condition may specify a location, time, time range, connection type, application program, device type, computer, security level, if a particular software is install, if an antivirus definition is up-to-date, or others. A DO clause specifies an effect when all preceding clauses matched successfully. The effect may be ALLOW, DENY, or others. A DO clause may also specify an obligation (sometimes referred to as policy obligation), optionally. An obligation is a task that should be performed and an obligation may be adopted when an effect is ALLOW, DENY, or both.

In an implementation, an information management system denies all actions by a user by default. Any action that a user is allowed to perform is allowed by an access or use control policy. In an implementation, an information management system allows all actions by a user by default. Any action that a user is not allowed to perform is denied by an access or use control policy.

Access or use control policies including their syntax, applications, deployment and evaluation are described in details in U.S. patent application Ser. No. 11/615,477, filed Dec. 22, 2006 and U.S. patent applications aforementioned and incorporated by reference.

In an example, rights control policies adopt a syntax similar to access or use control policies. A rights control policy is different from an access or use control policy that a rights control policy specifies one or more rights a user may have on a resource whereas an access or use control policy specifies what actions a user is allowed (or denied) to perform on a resource. Rights control policies and access or use control policies have similar applications—controlling access to and use of a resource.

A rights control policy may be used to grant a right to a user or revoke a right granted to a user. The general form of a rights control policy includes at least one resource and at least one user. In addition, a rights control policy may also include one or more options specifying a condition such as a time, location, connectivity type, security level of a client computer, or more. For example, a rights control policy may describe: grant one or more rights to one or more users on one or more resources; grant a right to a user on all resources under a condition; or revoke a right from a user on a resource. The rights control policy syntax is:

GRANT|REVOKE <rights> RIGHT|RIGHTS
TO|FROM <user>
ON <resource>
[WHERE <condition>]
[DO <obligation>]

A rights control policy may either grant rights to or revoke rights from one or more users on one or more resources. A right is sometimes referred to as a digital right. To grant one or more rights, a rights control policy starts with the keyword GRANT. Similarly, to revoke one or more rights, a rights control policy starts with the keyword REVOKE. A TO or FROM clause specifies a collection of users a rights control policy is applied to. The collection of users may include a named user, a named user group, a user abstraction, a user where the user's attribute matching a pattern, or others. A GRANT clause is followed by a TO clause. Whereas a REVOKE clause is followed by a FROM clause. A ON clause specifies a collection of resources a rights control policy is applied to. The collection of resources may include a named resource, a resource where its attribute matching a pattern, a resource abstraction, or others. A WHERE clause specifies a condition where the rights control policy is applicable when the condition is evaluated to true. A WHERE clause is optional. A condition may specify a location, time, time range, connection type, application program, device type, computer, security level, if a particular software is install, if an antivirus definition is up-to-date, or others. A DO clause specifies an obligation (sometimes referred to as policy obligation), optionally. An obligation is a task that should be performed.

The rights (or digital rights) in rights control policies and their definitions are specific to an information management system. Some examples of rights that may be granted to or revoked from a user include view, edit, copy, extract, convert, print, send, decrypt, annotate, classify, assign, screen capture, CAD product and manufacturing information, or many others.

A user who is granted a view right may open and read information or a document. A user who is granted print right may print part or all of an opened information or document to a printer or a file. A rights control policy that grants a user view or print right may also specify a security overlay policy obligation. A security overlay policy obligation may specify a text or image pattern to be displayed on top of information or a document when the information or document is being displayed or printed. If a text pattern is specified, the text pattern may include a document name, document classification, name of current user, date and time, compute name, static text string, or others. For example, a text pattern security overlay displays "Top Secret, Do Not Distribute, John Doe, Mar. 1, 2015, Desktop 1234." A data protection client implements a security overlay policy obligation by placing a semi-transparent layer of graphics rendering the text or image pattern specified by the security overlay policy obligation on top of the information or document being displayed or printed (i.e., similar to a watermark). A user who is granted a CAD product and manufacturing information right is shown product and manufacturing information when the user views a CAD drawing. Security overlay (also referred to as display content augmentation) including its application and implementation is described in details in U.S. patent applications 62/238,009, filed Oct. 6, 2015; 62/344,557, filed Jun. 2, 2016; 62/365,886, filed Jul. 22, 2016, and U.S. patent applications aforementioned and incorporated by reference.

A user who is granted an edit right may modify an opened information or document and save modifications to the opened information or document. A user who is granted a copy right may create a copy of an opened information or document. A copy is required to have the same file format as the original. A common application program operation associates with a copy right is a "Save As" operation under a File menu. Other file operations that are controlled by a copy right include optimizing file size, reducing file size and saving in a different version of the same file format. A user who is granted an annotate right may add a comment to or highlight an opened information or document.

A user who is granted an extract right may copy content of an opened information or document to a clipboard or another document. A user with an extract right may also extract an attachment from an opened information or document. A user who is granted a convert right may convert information or a document written in a first document format to information or a document in a second document format where the first document format and the second document format are different. Typically, a convert right allows a user to use a "Save As" or Convert operation on a File menu to save an opened information or document to a new document with a document format different from that of the opened information or document.

A user who is granted a decrypt right may unwrap a managed document container. Unwrapping a managed document container decrypts a document in a managed document container and save the decrypted document as a file. A user with a decrypt right but not a view right will not be able to view the decrypted document.

A user who is granted a screen capture right may take a screen shot of an opened information or document. If a user is not granted a screen capture right, the user may not capture a screen image using print screen function including any operation invoked by a print screen key in Microsoft Windows® environment. In addition, the user may not capture the protected information or document using a screen or window capture application program (e.g., Microsoft® Clipping Tool). Trademarks are the property of their respective owners.

A user who is granted a send right may e-mail to a recipient information or a document opened in an application program. In an implementation where encryption is transparent to an application program, the default behavior of an application program that is not instrumented by a data protection client is to e-mail an unencrypted rendition of the opened information or document to the recipient. To prevent loss of protection to an encrypted document, a data protection client modifies an application program operation that sends an opened information or document to send an encrypted rendition of the opened information or document.

A user who is granted a classify right may change classifications of information or a document. A user who is granted an assign right may change discretionary rights such as granting, revoking or modifying rights on information or a document. Discretionary rights are described in details in U.S. patent application 62/220,104, filed Sep. 17, 2015, which is incorporated by reference.

The rights described herein are for illustration purpose only. An information system may enforce a different set of rights using the techniques described in this document. Variations such as naming of a right, adding a new right, deleting an existing right, or modifying definition of an existing right may be accommodated easily. For example, a send right may be modified to enforce uploading of information or a document to a website; an upload right may be added to enforce uploading of information or a document to a website; or a copy right may be renamed as a duplicate right.

An information management system may implement rights control policies or rights enforcement at a plurality of policy enforcement points (described below) to protect information or a plurality of documents.

The role of a data protection client is to protect sensitive or high-value information or documents from unauthorized access or misuse. The types of information or documents a data protection client protects and the environment operates under affect its implementation. Some examples of data protection clients include policy enforcer, rights management client, rights managed application, lightweight enforcer, on-demand enforcer, rights management container, or content access governor. Policy enforcer is described in details in U.S. patent application Ser. Nos. 11/383,159, 11/383,161, and 11/383,164, filed May 12, 2006; Ser. No. 11/615,477, filed Dec. 22, 2006; Ser. No. 13/439,827, filed Apr. 4, 2012; and 62/220,104, filed Sep. 17, 2015, which are incorporated by reference. Rights management client is described in U.S. patent application Ser. No. 13/439,827, filed Apr. 4, 2012; and 62/238,009, filed Oct. 6, 2015, which are incorporated by reference. Lightweight enforcer, on-demand enforcer and rights management container are described in U.S. patent application Ser. No. 13/439,827, filed Apr. 4, 2012, which is incorporated by reference. Rights managed application and content access governor are described further below.

A policy enforcer may be deployed to protect a wide range of information or documents accessible from a desktop or laptop computer. A policy enforcer is a module or computer code, executing on a computer that is used to protect information or documents by controlling access to, use of, or rights to the information or documents. Some example operations a policy enforcer controls are whether to allow: open operations (e.g., whether a user may open a document with Microsoft® Word), edit operation (e.g., whether a user may copy from one document into another document, or whether a user may modify an e-mail's text), and many others. Trademarks are the property of their respective owners.

On the other hand, if the objective is to protect copying of high-value documents such as Microsoft® Office documents or Adobe® PDF documents, a rights management client may be deployed. Trademarks are the property of their respective owners.

To control access to content on an application server, a content access governor may be deployed. A content access governor is an implementation of a data protection client. It provides policy decision to an application server when a user attempts to access information or a document on an application server. Optionally, a content access governor provides a plurality of rights to an application server on information or a document being accessed. A content access governor may provide also an encryption key to a container manager to encrypt or decrypt information or a document.

When a data protection client is deployed on a personal computing device, a data protection client may include a tamper resistance module to protect the data protection client from being tampered thereby protecting the integrity of the data protection client. A tamper resistance module implements a plurality of defense mechanisms to prevent unauthorized alteration of data protection client operations including disabling a data protection client, uninstalling a data protection client, changing policies in a local policy repository, disabling an auditor, reading or copying encryption keys, or more.

A data protection client describes in this document implements functions of a policy enforcement point such as in U.S. patent application Ser. Nos. 11/383,159, 11/383,161, and 11/383,164, filed May 12, 2006; and Ser. No. 11/615,477, filed Dec. 22, 2006, which are incorporated by reference. A data protection client may also implement functions of a policy decision point described in the same references. In addition, a policy enforcement point described in the references may be extended to support rights enforcement as described further below in this document.

A data protection client may enforce access control policies, use control policies, rights control policies, or a combination these. In addition, a data protection client may enforce use operation at a policy enforcement point with a plurality of rights provided by a policy engine when or after information or a document is opened. The plurality of rights may be produced (or extracted) by a policy engine from a plurality of rights control policies, a plurality of access control policies, a plurality of use control policies, or any combination thereof. A policy enforcement point may enforce the plurality of rights without further policy evaluation at a policy engine.

In an embodiment, the functions of a data protection client that supports access, use or rights policies include: intercepting information or document access or use operations on information or a document; communicating an intercepted information or document access or use operation and associated context to a policy engine; making policy decision on an intercepted information or document access or use operation at the policy engine; enforcing policy decisions by allowing or denying an intercepted information or document access or use operation; and auditing (or logging) information or document access or use activities, policy decisions or policy enforcement activities.

A policy decision may be described by a policy effect ALLOW, DENY, or others. Enforcing a policy effect ALLOW requires a data protection client to do nothing, thereby allowing an intercepted operation to execute to completion. Enforcing a policy effect DENY includes: blocking execution of program code that implements printing a document if a user is not allowed to print the document; blocking execution of program code that implements copying content of a document to a clipboard if a user is not allow to copy content of the document; blocking execution of program code that implements screen capture function if a user is not allowed to copy content of a document; or more.

In an embodiment, the functions of a data protection client that supports access, use or rights policies include: intercepting information or document access or use operations on information or a document; communicating an intercepted information or document access or use operation and associated context to a policy engine; making policy decision on an intercepted information or document access or use operation at the policy engine; determining rights granted to the information or document at the policy engine; enforcing policy decisions by allowing or denying an intercepted information or document access or use operation; effectuating (or realizing) information or document rights granted by allowing operations that are consistent with information or document rights granted and disallowing operations that are not consistent with information or document rights granted; and auditing (or logging) information or document access or use activities, policy decisions, policy enforcement activities or rights implementation activities.

Effectuating information or document rights granted by allowing operations that are consistent with information or document rights granted and disallowing operations that are not consistent with information or document rights granted includes: constructing or modifying an application program's user interface (e.g., adding a print button) to allow a user to invoke an operation that is allowed by the information or document rights granted (e.g., granted print right); enabling an application program operation (e.g., Save As menu item) that is allowed by the information or document rights granted (e.g., granted copy right); disabling an application program operation (e.g., Send Document or Send in Email menu item) that is not allowed by the information or document rights granted (e.g., not granted send right); blocking an application program operation (e.g., copying content to a clipboard using keyboard) that is not allowed by the information or document rights granted (e.g., not granted extract right); or more. Techniques on blocking execution of an application program operation is described in details in U.S. patent application Ser. No. 11/615,477, filed Dec. 22, 2006 and U.S. patent applications aforementioned and incorporated by reference.

When a data protection client is aware of the rights granted to a user on information or a document when it is opened in an application program, the data protection client may effectuate the rights granted by disabling user interface elements of the application program as well as blocking application program operations. For example, if a user is not granted a print right on a document, a data protection client may disable user interface elements such as print menu items, print buttons or print accelerator keys of an application program to prevent a user from printing the document. Disabling user interface elements may include disabling (or graying out), hiding or removing menu items on an application program's main menu bar, dropdown menu or popup context menu; disabling (or graying out), hiding or removing a button, control, hypertext link or other clickable element on an application program's tool bar, status bar, navigation bar, dialog box, form or other display surface; blocking input to or execution of program code associated with a menu item, button, control, hypertext link or other clickable element such as placing a transparent, semi-transparent or opaque user interface element (e.g., a window or a static text control) over an existing user interface element to alter a user interface behavior; nullifying effects of a user interface element by preventing normal behavior to be implemented; or more.

A data protection client may enforce a plurality of centralized policies, a plurality of discretionary policies, or both. A centralized policy is a policy administered centrally and distributed by a policy server to a data protection client. A discretionary policy is a policy stored in a managed document container containing information or a document a user is attempting to access. An information management system employs centralized policies to provide consistent application of policies in an environment it manages. Centralized policies work best when they are applied to a plurality of users on a plurality of information or documents. Centralized policies are managed by an administrator and changes are distributed to data protection clients automatically. When a centralized policy is created, a user, information or document specified in the centralized policy may not exist (or is not created) yet, however the centralize policy is applied to the user, information or document once it is created. Discretionary policies are specific to information or a document that they associate with. A discretionary policy on information or a document may be specified by a user authorized to create or edit discretionary policies. Discretionary policies compliment centralized policies in an information manage system by allowing a non-administrative user to specify a discretionary policy to accommodate a specific situation or requirement. Discretionary policies are discussed further below in this document.

There are many ways to evaluate centralized and discretionary policies. In an example, a policy engine evaluates a plurality of centralized policies before a plurality of discretionary policies. In another example, a policy engine evaluates a plurality of discretionary policies before a plurality of centralized policies. In yet another example, a policy engine evaluates a plurality of combined centralized and discretionary policies together. In yet another example, a policy engine evaluates a first subset of centralized policies before evaluating a plurality of discretionary policies, follows by evaluating a second subset of centralized policies. In yet another example, a policy engine allows a plurality of discretionary policies authored by a user with a special authority level (e.g., executive) to override a plurality of centralized policies during policy evaluation. In yet another example, a policy engine allows a first plurality of centralized policies tagged with a specific evaluation priority directive to override a second plurality of centralized policies and discretionary policies during policy evaluation. When a first policy overrides a second policy, a first policy effect from evaluating the first policy replaces a second policy effect from evaluating the second policy or a second policy is not evaluated.

In an implementation where a data protection client includes the function of making policy decision, the data protection client is also responsible for storing a plurality of centralized policies locally to support policy evaluation.

In an implementation where a data protection client does not include the function of making policy decision, the data protection client is responsible for communicating with a policy engine to obtain policy decisions. The policy engine may be running on the same computing device as the data protection client or on a remote computing device.

Intercepting information or document access or use operations, enforcing policy decisions and optionally effectuating information or document rights granted are functions of a policy enforcement point. A data protection client may include one or more policy enforcement points. Policy enforcement point is described further below.

Making policy decision on an intercepted information or document access or use operation and optionally determining rights granted to information or a document associated with an intercepted information or document access or use operation are functions of a policy engine. A policy engine may be integrated into a data protection client or operated independent of a data protection client. When a policy engine operates independent of a data protection client, it communicates with the data protection client through a secured communication channel. The secured communication channel may be implemented using standard (e.g., IPSec or HTTPS) or propriety protocol. A policy engine that operates independent of a data protection client may run as a standalone policy engine server and provides policy decisions and optionally granted rights to one or more data protection clients. A policy engine that operates independent of a data protection client may be an integral part of a policy server.

In an embodiment, a policy engine determines what rights should be granted to information or a document when the information or document is accessed. If an access is associated with a file, rights determination is performed while processing a policy decision request of a file open operation. If an access is associated with information such as a database record, rights determination is performed while processing a policy decision request of a list, open, view, search, or other access operation. If an access is associated with a document such as a web page (e.g., Microsoft SharePoint®), rights determination is performed while processing a policy decision request of a HTTP request. If an access is associated with information such as an object (e.g., a Java object in Dassault Systèmes Enovia™), rights determination is performed while processing a policy decision request of an object. A policy engine needs to determine rights granted to information or a document if policy effect of a policy decision request on access to the information or document is ALLOW. When a user is not given access to information or a document, no right is granted. Trademarks are the property of their respective owners.

In an implementation, an information management system revokes all rights from a user by default. Any right that a user may have is granted through a rights control policy. In another implementation, an information management system grants all rights to a user by default. A right that a user may not have is revoked through a rights control policy.

In an embodiment, a policy engine determines one or more rights granted to a user on information or a document based on a plurality of rights control policies relevant to a policy decision request. The one or more rights granted may be computed based on a first subset of the plurality of rights control policies that grant rights to the user on the information or document and a second subset of the plurality of rights control policies that revoke rights from the user on the information or document.

In an embodiment, a policy engine determines one or more rights granted to a user on information or a document based on a rights control policy relevant to a policy decision request. The one or more rights granted are specified in the rights control policy. The rights control policy specifies at least a view right to allow the user to access the information or document. The rights control policy may specify additional rights including edit, print, send, copy, or others. The policy engine performs one policy evaluation to produce a policy effect and one or more rights granted.

In an embodiment, a policy engine determines one or more rights granted to a user on information or a document based on a plurality of access or use control policies relevant to a policy decision request. The one or more rights granted may be computed based a first subset of the plurality of access or use control policies that allow or deny the user access to the information or document and a second subset of the plurality of access or use control policies that allow or deny the user to perform an operation on the information or document. In an example, if an access control policy allows a user to open a document, a policy engine grants a view right to the user on the document. In another example, if a use control policy allows a user to print a document, a policy engine grants a print right to the user on the document. In effect, a policy engine translates access or use control policies to one or more rights granted to a user on information or a document.

In an embodiment, a policy engine determines one or more rights granted to a user on information or a document based on a plurality of rights control policies, a plurality of access policies and a plurality of use control policies relevant to a policy decision request. The one or more rights granted may be computed based a first subset of the plurality of rights control policies that grant rights to the user on the information or document, a second subset of the plurality of rights control policies that revoke rights from the user on the information or document, a first subset of the plurality of access control policies that allow or deny the user access to the information or document, and a second subset of the plurality of use control policies that allow or deny the user to perform an operation on the information or document.

To evaluate policies, a policy engine may assume a user has no right to a resource unless a right is granted explicitly by a rights control policy. Sometimes this is referred to as deny-by-default. Deny-by-default may also apply to actions where all operations associated with an action are denied unless an action is allowed explicitly by an access or use control policy. On the contrary, a policy engine may assume a user has all rights to a resource unless a right is revoked explicitly by a rights control policy. Sometimes this is referred to as allow-by-default. Allow-by-default may also apply to actions where all operations associated with an action are allowed unless an action is denied explicitly by an access or use control policy. Alternatively, a policy engine may assume a user has a pre-defined set of rights to a resource by default. The pre-defined set of rights may be specified through configuration or hard-coded into a policy engine. Similarly, a policy engine may assume a user is allowed to perform a pre-defined set of actions by default.

A policy enforcement point (PEP) of a data protection client intercepts application program or system operations (or events or actions; e.g., invoking a function in an application program and operating on data in an application program) that may be subject to information or documents access or use control. A PEP that supports rights enforcement locally examines its cached rights to determine if it has sufficient information to process an intercepted operation. If the PEP has cached rights (e.g., granting VIEW and PRINT, revoking COPY) on a user, information or a document and an application program that is provided by a previous query to a policy engine, it may have the information needed to decide if an intercepted operation (e.g., printing to a printer) should be allowed or denied. In the case where an intercepted operation is covered by the rights being cached at the PEP, the PEP performs enforcement action without querying a policy engine. If the PEP does not have any cached rights covering the intercepted operation, the PEP makes a request to a policy engine to obtain a policy decision. The context of the intercepted operation is provided by the PEP to the policy engine so that the policy engine may evaluate policies relevant to the context of the intercepted operation. A policy decision determined in policy evaluation is communicated back to the PEP.

In both cases where the PEP makes a policy decision based on cached rights and the PEP obtains policy decision by querying a policy engine, the PEP uses its application-specific or system-specific logic (or code) to carry out enforcement function and effect rights implementation. The policy effect of a policy decision may be ALLOW or DENY. If a policy effect is ALLOW, the PEP allows the intercepted operation logic to execute to completion. If a policy effect is DENY, the PEP terminates the intercepted operation (i.e., operation logic is not executed) and returns an error status to indicate access is denied.

A policy engine is an execution unit that processes and executes policies or rules to produce policy decisions. A policy engine takes the data collected by an interceptor, historical data from prior interceptions, configuration and environment data, data entered by a user, some other data, or any combination thereof, and applies the policy rules supplied by the policy server to the data to produce a consequence (sometimes referred to as policy decision). A consequence may include an effect (also referred to as a policy effect in this document, e.g., ALLOW, DENY, evaluate another policy, query user, or call a custom effect handler) and optionally one or more obligation or remediation tasks. The use of historical data in policy evaluation is optional. As part of a policy evaluation process, a policy engine may decide that it needs to obtain input form a user before it may proceed with (or complete) a policy evaluation. At that time, a policy engine may invoke a user interface element to query the user for input. For example, such input is related to classifying a document (which produces document attribute values) that is required to complete a policy evaluation.

Also, as part of the policy evaluation process, a policy engine may decide that it needs to obtain document classification information in order to complete policy evaluation. The process of obtaining document classification information may involve retrieving stored document classification data; dynamically invoking a document classification engine to classify a document; or querying a user to enter document classification.

A policy engine optionally performs one or more obligation tasks, performs one or more remediation tasks, invokes a custom effect handler, or a combination of these, if one is defined in a policy. The implementation of a policy engine is policy system architecture specific. Depending on what policy system architecture is selected, the implementation of a policy engine may vary significantly. Some examples of policy system architectures include distributing a full set of centralized policies to a data protection client; distributing a subset of centralized policies to a data protection client; organizing centralized policies based on the type of data protection client the policies target; using centralized policies defined in XACML format; or using centralized policies defined in ACPL format that uses a declarative approach to policy specification.

A policy engine may run in a process separate from a data protection client. The policy decision process and data protection client may run on the same computer or on separate computers.

In an embodiment, a data protection client instruments an application program, intercepts an operation of the application program, evaluates a subset of policies according to the operation, information or a document being accessed (e.g., opening of file) or used (e.g., copy content in a document), and a user or user account operating the application program to produce a policy decision, enforces the policy decision from policy evaluation by allowing or denying access to or use of the information or document, and optionally implements one or more policy obligations according to the policy decision.

A data protection client may instrument an application program or operating system using one of application plug-in, code injection, operating system management interface, operating system service provider, device driver, or others. Some examples of application plug-ins include Microsoft® Word add-in, Microsoft Excel® add-in, Microsoft PowerPoint® add-in, Microsoft Outlook® add-in, Microsoft Internet Explorer® add-in, Microsoft Windows® File Explorer add-in, Adobe Reader® plug-in, Adobe Acrobat® plug-in, Mozilla Firefox® add-on, Google Chrome™ plug-in, or many others. An example of an operating system service provider is Microsoft® WinSock Service Provider. Techniques on instrumenting application program or operating system are described in details in U.S. patent application Ser. No. 11/383,159, filed May 12, 2006 and Ser. No. 11/615,477, filed Dec. 22, 2006, which are incorporated by reference.

An operation of an application program (sometimes referred to as application program operation) includes an event or a notification generated in the application program, or a function invoked in the application program. Examples of application program operations include opening of a file, copying content in a document, sending an e-mail message, sending a document as an attachment of an e-mail message, saving a document in a different document format, printing a document, or many others.

For a policy effect, an access, use, or rights control policy effect is one of ALLOW or DENY. A policy effect for a monitoring policy is always ALLOW. Other types of policies may support different sets of policy effects. Examples of enforcing access control policy effects include allowing opening a file, denying opening a file, allowing opening of a web page, denying display of a document list on a SAP® client application, and many others. Trademarks are the property of their respective owners. Examples of enforcing use control policy effects include denying copying content in a document, denying sending an e-mail message with a document attached, and many others. Examples of enforcing rights control policy effects include denying printing of content in a document, denying sending of document as an e-mail attachment, denying copying of a document, and many others.

A policy obligation is a task to be performed by a data protection client when a policy specifying the policy obligation is in the subset of policies being evaluated and invocation condition of the policy obligation is satisfied. A policy obligation is an optional element of a policy. A policy evaluation may not produce a policy obligation. Some examples of policy obligations include: a log policy obligation that logs data to a log server; an automatic tagging policy obligation that inserts one or more document attributes into a document; an interactive tagging policy obligation that queries a user to enter one or more document attributes and inserts the one or more document attributes into a document; a strip attachment policy obligation that removes an attachment from an e-mail message; an encryption obligation that encrypts a document and saves the encrypted document in a managed document container; a security overlay obligation that renders a security marker on top of content of a document; or many others.

To control information or document access and use, a data protection client may control user interface elements such as visual and input elements of an application program, commands and functionalities of an application program and information presented to a user. Examples of visual elements of an application program include menu, menu item, button, list box, list item, check box, tab, scroll bar, slider, icon, image, or hypertext link. Examples of input elements of an application program include key event handler, mouse event handler or event handler associated with another visual element.

An application program may support a large number of commands. A command may be invoked by selecting a menu item, pressing a button (shown on a screen), pressing one or more keys or pressing one or more mouse buttons. A command may also be invoked by a macro or script or invoked by a code module that calls a function (or method) in an application program interface (API) library. For example, a command may perform a task such as opening a file, sending an e-mail message, editing a cell in a spreadsheet, editing a macro, changing text format, or others.

Figure 4:
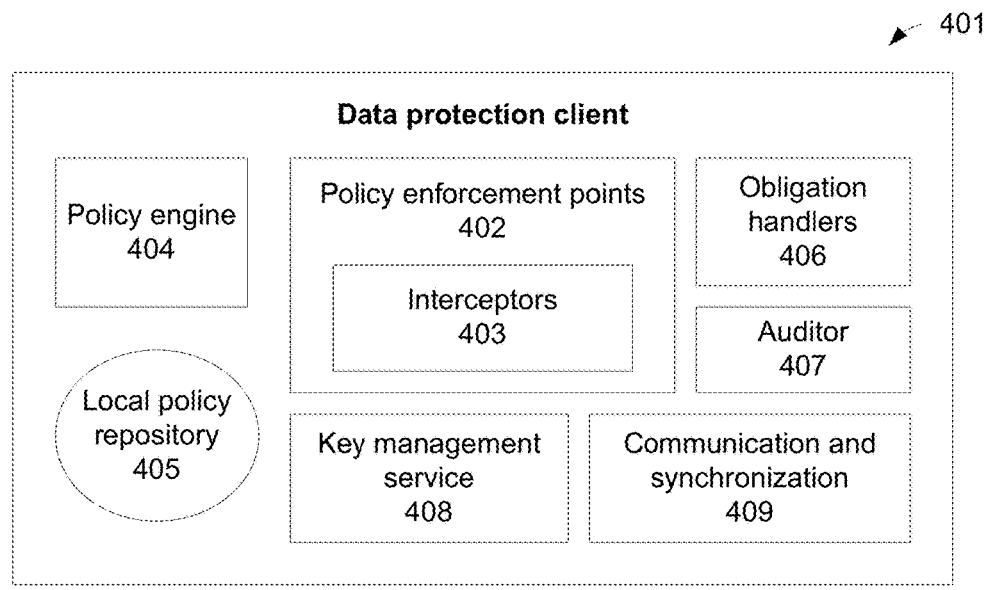
FIG. 4 shows a block diagram of a data protection client.

FIG. 4 shows a block diagram of a data protection client 401. A data protection client may have one or more policy enforcement points (PEPs) 402 which intercept application program or operating system operations and implement policy effects. A PEP may have one or more interceptors 403. Typically, an interceptor runs in an application program instance (e.g., a process) or operating system kernel. When an interceptor of a PEP intercepts an application program or operating system operation, the PEP queries a policy engine 404 with the intercepted operation and information relevant to the intercepted operation for a policy decision.

The policy engine selects a first subset of policies from a plurality of policies in a local policy repository 405 that is relevant to the intercepted operation and evaluates the first subset of policies to produce a policy decision. The plurality of policies in the local policy repository is centralized policies distributed from a policy server. The policy engine may evaluate discretionary policies, optionally. Discretionary policies are stored in a managed document container may be evaluated in additional to centralized policies to produce a policy decision. In an implementation, a policy engine evaluates centralized policies to produce a policy decision. In another implementation, a policy engine evaluates discretionary policies to produce a policy decision. In yet another implementation, a policy engine evaluates centralized and discretionary policies to produce a policy decision.

The policy decision includes a policy effect ALLOW or DENY, and optional policy obligations. A policy obligation is a task to be carried out by a data protection client and it is an optional element of a policy. If a policy effect is ALLOW, the policy engine returns policy effect ALLOW to the PEP. The PEP implements a policy effect ALLOW by allowing the intercepted operation to execute to completion. If a policy effect is DENY, the policy engine returns policy effect DENY to the PEP. The PEP implements a policy effect DENY by blocking the intercepted operation.

If the policy decision produces a policy obligation, a corresponding obligation handler is invoked to carry out the policy obligation. A data protection client may implement one or more obligation handlers 406. Obligation handler is an optional component of a data protection client.

In an implementation where a data protection client supports rights enforcement, a policy engine may produce a plurality of rights granted to a user on a resource (e.g., document) to a PEP when it processes an access query on the resource (e.g., opening a file). By providing a PEP with a plurality of rights granted, a data protection client empowers the PEP to process subsequent interceptions based on the plurality of rights granted without querying the policy engine for policy decisions. In an implementation, a policy engine produces a plurality of rights granted based on the first subset of policies. In another implementation, a policy engine selects a second subset of policies from the plurality of policies in the local policy repository based on the user and the resource and analyzes the second subset of policies to produce the plurality of rights granted. In yet another implementation, a PEP may make addition queries to a policy engine on a plurality of rights of interest to a PEP to compose a plurality of rights granted to a user on a resource. In yet another implementation, a plurality of rights granted to a user on a resource is composed based on a subset of centralized policies and a plurality of discretionary policies associated with information or a document.

Analyzing a policy refers to the process of inspecting a policy to determine one or more rights the policy grants to a user on a resource. The analysis assumes that the user has no right to the resource initially. When an analysis involves a plurality of policies, combining the one or more rights each policy grants to a user on a resource produces a plurality of rights granted to a user on a resource. If a policy being analyzed is a rights control policy, the policy may grant a right to a user on a resource or revoke a right from a user on a resource. If a policy being analyzed is an access or use control policy, the policy may allow or deny an action by a user on a resource. The allow or deny action is further translated into one or more rights; or multiple allow or deny actions are combined to form a right.

An auditor 407 logs interceptions and policy evaluations at a data protection client. It also gathers additional information on computing environment that may be used in an audit, performance analysis, or diagnosis. An auditor typically caches log data locally so that it may continue to operate while a client computer is offline. Log data is transmitted to a central log server (or report server) when a client computer is online. The log data collected in a log server may be used to analyze information or documents usage pattern, analyze policy effectiveness, identify threats, generate alerts, or produce reports.

A key management service (also referred to as encryption key management service) 408 manages encryption keys at a data protection client. Functions of a key management service include encryption key generation, encryption key lookup with a key management server, encryption key caching, encryption key expiration, encryption key revocation, or more. A key management service requests encryption keys from a key management server (also referred to as encryption key management server), caches encryption keys locally and releases encryption keys to an encryption service module. To determine if a process is to be trusted with decrypted information or document, a key management service checks a policy evaluation cache for a recent policy evaluation on the information or document by a user (i.e., a user the process is running under) where policy effect is ALLOW. If a matching policy evaluation is found, the key management service trusts the process with decrypted information or document and releases an encryption key to an encryption service module to decrypt the information or document. Key management server is described in details in U.S. patent application 61/368,408, filed Jul. 28, 2010, which is incorporated by reference.

A communication and synchronization module 409 is responsible for transmitting policy updates from a policy server to the local policy repository and log data from an auditor to a central log server.

To access managed document containers, a data protection client may employ a container service module. A container service module provides a data protection client access to document attributes and discretionary policies stored in a managed document container. A container service module also allows transparent access to a document stored in a managed document container by an application program.

To provide persistent protection to information or documents while it is at rest, in motion or in distribution, an encryption service module may be employed. An encryption service module encrypts information or documents or decrypt encrypted information or documents. When an encryption service module is deployed with a data protection client, the data protection client provides encryption keys to the encryption service module.

In an embodiment, a data protection client controls access to encryption keys of encrypted information or documents. When a user accesses an encrypted information or document, a data protection client intercepts an open operation in an application program and queries a policy engine for a policy decision on the open operation. The policy engine selects a subset of policies from a plurality of policies distributed by a policy server (i.e., centralized policies) to determine if the open operation should be allowed. The policy engine selects the subset of policies based on the open operation, the user, and one or more attributes of the encrypted information or document. The subset of policies being evaluated is not specified in the encrypted information or document. The policy engine may evaluate discretionary policies in additional to centralized policies to produce a policy decision, optionally. If the open operation is allowed, the data protection client releases an encryption key to an encryption service module of the information management system to decrypt the encrypted information or document.

Unlike many digital rights management (DRM) or information rights management (IRM) systems where access control rules are specified in an encrypted document (e.g., IRM for Microsoft® Office) by an author of the encrypted information or document, the present invention authorize access according to centrally administered policies (i.e., centralized policies) and optionally discretionary policies. Also unlike many DRM or IRM systems based on a licensing model where access is allowed when a license file is present on a client computing device, the present invention authorizes access according to centrally administered policies and optionally discretionary policies. Trademarks are the property of their respective owners.

A data protection client may protect information or a document in place, or protect information or a document while the information or document is stored inside a managed document container. A policy may specific information or a document to be stored in a managed document container the first time when the information or document is being saved. For example, a policy may instruct a data protection client to store information or a document in a managed document container when the information or document is created and based on who is the author, location of information or a document being saved, classifications of the information of document, type of computing device or storage the information or document is being saved on, or more. A user may also instruct a data protection client to store information or a document in a managed document container.

A policy may query a user to enter classifications of information or a document when the information or document is created or saved the first time. Alternatively, a policy may instruct a data protection client to analyze content in information or a document to determine its classifications before the information or document is saved. A data protection client may also query a user for classifications of information or a document and stores the classifications in a managed document container along with the information or document.

In an embodiment, a data protection client supports rights enforcement at a policy enforcement point, the policy enforcement point may cache a plurality of rights on information or a document provided by a policy engine when the information or document is accessed (or opened) and use the plurality of rights to enforce subsequent application program operations on the information or document covered by the plurality of rights without querying the policy engine thereby improving performance of the data protection client. In addition, with the knowledge of what rights a user has on the information or document, a policy enforcement point may modify user interface or program code of an application program in advance to prevent the user or the application program from performing operations that are not allowed by the plurality of rights provided by the policy engine and allow the user or the application program to perform operations that are allowed by the plurality of rights provided by the policy engine.

A data protection client that supports rights control policies typically evaluates rights control policies relevant to a user and information or a document when the user opens the information or document. If a policy enforcement point requests a policy engine to make a policy decision on an attempt to open information or a document by a user, the policy engine evaluates a first subset of policies relevant to the information or document and the user to determine if the open operation should be allowed. If the open operation is allowed, the policy engine further evaluates a second subset of rights control policies relevant to the information or document and the user to determine a plurality of rights the user has on the information or document. Subsequently, the policy engine returns policy effect ALLOW along with the plurality of rights to a policy enforcement point.

Unlike an access control policy or use control policy which specifies what policy effect should be enforced when a user takes a particular action on a resource, a rights control policy declares what rights a user has on a resource. Further, an access control policy or use control policy is evaluated to determine what policy effect to enforce when an associated action is intercepted. A rights control policy is evaluated when a user access a resource, and the evaluation determines a plurality of rights the user has on the resource. If a user is allowed to access the resource, the plurality of rights is passed to a policy enforcement point so that the plurality of rights may be implemented at the policy enforcement point without further policy evaluation.

In an implementation, a policy engine returns a policy effect and a plurality of rights granted to a user on information or a document when it processes an access (or open) operation by the user on the information or document and the policy effect on the open operation is ALLOW. In another implementation, a policy engine returns only a policy effect when it processes an access (or open) operation on information or a document by a user. If the policy effect is ALLOW, a data protection client queries the policy engine a second time for a plurality of rights granted to the user on the information or document, or the data protection client queries the policy engine on each right of interest to it.

Enforcing rights control policies at a data protection client is similar to enforcing access or use control policies. Enforcement of access or use control policies is described in details in U.S. patent application Ser. No. 11/615,477, filed Dec. 22, 2006 and U.S. patent applications aforementioned and incorporated by reference. Rights, access or use control policies enforcement starts with intercepting application program or operating system operations. Typical enforcement actions are ALLOW and DENY. Unlike access or use control policies enforcement, rights control policies enforcement on some operations may be carried out without performing policy evaluation at a policy engine. For example, controlling access to and use of a document begins with intercepting a file open operation on the document. Once a user (or an application program acting on behalf of a user) is allowed to open a document, a data protection client continues to protect use of content of the document by intercepting subsequent application program operations on the opened document. With access or use control policies, enforcing an application program operation requires a policy engine to evaluate policies to produce a policy decision.

Whereas with rights control policies, a policy engine may compute a plurality of rights granted to a user on a document using rights control policies when the policy engine processes a file open operation and decides the user is allowed to open the document. With a plurality of rights provided by the policy engine, the data protection client may enforce many application program operations related to use of content of the opened document without querying a policy engine for policy decision.

In an embodiment, a content access governor is a specific implementation of a data protection client. A content access governor controls access or use of information or documents managed by an application server. In an example, a content access governor makes access control decision for a Microsoft SharePoint® application server when a user downloads a document on the application server. In another example, a content access governor provides access control decision and content filtering policy obligation to a SAP® ERP application server when a user views product and manufacturing information (PMI). Access control decision allows or denies the user access to a PMI page, while content filtering policy obligation removes information on a PMI page that a user is not privileged to before the PMI page is presented to the user. In yet another example, a content access governor provides access control decision, plurality of rights granted to a user on a protected document, plurality of policy obligations and encryption key to decrypt the protected document, to a secured viewing server (discussed further below) when the user opens the protected document in a document repository. Trademarks are the property of their respective owners.

A content access governor may communicate with one or more application servers. Alternatively, an application server may communicate with one or more content access governors. A content access governor may run on the same computer as an application server. A content access governor and an application server may run on separate computers. A content access governor may be a component of an application server. Application servers that may be benefited from the rich features of a content access governor include Microsoft SharePoint®, SAP® application servers, Dassault Systèmes Enovia®, NextLabs® secured viewing server, or many others. Trademarks are the property of their respective owners.

Figure 5:
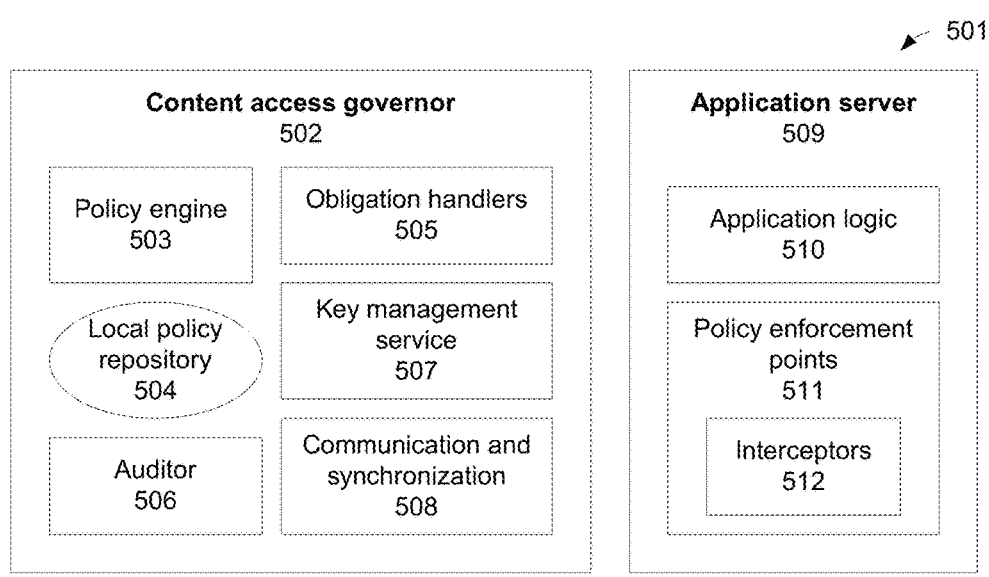
FIG. 5 shows a block diagram of a content access governor.

FIG. 5 shows a block diagram of a content access governor 502 implementing the functionalities of a data protection client 401. An application server 509 implements application logic 510 that performs one or more application program operations. Some examples of application program operations that may be intercepted include HTTP request, SOAP request, REST request, request using other communication protocol, opening or downloading a document, uploading a document, updating information on an application server, or others. Interceptors 512 of policy enforcement points 511 are installed or implemented in the application server to intercept the application program operations. When a user requests information or a document on an application server, an interceptor of a policy enforcement point in the application server intercepts the request. The policy enforcement point collects information relevant to the request (e.g., user identifier, information identifier, document name or document classification) and queries a content access governor with the request and information collected. The policy enforcement point may send discretionary policies to the content access governor, optionally, if there are discretionary policies associated with the information or document.

A policy engine 503 of the content access governor selects a subset of policies from a plurality of policies in a local policy repository 504 relevant to the request. The plurality of policies is distributed from a policy server (i.e., centralized policies). The policy engine evaluates the subset of policies to determine if the request is allowed. The policy engine may evaluate discretionary policies in additional to centralized policies, optionally, to determine if the request is allowed. In an implementation, a policy engine evaluates centralized policies to produce a policy decision. In another implementation, a policy engine evaluates discretionary policies to produce a policy decision. In yet another implementation, a policy engine evaluates centralized and discretionary policies to produce a policy decision. If the request is allowed, the policy engine returns a policy effect ALLOW to the application server along with one or more policy obligations if any is produced during policy evaluation. The application server processes the request and invokes obligation handlers 505 to implement the one or more policy obligations before returning the information or document to the user. If the request is denied, the policy engine returns a policy effect DENY to the application server. The application server denies the user access to the information or document.

Optionally, in an implementation, the policy engine may determine a plurality of rights granted to the user on the information or document and returns the plurality of rights granted along with policy effect ALLOW and one or more policy obligations. The application server takes additional actions to apply the plurality of rights granted to the information or document before returning the information or document to the user. In another implementation, the policy enforcement point makes additional queries to the content access governor to obtain a plurality of rights granted to the user on the information or document. In yet another implementation, a plurality of rights granted to a user on a resource is composed based on a subset of centralized policies and a plurality of discretionary policies associated with information or a document. The application server takes additional actions to apply the plurality of rights granted to the information or document before returning it to the user.

An auditor 506 logs policy evaluations and related information in a local cache and sends log data in local cache to a log server when a content access governor is online. The log data may be used in reporting, auditing, diagnostics and other purposes.

A key management service 507 handles encryption key requests from an application server. An application server may request an encryption key to encrypt or decrypt information or a document. Encryption keys are stored in a key management server and cached in a key management service. An encryption key is identified by an encryption key identifier. An encryption key identifier is typically stored in a managed document container. A key management service looks up an evaluation result cache or queries the content access governor to determine if a user is allowed to access a document before releasing an encryption key to an application server.

A communication and synchronization module 508 is responsible for communicating with a policy server to update policies in a local policy repository and a log server to upload log data.

In an embodiment, a rights managed application is an application program that implements information and document protection functionalities described in this document. The information and document protection functionalities are built into a rights managed application. A rights managed application implements the functionalities of a data protection client 401 which protect information or a document from unauthorized access or use. When a rights managed application performs an operation (or application program operation) that accesses or uses information or a document, it sends the operation along with information relevant to the operation to a policy engine to perform policy evaluation. A decision from policy evaluation typically includes a policy effect ALLOW or DENY and optional policy obligations. An example of a rights managed application is NextLabs® Rights Management Client for iOS or SkyDRM®.

A rights managed application is a managed application program. While a data protection client such as a rights management client instruments an existing application program to intercept application program operations, enforce policy effects and implement policy obligations; a rights managed application integrates interceptions, enforcements and policy obligation handling in its application logic so the instrumentation step is not needed.

A rights managed application has its limitation. A rights managed application may not protect information or documents being accessed in another application program. It may not share resources such as local policy repository or log cache with another rights managed application on the same computing device. A rights managed application requires less resources to operate and runs better in a resource constrained environment (e.g., limited memory, computation of battery power) than a rights management client because it is tailored to an application program. For example, a mobile app that requires information or document protection may implement the functionalities of a rights managed application. A mobile app is an application program running on a mobile operating system such as Apple® iOS, Google Android™, or others.

Figure 6:
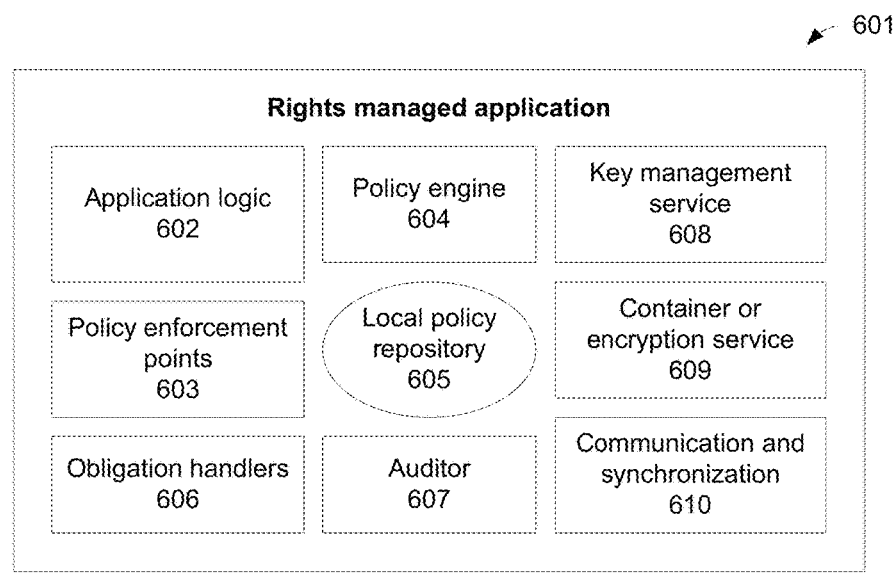
FIG. 6 shows a block diagram of a rights managed application.

FIG. 6 shows a block diagram of a rights managed application 601. Application logic 602 (also referred to as application program logic) implements application program features or functionalities and one or more policy enforcement points 603 (PEPs) that controls access to and use of information or documents. The application logic makes a function call to a PEP at a control point in the application logic. A control point is typically a location in program code immediately before the program code performs an application program operation. If the PEP returns a policy effect ALLOW (e.g., returns true to a function call), the application program operation is carried out one or more optional policy obligation may be performed. If the PEP returns a policy effect DENY (e.g., returns false to a function call), the application program operation is not carried out.

When the application logic calls the PEP, the PEP queries a policy engine 604 with information relevant to the application program operation for a policy decision. The policy engine selects a first subset of policies from a plurality of policies in a local policy repository 605 that is relevant to the application program operation and evaluates the first subset of policies to produce a policy decision. The plurality of policies in the local policy repository is centralized policies distributed from a policy server. The policy engine may evaluate discretionary policies, optionally. Discretionary policies are stored in a managed document container and they may be evaluated in additional to centralized policies to produce a policy decision. In an implementation, a policy engine evaluates centralized policies to produce a policy decision. In another implementation, a policy engine evaluates discretionary policies to produce a policy decision. In yet another implementation, a policy engine evaluates centralized and discretionary policies to produce a policy decision. A policy decision includes a policy effect ALLOW or DENY, and optional policy obligations. A policy obligation is a task to be carried out by a rights managed application and it is an optional element of a policy.

If a policy effect is ALLOW, the policy engine returns a policy effect ALLOW to the PEP and the PEP returns the policy effect to the application logic. The application logic implements a policy effect ALLOW by allowing the application program operation to execute to completion. If a policy effect is DENY, the policy engine returns a policy effect DENY to the PEP and the PEP returns the policy effect to the application logic. The application logic implements a policy effect DENY by not carrying out the application program operation.

If the policy decision produces a policy obligation, a corresponding obligation handler is invoked to carry out the policy obligation. A rights managed application may implement one or more obligation handlers 606. Obligation handler is an optional component of a rights managed application.

In an implementation where a rights managed application supports rights enforcement, a policy engine may produce a plurality of rights granted to a user on a resource (e.g., document) to a PEP when it processes an access query on the resource (e.g., opening a file). By providing a PEP with a plurality of rights granted, a rights managed application empowers the PEP to process subsequent interceptions based on the plurality of rights granted without querying the policy engine for policy decisions. In an implementation, a policy engine produces a plurality of rights granted based on the first subset of policies. In another implementation, a policy engine selects a second subset of policies from the plurality of policies in the local policy repository based on the user and the resource and analyzes the second subset of policies to produce the plurality of rights granted. In yet another implementation, a PEP may make addition queries to a policy engine on a plurality of rights of interest to a PEP to compose a plurality of rights granted to a user on a resource. In yet another implementation, a plurality of rights granted to a user on a resource is composed based on a subset of centralized policies and a plurality of discretionary policies associated with information or a document.

An auditor 607 logs interceptions and policy evaluations at a rights managed application. It also gathers additional information on computing environment that may be used in an audit, performance analysis or diagnosis. An auditor typically caches log data locally so that it may continue to operate while a client computer is offline. Log data is transmitted to a central log server (or report server) when a client computer is online. The log data collected in a log server may be used to analyze information or documents usage pattern, analyze policy effectiveness, identify threats, generate alerts, or produce reports.

A key management service 608 manages encryption keys at a rights managed application. Functions provide by a key management service include encryption key generation, encryption key lookup with a key management server or rights management server, encryption key caching, encryption key expiration, encryption key revocation, or more. A key management service requests encryption keys from a key management server or rights management server, caches encryption keys locally and releases encryption keys to a container or encryption service. A container or encryption service 609 provides a rights managed application access to document attributes and discretionary policies stored in a managed document container. A container or encryption service may encrypt information or documents or decrypt encrypted information or documents.

A communication and synchronization module 610 is responsible for transmitting policy updates from a policy server to the local policy repository and log data from an auditor to a central log server. A communication and synchronization module may communicate with a policy server or a log server directly or indirectly through a rights management server.

A rights managed application may also implement a document access module. A document access module may access a document repository directly or through a rights management server (described further below). The functions performed by a document access module includes obtaining a directory listing from a document repository or a rights management server; downloading a document from a document repository directly or through a rights management server; uploading a document from a document repository directly or through a rights management server; or more.

In an embodiment, a secured viewing server enables viewing of a protected document in a web browser on a computing device without the presence of a data protection client. Access, use or rights control policies applied to a user on a protected document are enforced while the protected document is displayed in a web browser. The access, use or rights control policies may be centralized policies, discretionary policies or combination of both. A web browser communicates with a secured viewing server using HTTPS protocol to ensure a protected document is protected while it is in transit. To protect the protected document while it is displayed in a web browser, features or functionalities of a web browser that are not conforming to access, use or rights control policies are disabled. If a security overlay policy obligation is specified in a policy, one or more text, graphics or image pattern is rendered on top of (or over) a protected document in a web browser. A security overlay is typically semi-transparent so that content of a protected document under the security overlay remains visible to a user.

Figure 7:
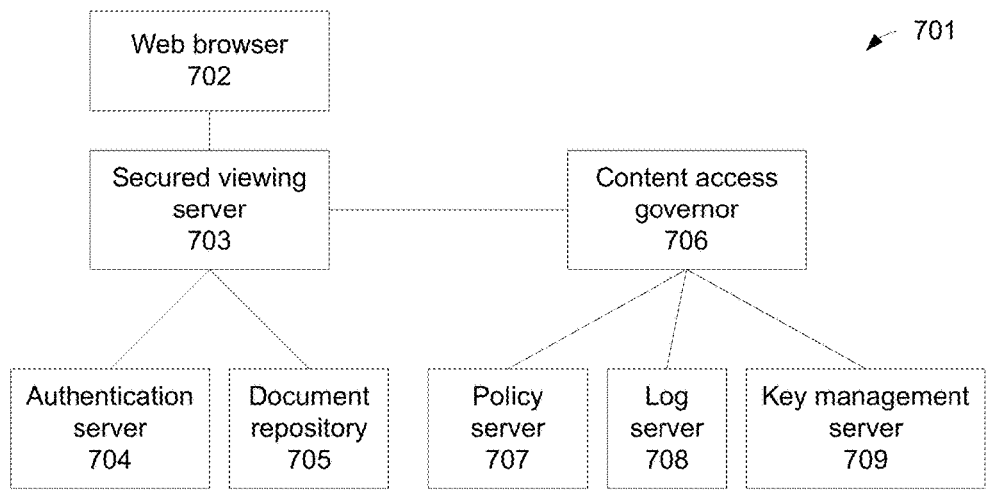
FIG. 7 shows a system diagram of a secured viewing server deployment.

FIG. 7 shows a system diagram 701 of a typical secured viewing server deployment. A user using a web browser 702 on a computing device to log in to a secured viewing server 703. The secured viewing server queries an authentication server 704 to authenticate the user. Authentication may be performed using existing directory services in an organization to authenticate a user; or directory services dedicated to a secured viewing server or an information management system. Examples of authentication servers include Microsoft Active Directory®, OpenLDAP, Apple® Open Directory, IBM Tivoli® Directory Server, or others. If authentication fails, further access to the secured viewing server by the user is not allowed. If authentication succeeds, the user may open a protected document in a document repository 705 but access to the protected document is subject to control of access, use or rights control policies.

A document repository may be a file server, document management system, application server, intranet or Internet file store, cloud storage, or others. Examples of document repositories include Microsoft Windows Server® implementing a network file store, Microsoft SharePoint®, SAP® application server, Dassault Systèmes Enovia®, Dropbox™, Apple® iCloud, Amazon S3®, Microsoft® SkyDrive, Microsoft® OneDrive, Google Drive™, or others.

To implement policy control, the secured viewing server queries a content access governor 706 on a file open operation when a user opens a protected document. The secured viewing server includes information such as the protected document and the user in a query. The content access governor evaluates a subset of policies in a local policy repository relevant to file open operation, the protected document and the user to determine if the user is allowed to open the protected document. The policies in a local policy repository are distributed from a policy server 707. If the user is allowed to open the protected document, the content access governor determines a plurality of rights granted to the user on the protected document and optional one or more policy obligations to be applied and returns them to the secured viewing server. In another implementation, a secured viewing server may query the content access governor one or more times to determine the plurality of rights granted and one or more policy obligations to be implemented. The one or more policy obligations to be implemented are optional. The content access governor returns a policy effect ALLOW and the one or more policy obligations. A policy obligation is produced only if a policy the content access governor evaluates specifies a policy obligation. If the user is not allowed to open the protected document, the content access governor returns a policy effect DENY to the secured viewing server. The securing viewing server responses to the web browser requesting the protected document with an error message. The content access governor logs policy evaluations along with relevant information to a log server 708.

If policy effect is ALLOW, the secured viewing server opens the protected document. If the protected document is encrypted, the secured viewing server queries the content access governor for an encryption key providing an encryption key identifier obtained from the protected document. The content access governor returns an encryption key to the secured viewing server if an encryption key matching the encryption key identifier is cached locally. Otherwise, the content access governor queries a key management server 709 for an encryption key with the encryption key identifier. The encryption key returned from key management server is returned to the secured viewing server. The secured viewing server decrypts the protected document using the encryption key obtained from the content access governor. In an implementation, a secured viewing server downloads a protected document to a local document cache before opening the protected document.

When it is necessary, the secured viewing server converts the protected document into a data format suitable for rendering in a web browser and at the same time the converted document is made conformed with the plurality of rights granted and optionally implements the one or more policy obligations. In an implementation, a protected document is converted into a static HTML document. In another implementation, a protected document is converted into one or more raster images (or bitmaps). For example, each page of a protected document is converted into one raster image. In yet another implementation, a protected document is converted into a video stream and the video stream is streamed to a web browser. In yet another implementation, a protected document is converted into vector graphics format suitable for rendering in a web browser. A vector graphics format may be used to render a 2D or 3D CAD drawing. Examples of vector graphics formats include Mozilla Foundation® WebGL, Java OpenGL, Adobe® Stage3D, or others. WebGL is a JavaScript API for rendering interactive 3D graphics and 2D graphics in a web browser. Trademarks are the property of their respective owners.

When the secured viewing server constructs a HTML page, it also enforces the plurality of rights granted and optionally implements one or more policy obligations. The HTML page may modify (e.g., enable or disable) web browser features or functions; include HTML, JavaScript or other script code that implements one or more protection features or functionalities; include HTML, JavaScript or other script code that implements one or more policy obligations; or more. Examples of web browser features or functionalities include save, save as, print, export as PDF, copy to clipboard, email this page, send as email, view source, view page info, show properties, inspect elements, or many others. For example, if the plurality of rights granted does not include a print right, the secured viewing server disables the print function in a web browser. If the plurality of rights granted does not include a convert right, the secured viewing server disables save function in a web browser. If the one or more policy obligations include a security overlay policy obligation specifying a text pattern "Top Secret, <user>, <host>, <datetime>", the secured viewing server generates HTML or JavaScript code to render a semi-transparent text pattern on top of a protected document. In an example, the text pattern may produce a text string "Top Secret, John Doe, Desktop 1234, 2015/03/07 03:11 PM".

To enforce the plurality of rights granted to a user on a protected document, a secured viewing server may effect removal of web browser user interface elements; blocking web browser key accelerators, mouse clicks, hand gestures or voice commands; disable web browser caching; or more. Removing web browser user interface elements include removing menu bar, address bar, toolbar, favorite bar, bookmark bar, navigation bar, sidebar, context menu, user interface element that allows a user to perform save, print or send page content in a web browser, or others. Blocking web browser key accelerators include blocking save, print, open a web page in another windows, e-mail a web page, view HTML code of a web page, or others. A secured viewing server may modify web browser features or functionalities via HTML, JavaScript or other script code; or a combination of these. A secured viewing server may disable web browser caching using HTTP or other transport protocol configuration.

A protected document may be converted into a static HTML document or HTML document with a streaming tag that allows all or part of the converted document to be streamed to a web browser. A security overlay policy obligation may be incorporated into a converted document and rasterized at the secured viewing server; or codified in a HTML document and rendered in a web browser. When a protected document is rasterized and delivered to a web browser as raster images, a security overlay may be incorporated into the raster images. Alternatively, security overlay may be rendered by a web browser. When a secured viewing server completes construction of a HTML document that conforms to the plurality of rights granted and optional one of more policy obligations, it sends the HTML document to a web browser. The web browser renders the HTML document, thereby enforcing policies of an information management system.

In an implementation, secured viewing server and content access governor are components of an application program. In another implementation, securing viewing server and content access governor are separate application programs running on a computer or different computers.

Figure 8:
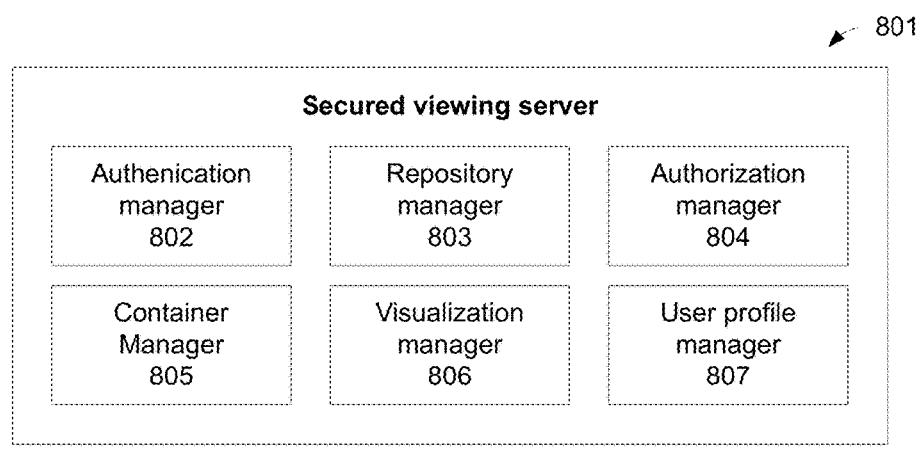
FIG. 8 shows a block diagram of a secured viewing server.

FIG. 8 shows a block diagram 801 of a secured viewing server 703 or 509. A secured viewing server comprises at least six functional components: authentication manager, repository manager, authorization manager, container manager, visualization manager and user profile manager. An authentication manager 802 handles user login and authenticating a user with an authentication server 704. An authentication manager may authenticate a user with an authentication server in an organization or on the Internet. An authentication manager may authenticate a user using multiple authentication servers. An authentication manager may authenticate a first user using a first authentication server and a second user using a second authentication server. An authentication manager may provide its own authentication capability. When authentication is successful, an authentication manager stores the identity of a user in a session and uses the identity in subsequent document access authorizations (i.e., queries to a content access governor). A repository manager 803 communicates with one or more documents repositories. A document repository may be accessible through an intranet or the Internet. A repository manager may obtain listings of protected documents in a document repository. A repository manager may filter a listing of protected documents based on a user. A repository manager may copy or download a protected document from a document repository. A repository manager may maintain a document cache to facilitate streaming of document contents to a web browser.

An authorization manager 804 performs functions of a policy enforcement point 511. When a user attempts to open a protected document, an authorization manager queries a content access governor 706 or 502 with information of the protected document and the user for a policy decision. If the policy decision produces a policy effect ALLOW, the content access governor also provides a plurality of rights granted to the user on the protected document and optional policy obligations to the authorization manager. In an implementation, a content access governor determines a plurality of rights granted to the user on the protected document and optional policy obligations when it processes an open operation (i.e., view right) and returns the plurality of rights granted and optional policy obligations along with policy effect ALLOW. In another implementation, a content access governor returns a policy effect ALLOW on an open operation and a secured viewing server makes additional queries on save, print, or other application program operations to determine the plurality of rights granted and optional policy obligations. In yet another implementation, a secured viewing server makes multiple queries to a content access governor to determine a plurality of rights granted and optional policy obligations. The queries include at least one that determines if a user has a view right to a protected document. If the user has a view right to the protected document, the user is allowed to open the protected document. If the user does not have a view right to the protected document, the user is not allowed to open the protected document. If the policy decision produces a policy effect DENY, the user is not allowed to open the protected document.

A container manager 805 provides access to protected documents. A container manager simplifies access to metadata and content stored in a protected document. A container manager is also responsible for obtaining an encryption key of a protected document from a content access governor and decrypting the protected document. A container manager checks if a protected document is encrypted, if the protected document is encrypted, the container manager retrieves an encryption key identifier form the protected document and queries a content access governor for an encryption key using the encryption key identifier. The container manager uses the encryption key to decrypt the protected document. A content access governor releases an encryption key to a secured viewing server only after it examines its policy evaluation cache and determines that there was a recent evaluation on an open operation (or view right) on the protected document by the secured viewing server and policy effect was allow.

A visualization manager 806 converts a protected document into a data format suitable for rendering in a web browser. A visualization manager also implements or enforces a plurality of rights granted to a user on a protected document and optionally implements one or more policy obligations associated with the plurality of rights granted when it produces a response to a request that opens the protected document. A protected document may be a word processing document, spreadsheet, text file, 2D or 3D CAD drawing, or others. Content of a protected document may be stored in different document formats including Microsoft® Office document formats, Adobe® PDF, AutoCAD® DXF CAD data file format, SAP® VDS and RH CAD data file formats, Siemens® JT and PRT CAD data file formats, or others. Examples of data formats suitable for rendering in a web browser include static HTML, raster image (i.e., bitmap), video stream, vector graphic, or others. Trademarks are the property of their respective owners.

In an implementation, if a protected document is an Adobe® PDF file or a Microsoft® Office document, a visualization manager converts the protected document into a HTML page where content of the protected document is encoded in HTML tags and rendering of the HTML tags by a web browser produces a rendition or visual reproduction of the protected document. In another implementation, if a protected document is an Adobe® PDF file or a Microsoft® Office document, a visualization manager converts the protected document into a HTML page where content of the protected document is delivered to a web browser as pages on separate HTTP or HTTPS requests. Each page may be converted into a raster image, HTML document or fragment, XML document or fragment, JavaScript Object Notation (JSON) object, or other data format. In yet another implementation, if a protected document is a 2D or 3D CAD drawing, a visualization manager converts the protected document into one or more raster images. In yet another implementation, if a protected document is a 2D or 3D CAD drawing, a visualization manager converts the protected document into a vector graphics format that may be rendered in a web browser. A CAD drawing rendered in a web browser may be static or dynamic. A static CAD drawing does not change after it is rendered, whereas a dynamic CAD drawing changes automatically or when a user interacts with the CAD drawing. For example, a dynamic CAD drawing may allow a user to rotate a CAD drawing or drill down to expose more details of a component on the CAD drawing. In yet another implementation, if a protected document is a 2D or 3D CAD drawing, a visualization manager converts the protected document into a vector graphics format that may be rendered by a graphics rendering engine. The visualization manager constructs a HTML page that includes the graphics rendering engine so that the graphics rendering engine will be downloaded to a web browser and subsequently rendering the converted document in the web browser.

Figure 10:
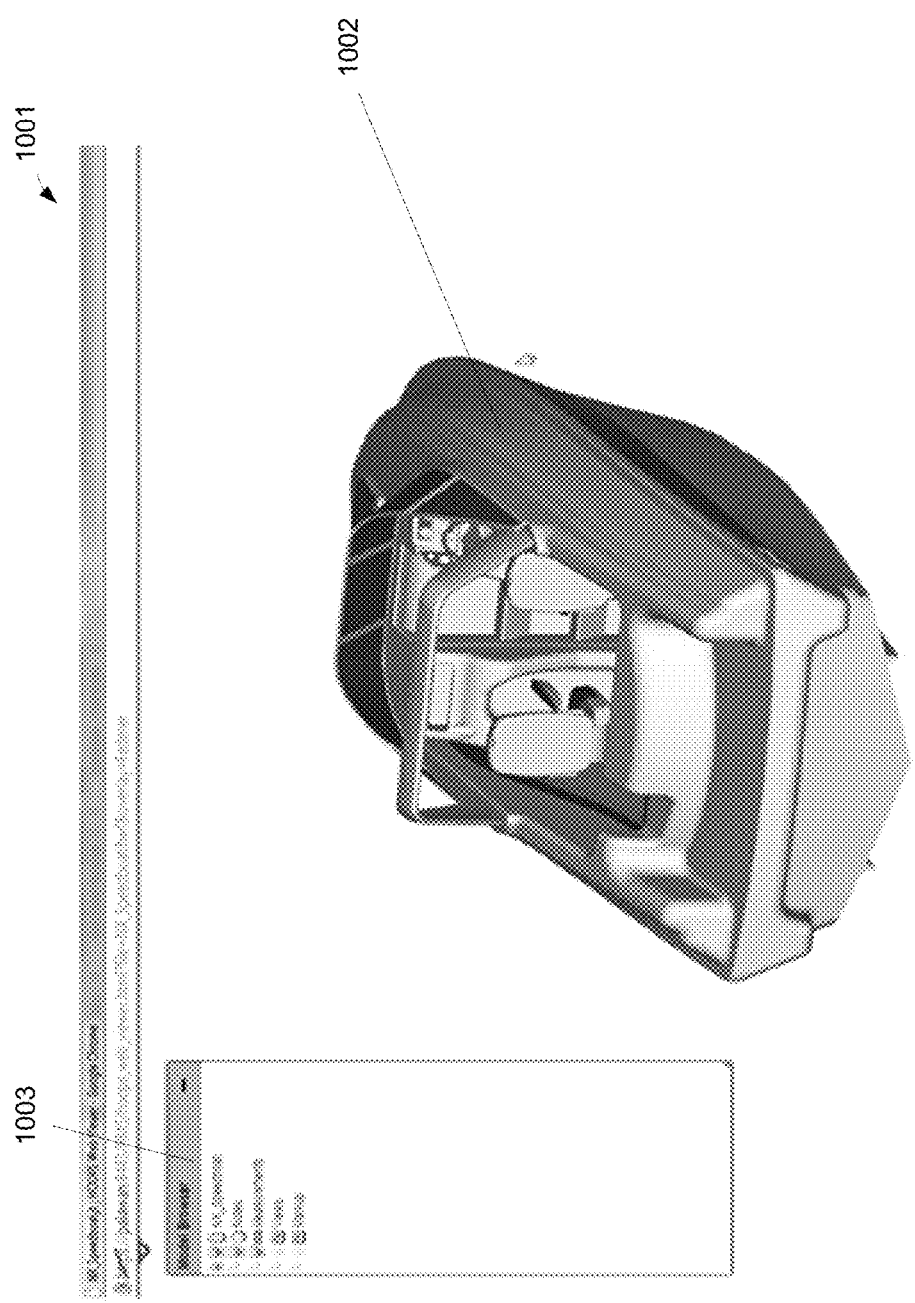
FIG. 10 shows a protected 3D CAD drawing displayed on a Google Chrome™ Web browser.

A visualization manager may incorporate HTML or script code to enable a particular web browser feature or function that is consistent with the plurality of rights granted. A visualization manager may also incorporate HTML or script code to disable a particular web browser feature or function that is not consistent with the plurality of rights granted. A visualization manager may incorporate HTML or script code to remove user interface elements not conformed to the plurality of rights granted. A visualization manager may incorporate HTML or script code to implement navigation or a feature or functionality to conform with the plurality of rights granted. An example of a navigation menu 1003 is shown in FIG. 10 that is described below. HTML or script code may include HTML header, HTML tags, JavaScript code, code in other script languages, or any combination thereof. A visualization manager may use a HTTPS or HTTP response to alter a web browser's behavior. In an example, if the plurality of rights granted does not include a print right (i.e., print operation is not consistent with the plurality of rights granted), a visualization manager produces a HTML document that removes user interface elements and disables key accelerators that allows a user to print a web page.

A visualization manager may implement a security overlay policy obligation by generating program code (i.e., HTML or script) necessary to implement the security overlay policy obligation in a HTML document; or rendering the text, graphics or image pattern specified in the security overlay policy obligation on top of a protected document in a raster image. The program code generated by a visualization manager includes HTML code, JavaScript code, code in other scripting languages, or combination thereof. The program code is implemented by a web browser when a HTML document is loaded in the web browser, thereby implementing a security overlay policy obligation associated with the protected document. If a protected document is rendered by a visualization manager as one or more raster images, the visualization manager may render a security overlay policy obligation into the one or more raster images, thereby implementing a security overlay policy obligation associated with the protected document. A security overlay is typically semi-transparent so that content of a protected document under the security overlay remains visible to a user.

A user profile manager 807 allows user interface, document listing, document repository configuration and other user configurations to be customized in per user basis. Each user is assigned a user profile that contains customization specific to the user. A user profile is stored in a secured viewing server, a directory server or a backend server that manages user identities. A user or an administrator may modify a user profile. When user profiles are stored on a secured viewing server, an administrative user interface is provided by a user profile manager to assist an administrator to manage user and group profiles on a secured viewing server. In an example, a user profile may contain a list of document repositories a user has access to and credentials to access each document repository. The user profile may also specify filters to include or exclude folders (or directories) or documents in a directory listing (e.g., include "/marketing/", exclude "/finance/" or include "*.pdf"). In another example, a user profile may refer to a group profile which is similar to a user profile but specifies what users of a group may access. A group profile simplifies management of user profiles. A user profile may be shared among different clients that a user may use to access protected documents. For example, a user profile stores a customized view of document repositories specific to a user and protected documents recently viewed by the user. When a user views a protected document via a secured viewing server, the user profile is updated. Later on, when the user logs in to a rights managed application, the user profile will be used to customize the view on the rights managed application.

In an implementation, secured viewing server, content access governor and document repository are separate application programs running on separate computers. In another implementation, secured viewing server and content access governor are components of an application program. In yet another implementation, secured viewing server, content access governor and document repository are components of an application program.

Figure 9:
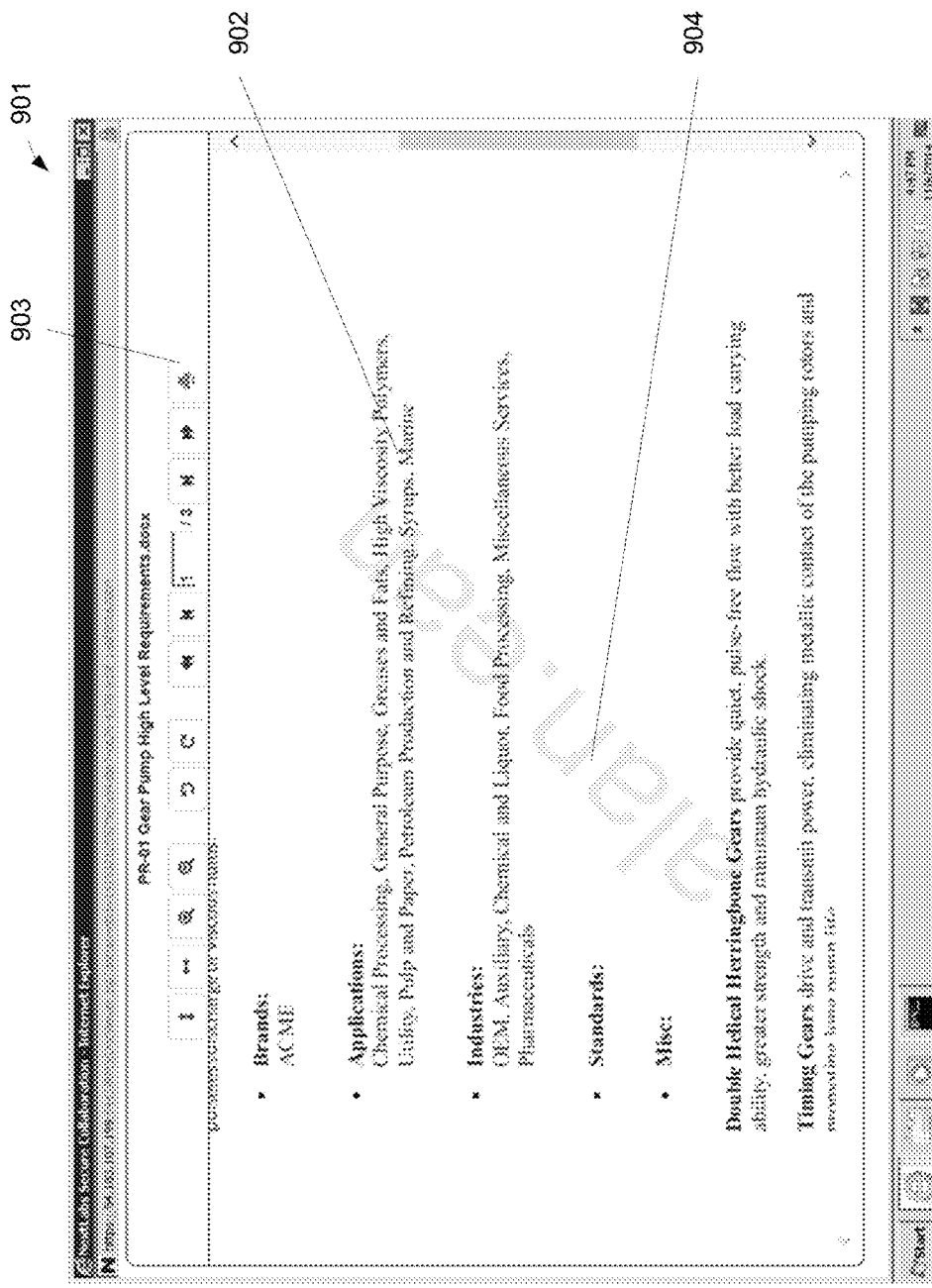
FIG. 9 shows a protected Microsoft® Word document having a security overlay displayed on a Microsoft Internet Explorer® Web browser.

Referring to FIG. 9, a protected document is shown with a security overlay on a web browser 901. The protected document 902 is a Microsoft® Word document and the web browser is Microsoft Windows® Explorer. The menu bar, tool bar, address bar, favorite bar and status bar on the web browser window are removed. A custom navigation bar 903 is created using HTML and JavaScript code within the web browser window for viewing and navigating the protected document. A security overlay 904 consists of user name and classification "alan.ean" is rendered on top of the protected document.

Referring to FIG. 10, a protected document 1002 consists of a 3D CAD drawing is shown on a Google Chrome™ web browser 1001. The menu bar, tool bar, address bar, favorite bar and status bar on the web browser window are removed. A viewing option panel 1003 labeled Model Browser allows a user interactively control different views, different levels of details and visibility of different types of data in the protected document. Examples of different types of data include measurements, notes, markups, product and manufacturing information, or others. A user may also rotate the object in the CAD drawing to view the object from different vintage points.

In an embodiment, a rights management server is a communication and integration hub of an information management system. A rights management server provides services to a plurality of rights managed applications including communication, policy translation and document repository integration (or virtualization). A rights managed application may obtain policy updates from a policy server through a rights management server; send log data to a report server through a rights management server; browse a directory of a document repository (i.e., listing of protected documents) through a rights management server; retrieve a document in a document repository through a rights management server; or more. A rights management server may act as a bridge that performs communication protocol translation or policy translation to optimize performance of a rights managed application, especially when a rights managed application is running on a mobile computing device with limited battery life. Typically, a rights managed application communicates with a rights management server using HTTPS protocol to ensure policy updates and document data are protected while they are in transit.

A rights management server brings together a plurality of document repositories and provides a uniform interface to the document repositories. A document repository may be a file server, document management system, application server, intranet or Internet file store, cloud storage, or others. Examples of document repositories include Microsoft Windows Server® implementing a network file store, Microsoft SharePoint®, SAP® application server, Dassault Systèmes Enovia®, Dropbox™, Apple® iCloud, Amazon S3®, Microsoft® SkyDrive, Microsoft® OneDrive, Google Drive™, or others. Trademarks are the property of their respective owners.

A rights managed application may access protected documents on a plurality of document repositories through a rights management server. A rights management server may organize, map, filter or consolidate directories of a plurality of document repositories; provide document attribute or content based search capability; present directories of document repositories in a consistent manner; provide a virtual directory that integrates a plurality of directories of a plurality of document repositories; or more. In an implementation, a rights management server presents one or more document repositories to a rights managed application and allows a user to browse a document repository. In another implementation, a rights management server presents one or more document repositories in an integrated view and filter directory entries so that only documents relevant to a user are shown. In yet another implementation, a rights management server indexes document in document repositories and provides document search based on document attributes or content.

A rights managed application may communicate with a rights management server using a communication protocol (e.g., HTTPS) that is different from that used by a policy server and a rights management server. Typically, a policy server and a rights management server are connected to a LAN or WAN where a connection is reliable. However, a rights managed application on a mobile computing device may not have a reliable connection at all times and needs a different communication protocol suitable for a mobile app. In this case, a rights management server may perform communication protocol translation and maintain a session to allow a rights managed application and a policy server to communicate.

To improve performance, a rights managed application may support a reduced or simplified policy syntax. In this case, a rights management server may translate a plurality of policies from a policy server in a first policy syntax to a second policy syntax supported by a rights managed application before sending the plurality of policies in second policy syntax to a rights managed application.

A rights management server may maintain a user profile for a user who accesses a rights management server. A user profile provides per user customization such as repository view and recently accessed documents and allows the information to be shared among different clients that a user may use to view protected documents. User profiles may be store in a directory server (e.g., Active Directory), local to a rights management server, or others.

Figure 11:
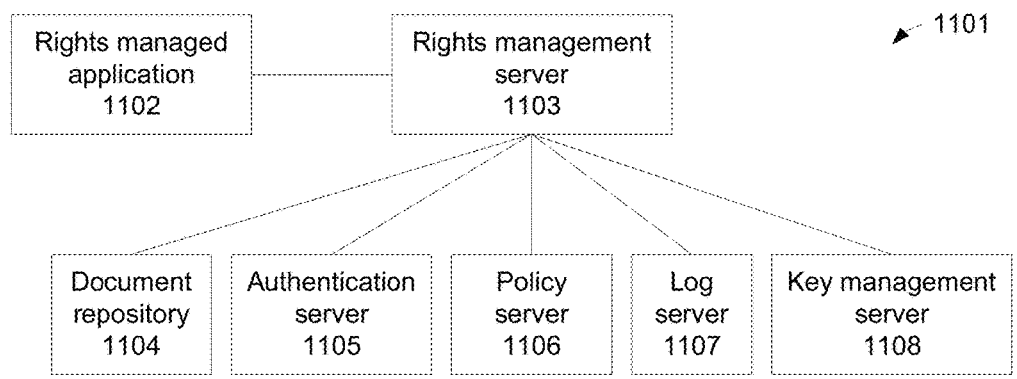
FIG. 11 shows a system diagram of a rights management server deployment.

FIG. 11 shows a system diagram 1101 of a typical rights management server deployment. A plurality of rights managed applications 1102 may connect to a rights management server 1103. When a rights managed application starts, it contacts the rights management server if a connection may be established. The rights managed application requests policy updates from a rights management server and store a plurality of policies returned by a rights management server in a local policy repository. The rights management server requests the policy updates from a policy server 1106 and performs policy translation if needed. The rights managed application may also send log data cached locally to the rights management server once a connection is established. The rights management server forwards the log data to a log server 1107 so that the log data may be processed or stored. The rights managed application may also request updates on encryption keys it caches locally from the rights management server. The rights management server contacts a key management server 1108 for encryption key updates. For example, an encryption key update may include information on an encryption key being revoked and a rights managed application should remove the encryption key from its cache.

To view a protected document on a mobile computing device, a user logs in to a rights managed application. The rights managed application authenticates the user with the rights management server. The rights management server may query an authentication server 1105 to authenticate the user. Authentication may be performed using an existing directory service (e.g., Microsoft Active Directory®) in an organization to authenticate a user; or a directory service dedicated to a rights management server or an information management system. Examples of authentication servers include Microsoft Active Directory®, OpenLDAP, Apple® Open Directory, IBM Tivoli® Directory Server, or many others. The rights management server may also provide authentication service locally. If authentication fails, access to protected documents by the user is not allowed. If authentication succeeds, the user may open a protected document in a document repository 1104 from the rights managed application. The rights managed application performs access or use control on the protected document according to rights control policies in its local policy repository. Trademarks are the property of their respective owners.

Figure 12:
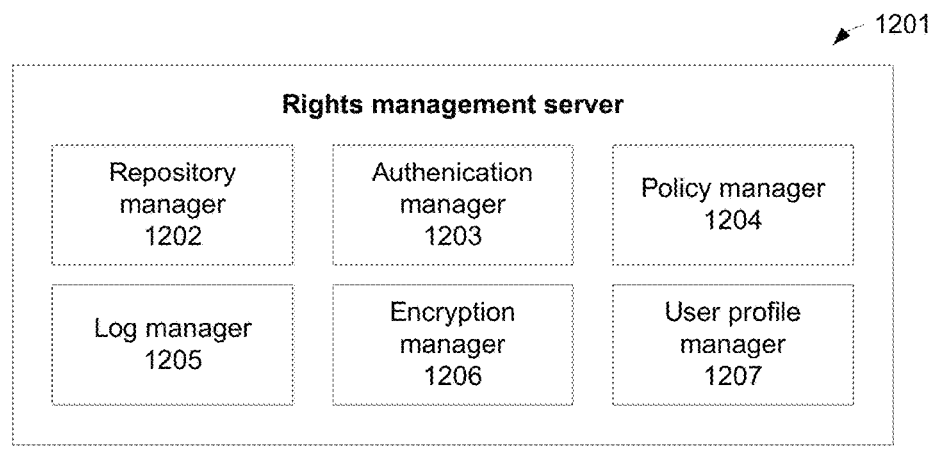
FIG. 12 shows a block diagram of a rights management server.

FIG. 12 shows a block diagram 1201 of a rights management server 1103. A rights management server comprises at least six functional components: repository manager, authentication manager, policy manager, log manager, encryption manager and user profile manager. A repository manager 1202 communicates with one or more documents repositories 1104. A document repository may be accessible through an intranet or the Internet. A repository manager may obtain listings of protected documents in a document repository. A repository manager may filter a listing of protected documents based on a user or policies. A repository manager may copy or download a protected document from a document repository.

An authentication manager 1203 handles user login and authenticating a user with an authentication server 1105. An authentication manager may authenticate a user with an authentication server in an organization or on the Internet. An authentication manager may authenticate a user using one or more authentication servers. An authentication manager may authenticate a first user using a first authentication server and authenticate a second user using a second authentication server. An authentication manager may provide its own authentication capability. When authentication is successful, an authentication manager stores the identity of a user in a session and uses the identity in subsequent operations. A rights management server may access a document repository using an authenticated user identity. A rights management server may also map an authenticate user identity to another user identity (or impersonate a user) to access a document repository. A rights management server may also use a predefined user identity to access a document repository.

A policy manager 1204 forwards policy queries from a rights managed application to a policy server 1106 and forwards policy updates from a policy server to a rights managed application. A policy update from a policy server includes a plurality of policies changed since last policy update. When forwarding a plurality of policies to a rights managed application, a policy manager may reduce, simplify or translate the plurality of policies if needed; before sending the reduced, simplified or translated policies to a rights managed application. A rights managed application may communicate with a rights management server using a communication protocol (e.g., HTTPS) that is different from that used by a rights management server to communicate with a policy server. In this case, a policy manager will act as a bridge and perform communication protocol translation to facilitate communication between a rights managed application and a policy server. A rights managed application such as a mobile app may have limited capability to process policies. It may be inefficient to process complex policy syntax used by a policy server on a mobile computing device. In this case, a policy manager will perform policy translation and translate a more complex policy syntax used by a policy server to a simpler policy syntax used by a rights managed application. A policy manager may also translate access or use control policies into rights control policies.

A log manager 1205 forwards log data from a rights managed application to a log server 1107. A log manager may perform communication protocol translation if a rights managed application communicates with a rights management server using a communication protocol that is different from that used by the rights management server to communicate with the log server.

An encryption manager 1206 requests encryption keys from a key management server 1108 and forwards the encryption keys to a rights managed application. An encryption manager checks if a protected document is encrypted, if the protected document is encrypted, the encryption manager retrieves an encryption key identifier form the protected document and queries a key management server for an encryption key using the encryption key identifier. An encryption manager also forwards encryption key requests from a rights managed application to a key management server and returns responses from a key management server to a rights managed application.

A user profile manager 1207 allows user interface, document listing, document repository configuration and other user configurations to be customized in per user or per group basis. Each user is assigned a user profile that contains customization specific to the user. A user profile is stored in a rights management server, a directory server or a backend server that manages user identities. A portion of a user profile relevant to a rights managed application is delivered to a rights managed application when a user logs in to the rights managed application. A user or an administrator may modify a user profile. When user profiles are stored on a rights management server, an administrative user interface is provided by a user profile manager to assist an administrator to manage user and group profiles on a rights management server. In an example, a user profile contains a list of document repositories a user has access to and credentials to access the document repositories. The user profile also specifies filters to include or exclude folders (or directories) or documents in a directory listing (e.g., include "/marketing/", exclude "/finance/" or include "*.pdf"). In another example, a user profile refers to a group profile which is similar to a user profile but specifies what users of a group may access. A group profile simplifies management of user profiles.

Figures 13, 14:
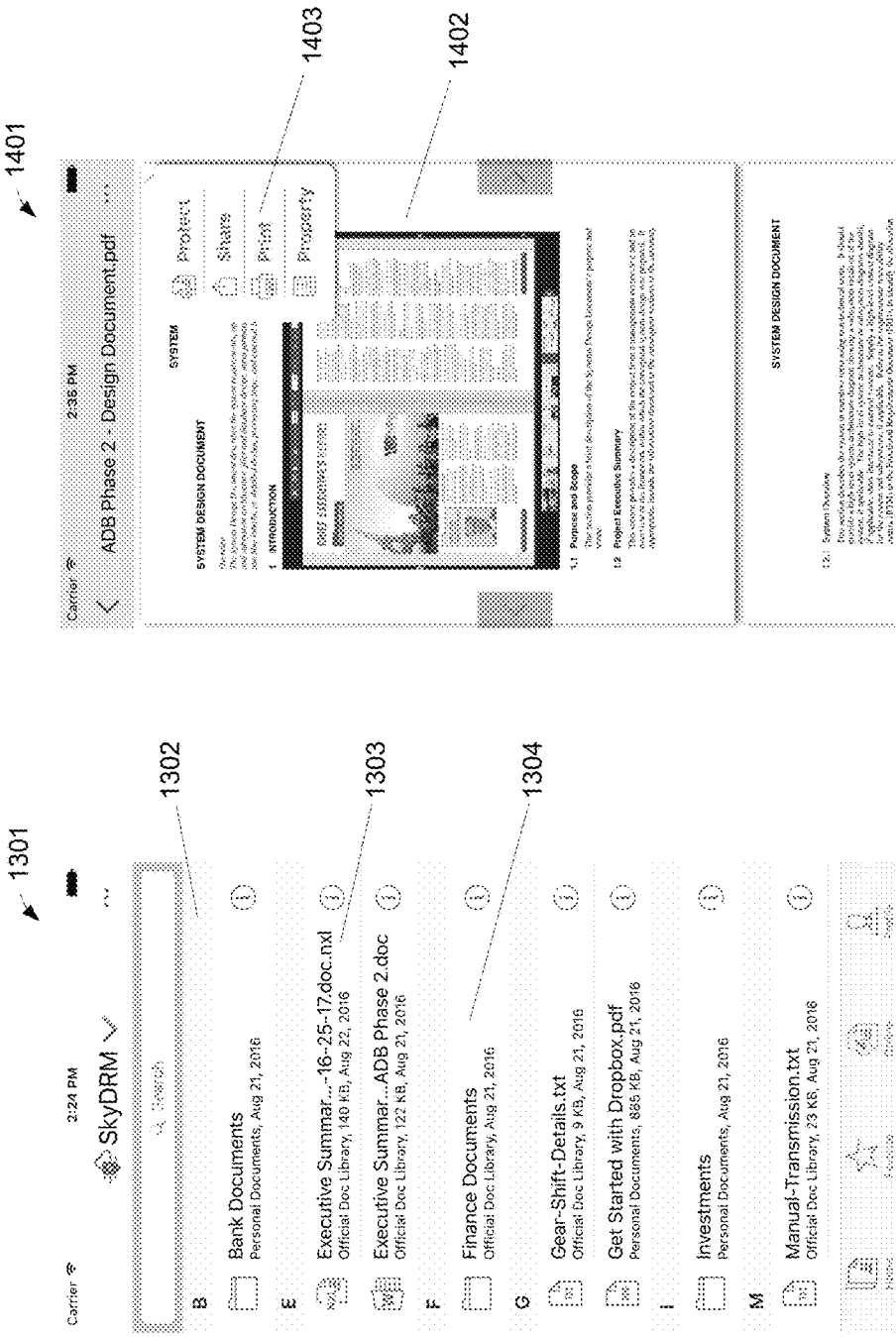
FIG. 13 shows a consolidated view of protected documents and folders in a plurality of document repositories in a rights managed application.
FIG. 14 shows a protected document displayed on a rights-managed application.

FIG. 13 shows a consolidated view 1301 of protected documents and folders in a plurality of document repositories 1104 in a rights managed application 1102. The protected documents and folders are obtained from a repository manager 1202 in a rights management server 1103 and 1201 NextLabs SkyDRM®. Protected documents and folders are listed in alphabetical order 1302. A protected document 1303 "Executive-Summary . . . -1625-17.doc.nxl" is available for viewing. A folder 1304 "Financial Documents" is a folder in a document repository. A user may view any of the protected documents listed subjected to control according to the rights control policies in the rights managed application. Trademarks are the property of their respective owners.

FIG. 14 shows a protected document 1401 displayed on a rights managed application 1102. The protected document is downloaded form a document repository 1104 through a rights management server 1103 and 1201 NextLabs SkyDRM®. Content of the protected document 1402 is rendered by the rights managed application. A print menu item 1403 is shown because a print rights is granted to the protected document and the user.

Figure 15:
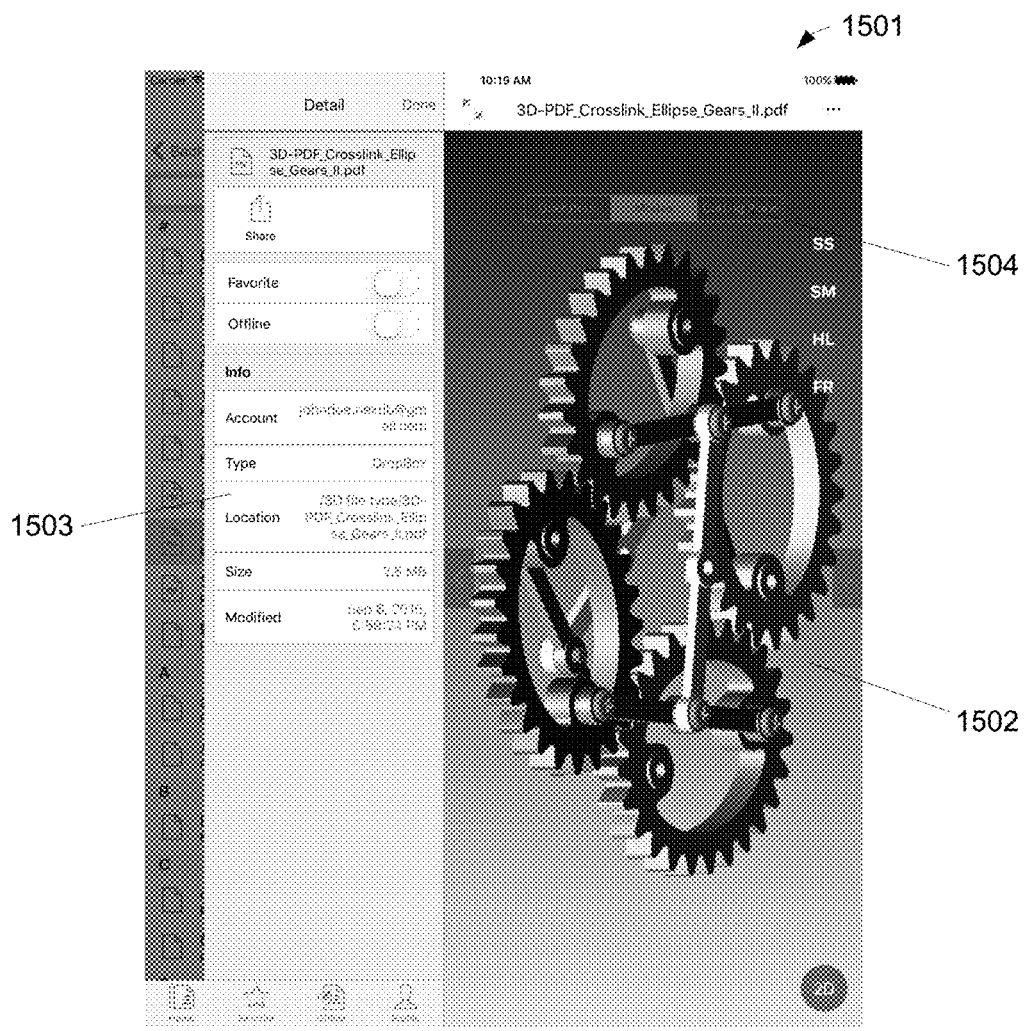
FIG. 15 shows a 3D CAD drawing displayed on a rights managed application.

FIG. 15 shows a 3D CAD drawing 1501 displayed on a rights managed application 1102. The 3D CAD drawing is a protected document downloaded from a document repository 1104 through a rights management server 1103 and 1201 NextLabs SkyDRM®. Content of the protected document 1502 is rendered by the rights managed application. Details of the protected document 1503 is listed next to the protected document. A navigation menu 1504 is include allowing a user to view different aspects of the 3D CAD drawing.

In an example, a user views a protected document in a document repository Microsoft SharePoint® using a web browser. To view the protected document, the user logs in to a secured viewing server and opens the protected document through the secured viewing server. The secured viewing server queries a content access governor to determine if the user is allowed to open the protected document. If the user is allowed to open the protected document, the content access governor determines what rights are granted to the user on the protected document. If the protected document is encrypted, the secured viewing server queries the content access governor to obtain an encryption key to decrypt the protected document. The secured viewing server converts the protected document into a format suitable for displaying on the web browser and constructs a HTML document to deliver the converted document. At the same time, the secured viewing server implements the one or more rights granted by not including a particular content in the protected document if the user does not have the right to view the particular content; effects the disabling of a particular feature or function of the web browser if the particular function requires a right that has not been granted to the user; and implements optional one or more policy obligations returned by the content access governor.

Figure 16A:
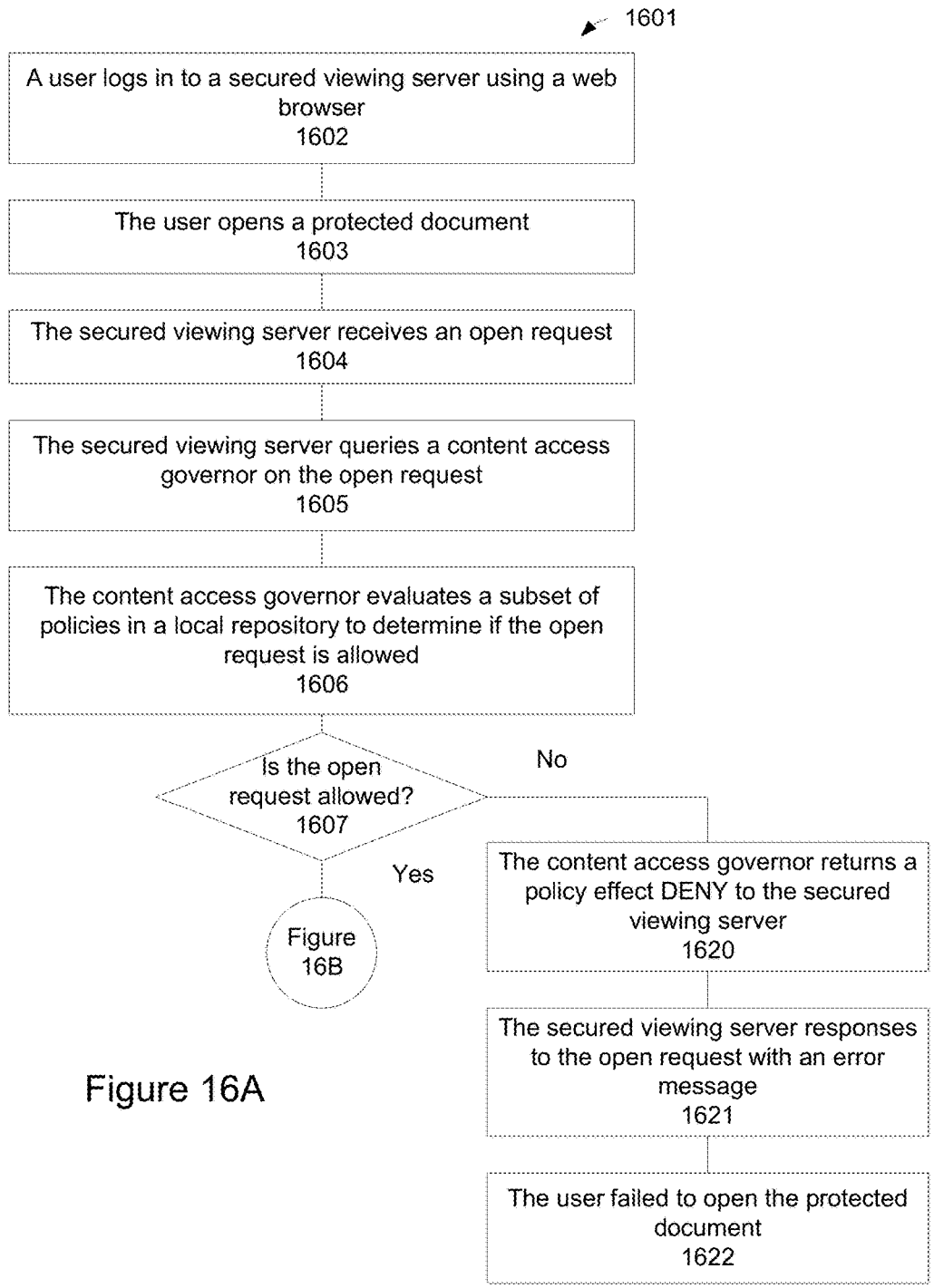

A rights control policy Policy-RC-HTML5 in this example grants a view right to the user on the protected document. A policy engine of the content access governor implements deny-by-default which assumes that a user has no right unless a right is granted explicitly. Copy right is not granted to the user because there is no rights control policy that grants a copy right to the user. The rights control policy is:
Policy-RC-HTML5
GRANT VIEW RIGHT
TO USER=Executive
ON document.confidential=TRUE AND document.quarterly-report=TRUE Alternatively, an access control policy Policy-AUC-HTML5 instead of the rights control policy may be specified to achieve the same objective. The access control policy is:
Policy-AUC-HTML5
FOR document.confidential=TRUE AND document.quarterly-report=TRUE
ON OPEN
BY USER=Executive
DO ALLOW Referring to FIGS. 16A-16C, an example flow 1601 shows a user viewing a protected document on a web browser 702 with save functions disabled. This example assumes that a rights control policy Policy-RC-HTML5 is deployed to a content access governor 706. In step 1602, a user logs in to a secured viewing server 703 using a web browser Microsoft Internet Explorer®. The secured viewing server queries an authentication server 704 to authenticate the user. The user is a member of the Executive group and the login is authenticated successfully. The secured viewing server returns a list of documents in a Microsoft SharePoint® document repository 705 that is available to the user. If the user has access to a plurality of repositories, the secured viewing server may present a list of repositories and allow the user to select a repository from the list.

In step 1603, the user opens a protected document quartly-report.xlsx from the list of documents (e.g., clicking on a hypertext link associated with the document). The protected document is a Microsoft Excel® spreadsheet and it has classifications confidential and quarterly-report (i.e., matching document.confidential=true or document.quarterly-report=true). The protected document may also be encrypted. The web browser sends an open request to the secured viewing server in response to the user open action. In step 1604, the secured viewing server receives the open request. The secured viewing server collects information related to the open request and the information includes document repository hosting the protected document, file name, document classifications or discretionary policies if any. In step 1605, the secured viewing server queries the content access governor on the open request providing the information collected.

In step 1606, the content access governor selects a subset of policies from a plurality of policies in a local policy repository relevant to the open request, the user and the protected document. The plurality of policies in the local policy repository is distributed from a policy server 707 (i.e., centralized policies). The content access governor evaluates the subset of policies to determine if the user is allowed to open the protected document. The subset of policies includes a policy Policy-RC-HTML5, therefore the user is allowed to view the protected document. In an implementation where a content access governor supports discretionary policies, the content access governor may evaluate additional discretionary policies stored in the protected document to determine if the user is allowed to open the protected document. In an implementation, a policy engine evaluates only centralized policies to produce a policy decision. In another implementation, a policy engine evaluates only discretionary policies to produce a policy decision. Selecting and evaluating centralized policies are not required. In yet another implementation, a policy engine evaluates centralized and discretionary policies to produce a policy decision. If the user is allowed to open the protected document, processing continues in step 1608 (open request is allowed). If the user is not allowed to open the protected document, processing continues in step 1620 (open request is not allowed).

In step 1608 (open request is allowed), the content access governor produces one or more rights granted to the user on the protected document and optional policy obligations. The one or more rights granted in this example do not include a copy right. In step 1609, the content access governor returns a policy effect ALLOW, the one or more rights granted and optional policy obligations to the secured viewing server. In step 1610, the secured viewing server checks if the protected document is encrypted. If the protected document is encrypted, processing continues in step 1612 (decrypt protected document). If the protected document is not encrypted, processing continues in step 1615 (convert protected document).

In step 1612 (decrypt protected document), the secured viewing server retrieves an encryption key identifier from the protected document. The encryption key identifier uniquely identifies an encryption key in an information management system. An encryption key identifier may be an integer, a string, an object, binary data, or others. In step 1613, the secured viewing server queries the content access governor with the encryption key identifier for an encryption key. The content access governor looks up its encryption key cache for an encryption key matching the encryption key identifier. If one is found, the content access governor returns the encryption key to the secured viewing server. If one is not found, the content access governor queries a key management server 709 with the encryption key identifier. The content access governor caches an encryption key returned by the key management server and returns the encryption key to the secured viewing server. In step 1614, the secured viewing server decrypts the protected document using the encryption key obtained from the content access governor.

In step 1615 (convert protected document), the secured viewing server converts the protected document into a format compatible with the web browser while implementing the one or more rights granted and optional policy obligations. Some examples of data formats compatible with a web browser include HTML, XML, rich text format (RTF), raster image (or bitmap), vector graphics format, JavaScript, other scripting language, or others. The conversion process also observes the one or more rights granted to the user so that contents in the protected document and features of the protected document that the user does not have rights to are not included in the converted document. An example of content in the protected document that the user may not have a right to is viewing hidden data of a Microsoft Excel® spreadsheet. An example of a feature of the protected document that the user may not have a right to is constructing a pivot table. The conversion process may also implement one or more policy obligations when appropriate. An example of a policy obligation that may be implemented during the conversion process is a security overlay policy obligation. In a case where the secured viewing server converts the protected document into one or more raster images, a text or image pattern specified in a security overlay policy obligation may be incorporated into the one or more raster images.

In step 1616, the secured viewing server constructs an HTML document to deliver the converted document while implementing the one or more rights granted and optional policy obligations. The secured viewing server may deliver the converted document in different ways including: incorporating the converted document into the HTML document; incorporating a script in the HTML document and using the script to download content of the converted document and rendering the content of the converted document dynamically in the web browser (e.g., when a user scrolls a web browser window or exposes an area not covered by content sent to a web browser); incorporating a script and the converted document in the HTML document and using the script to render the converted document in a web browser; incorporating a script and a part of the converted document in the HTML document and using the script to download remaining content of the converted document and rendering the content of the converted document dynamically in the web browser; or more. To implement the one or more rights granted to the user, the secured viewing server incorporates HTML or script code that enables a particular web browser feature or function that is consistent with the one or more rights granted. The secured viewing server also incorporates HTML or script code that disables a particular web browser feature or function that is not consistent with the one or more rights granted. In this example, the user is not granted a copy right to the protected document, therefore the secured viewing server incorporates HTML or script code in the HTML document that disables save functions in the web browser.

In step 1617, the secured viewing server responses to the open request with the HTML document. In step 1618, the web browser receives the HTML document and loads data and scripts incorporated in the HTML document. Loading scripts in the HTML document also cause some scripts (i.e., code fragments) to be executed. The web browser renders the HTML document with save functions disabled. The optional policy obligations may be implemented at the web browser using HTML or script code. In step 1619, the user views the protected document successfully.

In step 1620 (open request is not allowed), the content access governor returns a policy effect DENY to the secured viewing server. In step 1621, the secured viewing server responses to the open request with an error message. In step 1622, the user failed to open the protected document.

While the protected document in this example is a Microsoft Excel® document and the document repository is a Microsoft SharePoint® server, one with ordinary skill in the art would recognize the teaching also applies to other documents such as Microsoft® Word document, Adobe® PDF document, 2D CAD drawing or 3D CAD drawing, and other document repositories such as Dropbox™, SAP® application server or file server.

In an example, a user views a protected document in a document repository Dropbox™ using a web browser. To view the protected document, the user logs in to a secured viewing server and opens the protected document through the secured viewing server. The secured viewing server queries a content access governor to determine if the user is allowed to open the protected document. If the user is allowed to open the protected document, the secured viewing server queries the content access governor on additional rights to compose one or more rights granted to the user on the protected document. Alternatively, the content access governor may determine the rights granted to the user when it determines if the user is allowed to open the protected document. If the protected document is encrypted, the secured viewing server queries the content access governor to obtain an encryption key to decrypt the protected document. The secured viewing server converts the protected document into a format suitable for displaying on the web browser and constructs a HTML document to deliver the converted document. At the same time, the secured viewing server implements the one or more rights granted by not including a particular content in the protected document if the user does not have the right to view the particular content; and disabling a particular feature or function of a web browser if the particular function requires a right that has not been granted to the user; and implements optional one or more policy obligations returned by the content access governor.

A rights control policy Policy-RC-NOPRINT-1 in this example grants a view right to the user on the protected document and a rights control policy Policy-RC-NO-PRINT-2 revokes a print right from the user on the protected document. The second policy is included as a safe guard in case another policy grants a print right to the protected document. The rights control policies are:

Policy-RC-NOPRINT-1
GRANT VIEW RIGHT
TO USER=ProjectX
ON document.secret=TRUE AND document.design-document=TRUE

```
# Policy-RC-NOPRINT-2
REVOKE PRINT RIGHT
FROM USER=ProjectX
ON document.secret=TRUE
```

Alternatively, access control policies Policy-AUC-NOPRINT-1 and Policy-AUC-NOPRINT-2 instead of the rights control policies may be use to achieve the same objective. The access control policies are:

```
# Policy-AUC-NOPRINT-1
FOR document.secret=TRUE AND document.design-document=TRUE
ON OPEN
BY USER=ProjectX
DO ALLOW
# Policy-AUC-NOPRINT-2
FOR document.secret=TRUE
ON PRINT
BY USER=ProjectX
DO DENY
```

Figure 17A:
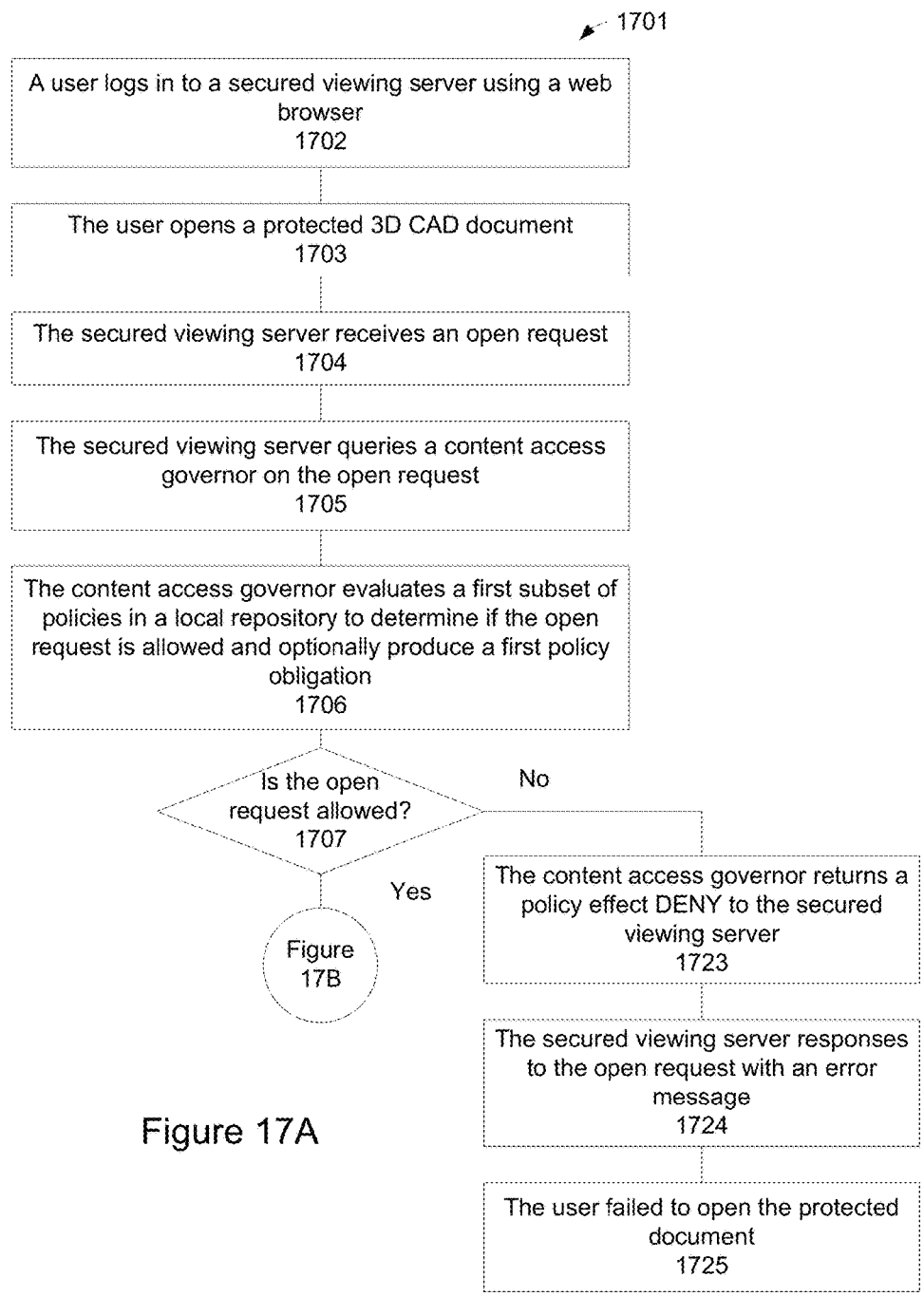

Referring to FIGS. 17A-17C, an example flow 1701 shows a user viewing a protected document on a web browser 702 with print functions disabled. This example assumes rights control policies Policy-RC-NOPRINT-1 and Policy-RC-NOPRINT-2 are deployed to a content access governor 706. In step 1702, a user logs in to a secured viewing server 703 using a web browser Google Chrome™. The secured viewing server queries an authentication server 704 to authenticate the user. The user is a member of ProjectX group and the login is authenticated successfully. The secured viewing server returns a list of documents in a Dropbox™ document repository 705 that is available to the user. If the user has access to a plurality of repositories, the secured viewing server may present a list of repositories and allow the user to select a repository from the list.

In step 1703, the user opens a protected document from the list of documents (e.g., clicking on a hypertext link associated with the document). The protected document is a Siemens® JT 3D CAD drawing and it has classifications secret and design-document (i.e., matching document.secret=true or document.design-document=true). The protected document may also be encrypted. The web browser sends an open request to the secured viewing server in response to the user open action. In step 1704, the secured viewing server receives the open request. The secured viewing server collects information related to the open request and the information includes document repository hosting the protected document, file name, document classifications or discretionary policies if any. In step 1705, the secured viewing server queries the content access governor on the open request providing the information collected.

In step 1706, the content access governor selects a first subset of policies from a plurality of policies in a local policy repository relevant to the open request, the user and the protected document. The plurality of policies in the local policy repository is distributed from a policy server 707 (i.e., centralized policies). The content access governor evaluates the first subset of policies to determine if the user is allowed to open the protected document and optionally produce a first policy obligation. The first subset of policies includes a policy Policy-RC-NOPRINT-1, therefore the user is allowed to view the protected document. In an implementation where a content access governor supports discretionary policies, the content access governor may evaluate additional discretionary policies stored in the protected document to determine if the user is allowed to open the protected document. In an implementation, a policy engine evaluates only centralized policies to produce a policy decision. In another implementation, a policy engine evaluates only discretionary policies to produce a policy decision. Selecting and evaluating centralized policies are not required. In yet another implementation, a policy engine evaluates centralized and discretionary policies to produce a policy decision. If the user is allowed to open the protected document, processing continues in step 1708 (open request is allowed). If the user is not allowed to open the protected document, processing continues in step 1723 (open request is not allowed).

In step 1708 (open request is allowed), the content access governor returns a policy effect ALLOW and the optional first policy obligation to the secured viewing server. In step 1709, the secured viewing server queries the content access governor on a print right to the user on the protected document. In step 1710, the content access governor selects a second subset of policies from the plurality of policies in the local policy repository relevant to a print right, the user and the protected document. The content access governor evaluates the second subset of policies to determine if the user is allowed to print the protected document and optionally produce a second policy obligation. The second subset of policies includes a policy Policy-RC-NOPRINT-2, therefore the user is not allowed to print the protected document. In step 1711, the content access governor returns a second policy effect DENY to the secured viewing server and an optional second policy obligation. In step 1712, the secured viewing server queries the content access governor on other rights. The secured viewing server collects the policy effects for view, print and other rights into one or more rights granted and policy obligations associate with view, print and other rights into optional policy obligations.

In step 1713, the secured viewing server checks if the protected document is encrypted. If the protected document is encrypted, processing continues in step 1715 (decrypt protected document). If the protected document is not encrypted, processing continues in step 1718 (convert protected document).

In step 1715 (decrypt protected document), the secured viewing server retrieves an encryption key identifier from the protected document. The encryption key identifier uniquely identifies an encryption key in an information management system. An encryption key identifier may be an integer, a string, an object, binary data, or others. In step 1716, the secured viewing server queries the content access governor with the encryption key identifier for an encryption key. The content access governor looks up its encryption key cache for an encryption key matching the encryption key identifier. If one is found, the content access governor returns the encryption key to the secured viewing server. If one is not found, the content access governor queries a key management server 709 with the encryption key identifier. The content access governor caches an encryption key returned by the key management server and returns the encryption key to the secured viewing server. In step 1717, the secured viewing server decrypts the protected document using the encryption key obtained from the content access governor.

In step 1718 (convert protected document), the secured viewing server converts the protected document into a format compatible with the web browser while implementing the one or more rights granted and optional policy obligations. Some examples of data formats compatible with a web browser include HTML, XML, rich text format (RTF), Mozilla Foundation® WebGL, other vector graphics format, raster image (or bitmap), JavaScript, other scripting language, or others. The conversion process also observes the one or more rights granted to the user so that contents in the protected document and features of the protected document that the user does not have rights to are not included in the converted document. An example of content in the protected document that the user may not have a right to is viewing product and manufacturing information (PMI) in a Siemens® JT 3D CAD drawing. An example of a feature of the protected document that the user may not have a right to is exposing details of a component in a 3D CAD drawing. The conversion process may also implement one or more policy obligations when appropriate.

In step 1719, the secured viewing server constructs an HTML document to deliver the converted document while implementing the one or more rights granted and optional policy obligations. The secured viewing server may deliver the converted document in different ways including: incorporating the converted document into the HTML document; incorporating a script in the HTML document and using the script to download content of the converted document and rendering the content of the converted document dynamically in the web browser (e.g., when a user scrolls a web browser window or exposes an area not covered by content sent to a web browser); incorporating a script and the converted document in the HTML document and using the script to render the converted document in a web browser; incorporating a script and a part of the converted document in the HTML document and using the script to download remaining content of the converted document and rendering the content of the converted document dynamically in the web browser; or more. To implement the one or more rights granted to the user, the secured viewing server incorporates HTML or script code that enables a particular web browser feature or function that is consistent with the one or more rights granted. The secured viewing server also incorporates HTML or script code that disables a particular web browser feature or function that is not consistent with the one or more rights granted. In this example, the user is not granted a print right to the protected document, therefore the secured viewing server incorporates HTML or script code in the HTML document that disables print functions in the web browser. The optional policy obligations may be implemented at the web browser using HTML or script code.

In step 1720, the secured viewing server responses to the open request with the HTML document. In step 1721, the web browser receives the HTML document and loads data and scripts incorporated in the HTML document. Loading scripts in the HTML document also cause some scripts (i.e., code fragments) to be executed. The web browser renders the HTML document with print function disabled. The optional policy obligations may be implemented at the web browser using HTML or script code. In step 1722, the user views the protected document successfully.

In step 1723 (open request is not allowed), the content access governor returns a policy effect DENY to the secured viewing server. In step 1724, the secured viewing server responses to the open request with an error message. In step 1725, the user failed to open the protected document.

In an example, a user views a protected document in a document repository Microsoft SharePoint® using a web browser. To view the protected document, the user logs in to a secured viewing server and opens the protected document through the secured viewing server. The secured viewing server queries a content access governor to determine if the user is allowed to open the protected document. If the user is allowed to open the protected document, determines what rights are granted to the user on the protected document. If the protected document is encrypted, the secured viewing server queries the content access governor to obtain an encryption key to decrypt the protected document. The secured viewing server converts the protected document into a format suitable for displaying on the web browser and constructs a HTML document to deliver the converted document. At the same time, the secured viewing server implements the one or more rights granted by not including a particular content in the protected document if the user does not have the right to view the particular content; and effects the disabling of a particular feature or function of a web browser if the particular function requires a right that the user has not been granted; and implements optional one or more policy obligations returned by the content access governor.

Figure 18A:
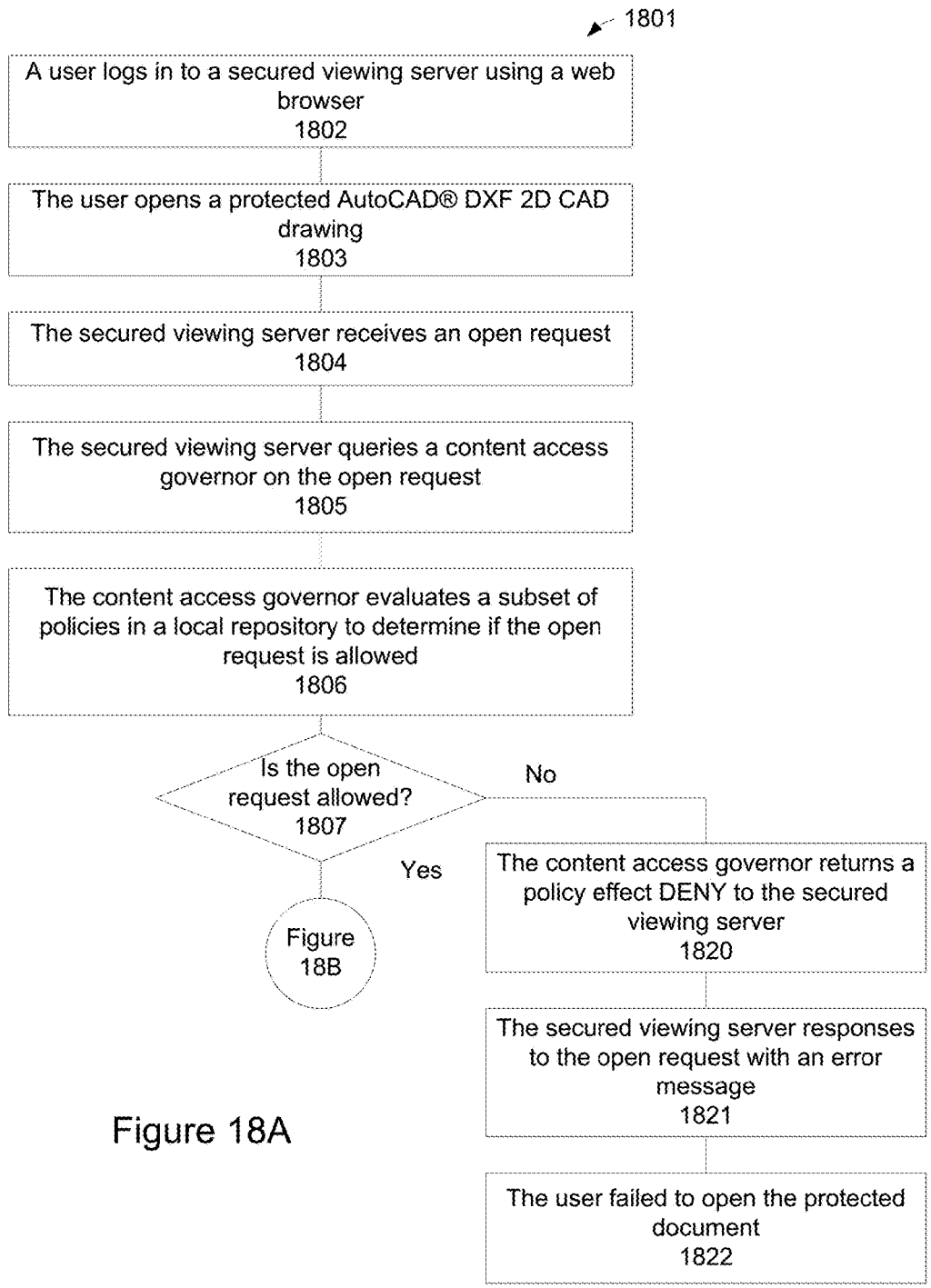

A rights control policy Policy-RC-SO-1 in this example grants a view right to the user on the protected document and specifies a security overlay policy obligation. A rights control policy Policy-RC-SO-2 revokes copy and print rights from the user on the protected document. The rights control policies are:
Policy-RC-SO-1
GRANT VIEW RIGHT
TO USER=Planning-Team
ON document.confidential=TRUE AND document.factory-plan=TRUE
DO APPLY SecurityOverlay ("Confidential, <user>, <date>, <computer>")
Policy-RC-SO-2
REVOKE COPY, PRINT RIGHTS
FROM USER=Planning-Team
ON document.confidential=TRUE Alternatively, access control policies Policy-AUC-SO-1 and Policy-RC-SO-2 instead of the rights control policies may be specified to achieve the same objective. The access control policies are:
Policy-AUC-SO-1
FOR document.confidential=TRUE AND document.factory-plan=TRUE
ON OPEN
BY USER=Planning-Team
DO ALLOW
AND ON ALLOW APPLY SecurityOverlay("Confidential, <user>, <date>, <computer>")
Policy-AUC-SO-2
FOR document.confidential=TRUE
ON SAVE, PRINT
BY USER=Planning-Team
DO DENY Referring to FIGS. 18A-18C, an example flow 1801 shows a user viewing a protected document on a web browser 702 where a security overlay is placed on top of the protected document creating a visual effect similar to a watermark. This example assumes rights control policies Policy-RC-SO-1 and Policy-RC-SO-2 are deployed to a content access governor 706. In step 1802, a user logs in to a secured viewing server 703 using a web browser Mozilla Foundation Firefox®. The secured viewing server queries an authentication server 704 to authenticate the user. The user is a member of the Planning-Team group and the login is authenticated successfully. The secured viewing server returns a list of documents in a Microsoft SharePoint® document repository 705 that is available to the user. If the user has access to a plurality of repositories, the secured viewing server may present a list of repositories and allow the user to select a repository from the list.

In step 1803, the user opens a protected document factory-plan-10.dxf from the list of documents (e.g., clicking on a hypertext link associated with the document). The protected document is a 2D CAD drawing in AutoCAD® DXF data file format and it has classifications confidential and factory-plan (i.e., match document.confidential=true or document.factory-plan=true). The protected document may also be encrypted. The web browser sends an open request to the secured viewing server in response to the user open action. In step 1804, the secured viewing server receives an open request. The secured viewing server collects information related to the open request and the information includes document repository hosting the protected document, file name, document classifications or discretionary policies (if any). In step 1805, the secured viewing server queries the content access governor on the open request providing the information collected.

In step 1806, the content access governor selects a subset of policies from a plurality of policies in a local policy repository relevant to the open request, the user and the protected document. The plurality of policies in the local policy repository is distributed from a policy server 707 (i.e., centralized policies). The content access governor evaluates the subset of policies to determine if the user is allowed to open the protected document. The subset of policies includes a policy Policy-RC-SO-1, therefore the user is allowed to view the protected document and the evaluation produces a security overlay policy obligation. In an implementation where a content access governor supports discretionary policies, the content access governor may evaluate additional discretionary policies stored in the protected document to determine if the user is allowed to open the protected document. In an implementation, a policy engine evaluates only centralized policies to produce a policy decision. In another implementation, a policy engine evaluates only discretionary policies to produce a policy decision. Selecting and evaluating centralized policies are not required. In yet another implementation, a policy engine evaluates centralized and discretionary policies to produce a policy decision. If the user is allowed to open the protected document, processing continues in step 1808 (open request is allowed). If the user is not allowed to open the protected document, processing continues in step 1820 (open request is not allowed).

In step 1808 (open request is allowed), the content access governor produces one or more rights granted to the user on the protected document and optional policy obligations. The one or more rights granted do not include copy or print right according to rights control policy Policy-RC-SO-2. In step 1809, the content access governor returns a policy effect ALLOW, the one or more rights granted and optional policy obligations to the secured viewing server. In step 1810, the secured viewing server checks if the protected document is encrypted. If the protected document is encrypted, processing continues in step 1812 (decrypt protected document). If the protected document is not encrypted, processing continues in step 1815 (convert protected document).

In step 1812 (decrypt protected document), the secured viewing server retrieves an encryption key identifier from the protected document. The encryption key identifier uniquely identifies an encryption key in an information management system. An encryption key identifier may be an integer, a string, an object, binary data, or others. In step 1813, the secured viewing server queries the content access governor with the encryption key identifier for an encryption key. The content access governor looks up its encryption key cache for an encryption key matching the encryption key identifier. If one is found, the content access governor returns the encryption key to the secured viewing server. If one is not found, the content access governor queries a key management server 709 with the encryption key identifier. The content access governor caches an encryption key returned by the key management server and returns the encryption key to the secured viewing server. In step 1814, the secured viewing server decrypts the protected document using the encryption key obtained from the content access governor.

In step 1815 (convert protected document), the secured viewing server converts the protected document into a format compatible with the web browser while implementing the one or more rights granted and optional policy obligations. Some examples of data formats compatible with a web browser include HTML, XML, rich text format (RTF), Mozilla Foundation® WebGL, other vector graphics format, raster image (or bitmap), JavaScript, other scripting language, or others. The conversion process also observes the one or more rights granted to the user so that contents in the protected document and features of the protected document that the user does not have rights to are not included in the converted document. An example of content in the protected document that the user may not have a right to is viewing product and manufacturing information (PMI) in an AutoCAD® DXF 2D CAD drawing. An example of a feature of the protected document that the user may not have a right to is exposing details of a 2D CAD drawing. The conversion process may also implement one or more policy obligations when appropriate. An example of a policy obligation that may be implemented during the conversion process is a copyright policy obligation. A secured viewing server may add a copyright or warning message specified in a copyright policy obligation to each HTML page it produces so that the copyright or warning message is rendered on a web browser along with a protected document.

In step 1816, the secured viewing server constructs an HTML document to deliver the converted document while implementing the one or more rights granted and optional policy obligations. The secured viewing server may deliver the converted document in different ways including: incorporating the converted document into the HTML document; incorporating a script in the HTML document and using the script to download content of the converted document and rendering the content of the converted document dynamically in the web browser (e.g., when a user scrolls a web browser window or exposes an area not covered by content sent to a web browser); incorporating a script and the converted document in the HTML document and using the script to render the converted document in a web browser; incorporating a script and a part of the converted document in the HTML document and using the script to download remaining content of the converted document and rendering the content of the converted document dynamically in the web browser; or more. To implement the one or more rights granted to the user, the secured viewing server incorporates HTML or script code that enables a particular web browser feature or function that is consistent with the one or more rights granted. The secured viewing server also incorporates HTML or script code that disables a particular web browser feature or function that is not consistent with the one or more rights granted. In this example, the user is not granted copy or print right to the protected document, therefore the secured viewing server incorporates HTML or script code in the HTML document that disables save and print functions in the web browser. The secured viewing server also implements the security overlay policy obligation in the one or more policy obligations at the web browser using HTML or script code. The HTML or script code renders one or more semi-transparent text pattern "Confidential, Jane Doe, 2015-01-02, Jane's iPad" on the converted document on the web browser.

In step 1817, the secured viewing server responses to the open request with the HTML document. In step 1818, the web browser receives the HTML document and loads data and scripts incorporated in the HTML document. Loading scripts in the HTML document also cause some scripts (i.e., code fragments) to be executed. The web browser renders the HTML document with a security overlay. The optional policy obligations may be implemented at the web browser using HTML or script code. In step 1819, the user views the protected document successfully.

In step 1820 (open request is not allowed), the content access governor returns a policy effect DENY to the secured viewing server. In step 1821, the secured viewing server responses to the open request with an error message. In step 1822, the user failed to open the protected document.

Figure 19:
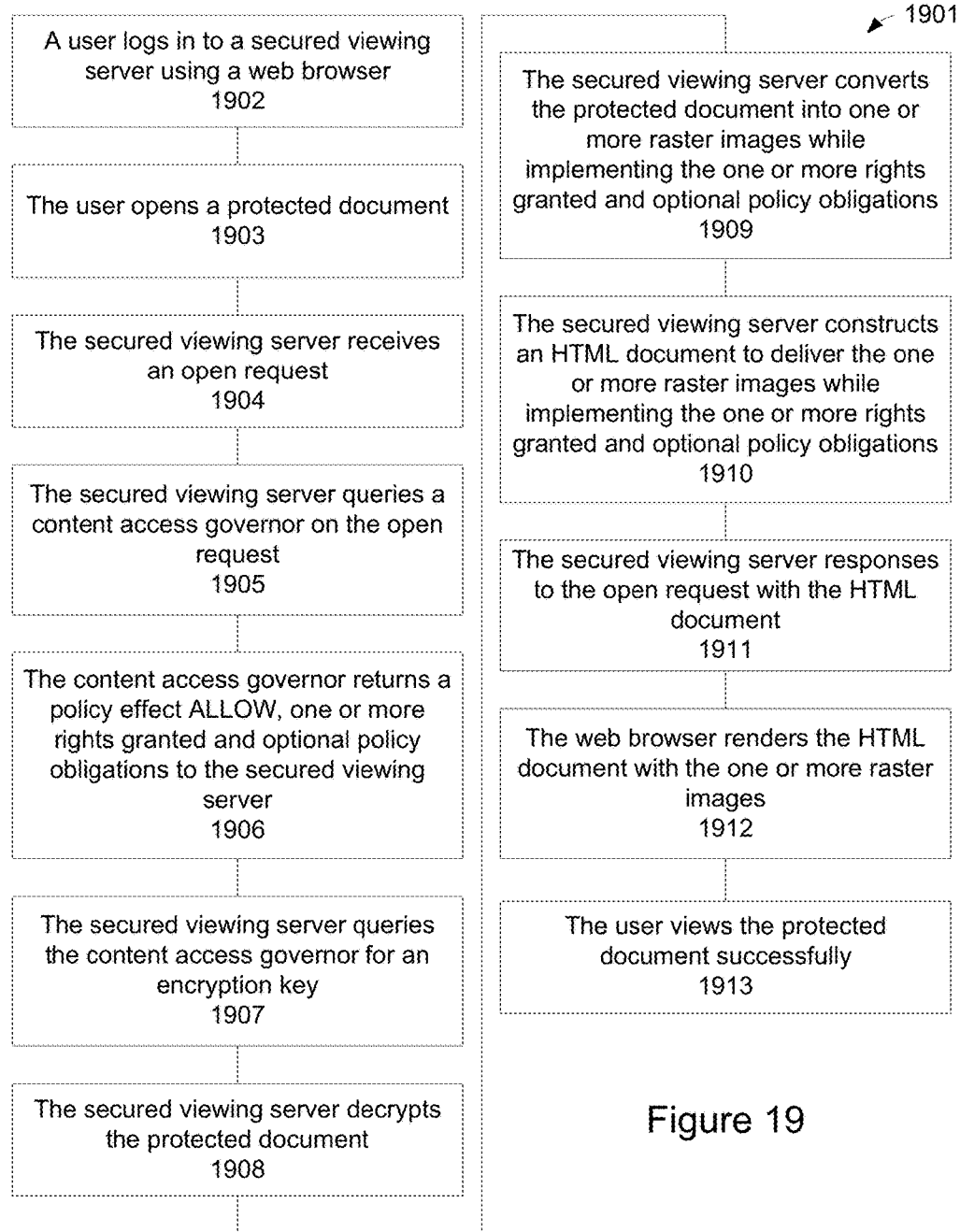
FIG. 19 shows an example flow of viewing a protected document in Adobe® PDF on a Web browser where the protected document is delivered to the Web browser as one or more raster images.

In an example, a user views a protected document in a document repository using a web browser Microsoft Internet Explorer®. The protected document is in Adobe® PDF format and the document repository is a Microsoft® SkyDrive. The secured viewing server converts the protected document into one or more raster images (or bitmap) and constructs a HTML document to deliver the converted document. A rights control policy Policy-RC-RAS in this example grants a view right to the user on the protected document. The rights control policy is:

Policy-RC-RAS
GRANT VIEW RIGHT
TO USER=Marketing
ON document.restricted=TRUE AND document.productplan=TRUE Referring to FIG. 19, an example flow 1901 shows a user viewing a protected document on a web browser 702. In step 1902, the user logs in to a secured viewing server 703 using a Microsoft Internet Explorer® web browser. The user is a member of the Marketing group and the login is authenticated successfully. In step 1903, the user opens a protected document product-plan-2016.pdf in a document repository 705 which is in Adobe® PDF format. The protected document has classifications restricted and product-plan (i.e., matching document.restricted=true and document.productplan=true). The open action on the web browser produces an open request at the secured viewing server. In step 1904, the secured viewing server receives the open request. The secured viewing server collects information related to the open request and the information includes document repository hosting the protected document, file name, document classifications or discretionary policies (if any). In step 1905, the secured viewing server queries a content access governor 706 on the open request providing the information collected.

In step 1906, the content access governor selects a subset of policies from a plurality of policies in a local policy repository relevant to the open request, the user and the protected document. The plurality of policies in the local policy repository is distributed from a policy server 707 (i.e., centralized policies). The content access governor evaluates the subset of policies to determine if the user is allowed to open the protected document. The subset of policies includes a policy Policy-RC-RAS, therefore the user is allowed to view the protected document. In an implementation where a content access governor supports discretionary policies, the content access governor may evaluate additional discretionary policies stored in the protected document to determine if the user is allowed to open the protected document. In an implementation, a policy engine evaluates only centralized policies to produce a policy decision. In another implementation, a policy engine evaluates only discretionary policies to produce a policy decision. Selecting and evaluating centralized policies are not required. In yet another implementation, a policy engine evaluates centralized and discretionary policies to produce a policy decision. The content access governor produces one or more rights granted to the user on the protected document and optional policy obligations. The content access governor returns a policy effect ALLOW, the one or more rights granted and optional policy obligations to the secured viewing server.

In step 1907, the secured viewing server determines the protected document is encrypted and retrieves an encryption key identifier from the protected document. The encryption key identifier uniquely identifies an encryption key in an information management system. An encryption key identifier may be an integer, a string, an object, binary data, or others. The secured viewing server queries the content access governor with the encryption key identifier for an encryption key. The content access governor looks up its encryption key cache for an encryption key matching the encryption key identifier. If one is found, the content access governor returns the encryption key to the secured viewing server. If one is not found, the content access governor queries a key management server 709 with the encryption key identifier. The content access governor caches an encryption key returned by the key management server and returns the encryption key to the secured viewing server. In step 1908, the secured viewing server decrypts the protected document using the encryption key obtained from the content access governor.

In step 1909, the secured viewing server converts the protected document into one or more raster images while implementing the one or more rights granted and optional policy obligations. The secured viewing server renders each page of the protected document into one raster image. A raster image may be store in one of JPEG, GIF or PNG image data format. Alternative, a raster image may represent a portion of the protected document different from a page. The conversion process also observes the one or more rights granted to the user so that contents in the protected document and features of the protected document that the user does not have rights to are not included in the converted document. For example, the content access governor may redact data in the protected document that the user may not have a right to view. An example of a feature of the protected document that the user may not have a right to is showing comments by other users on the protected document. The conversion process may also implement one or more policy obligations when appropriate. If the one or more policy obligations includes a security overlay policy obligation, the secured viewing server may render a semi-transparent text or image pattern specified in the security overlay policy obligation on top of the protected document creating an effect similar to a watermark.

In step 1910, the secured viewing server constructs an HTML document to deliver the one or more raster images while implementing the one or more rights granted and optional policy obligations. The secured viewing server may deliver the converted document in different ways including: incorporating the converted document into the HTML document; incorporating a script in the HTML document and using the script to download content of the converted document and rendering the content of the converted document dynamically in the web browser (e.g., when a user scrolls a web browser window or exposes an area not covered by content sent to a web browser); incorporating a script and the converted document in the HTML document and using the script to render the converted document in a web browser; incorporating a script and a part of the converted document in the HTML document and using the script to download remaining content of the converted document and rendering the content of the converted document dynamically in the web browser; or more. To implement the one or more rights granted to the user, the secured viewing server incorporates HTML or script code that enables a particular web browser feature or function that is consistent with the one or more rights granted. The secured viewing server also incorporates HTML or script code that disables a particular web browser feature or function that is not consistent with the one or more rights granted. In this example, the user is not granted copy or print right to the protected document, therefore the secured viewing server incorporates HTML or script code in the HTML document that disables save and print functions in the web browser. The optional policy obligations may be implemented at the web browser using HTML or script code.

In step 1911, the secured viewing server responses to the open request with the HTML document. In step 1912, the web browser receives the HTML document and loads data and scripts incorporated in the HTML document. Loading scripts in the HTML document also cause some scripts to be executed. The web browser renders the HTML document with the one or more raster images. In step 1913, the user views the protected document successfully.

Figure 20:
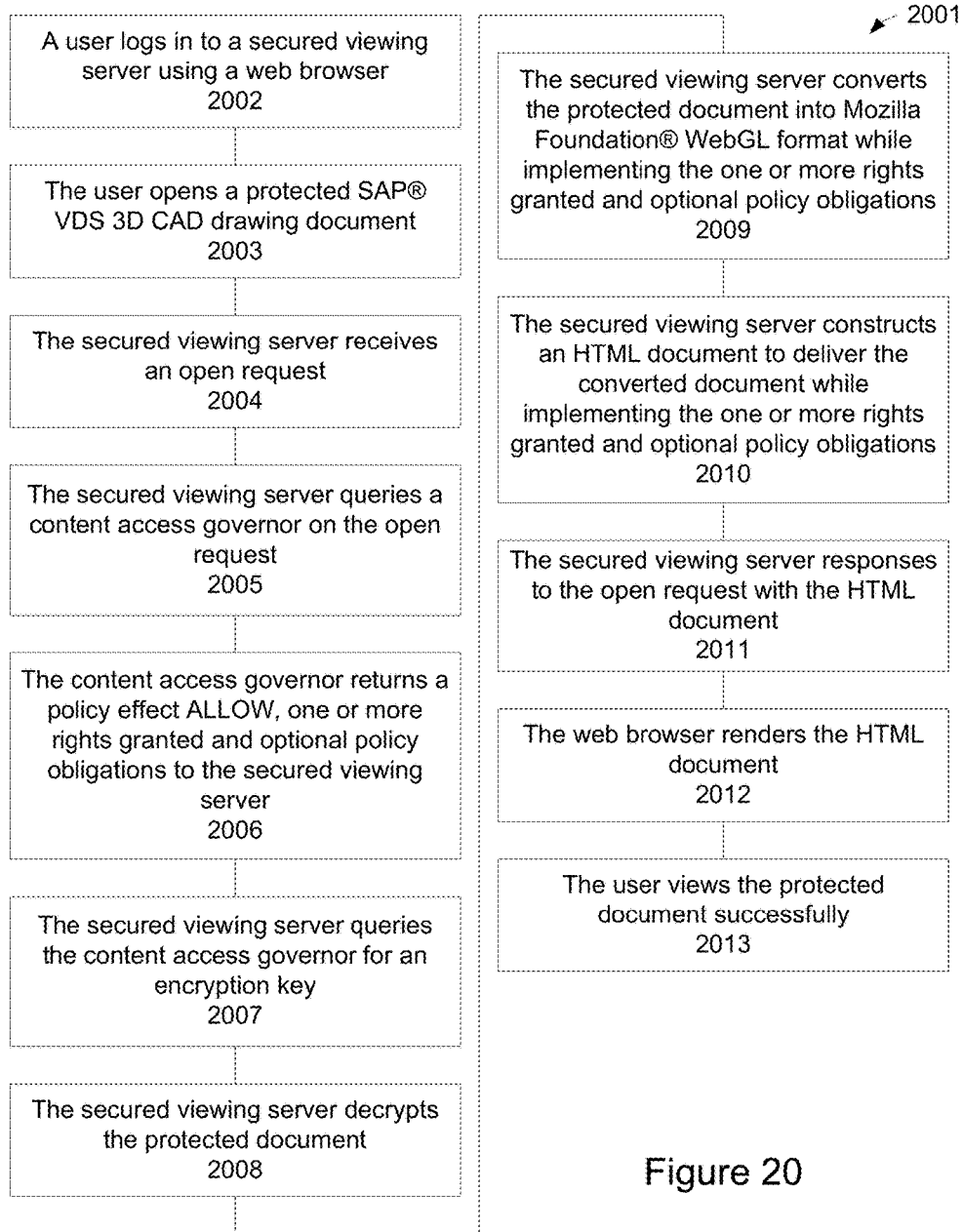
FIG. 20 shows an example flow of viewing a protected document in SAP® VDS 3D CAD data file format on a Web browser where the protected document is delivered to the Web browser in Mozilla Foundation® WebGL format.

In an example, a user views a protected document in a document repository using a web browser Mozilla Foundation Firefox®. The protected document is in SAP® VDS 3D CAD data file format and the document repository is an Amazon S3® cloud storage. The secured viewing server converts the protected document into Mozilla Foundation® WebGL format and constructs a HTML document to deliver the converted document. A rights control policy Policy-RC-WEBGL in this example grants a view right to the user on the protected document. The rights control policy is:
Policy-RC-WEBGL
GRANT VIEW RIGHT
TO USER=Engineering
ON document.top-secret=TRUE AND document.export-control=TRUE Referring to FIG. 20, an example flow 2001 shows a user viewing a protected document on a web browser 702. In step 2002, a user logs in to a secured viewing server 703 using a Mozilla Foundation Firefox® web browser. The user is a member of the Engineering group and the login is authenticated successfully. In step 2003, the user opens a protected document propulsion-stage-1 which is a SAP® VDS 3D CAD drawing in a document repository 705. The protected document has classifications top-secret and export-control (i.e., matching document.top-secret=true or document.export-control=true). The open action on the web browser produces an open request at the secured viewing server. In step 2004, the secured viewing server receives the open request. The secured viewing server collects information related to the open request and the information includes document repository hosting the protected document, file name, document classifications or discretionary policies (if any). In step 2005, the secured viewing server queries a content access governor 706 on the open request providing the information collected.

In step 2006, the content access governor selects a subset of policies from a plurality of policies in a local policy repository relevant to the open request, the user and the protected document. The plurality of policies in the local policy repository is distributed from a policy server 707 (i.e., centralized policies). The content access governor evaluates the subset of policies to determine if the user is allowed to open the protected document. The subset of policies includes a policy Policy-RC-WEBGL, therefore the user is allowed to view the protected document. In an implementation where a content access governor supports discretionary policies, the content access governor may evaluate additional discretionary policies stored in the protected document to determine if the user is allowed to open the protected document. In an implementation, a policy engine evaluates only centralized policies to produce a policy decision. In another implementation, a policy engine evaluates only discretionary policies to produce a policy decision. Selecting and evaluating centralized policies are not required. In yet another implementation, a policy engine evaluates centralized and discretionary policies to produce a policy decision. The content access governor produces one or more rights granted to the user on the protected document and optional policy obligations. The content access governor returns a policy effect ALLOW, the one or more rights granted and optional policy obligations to the secured viewing server.

In step 2007, the secured viewing server determines the protected document is encrypted and retrieves an encryption key identifier from the protected document. The encryption key identifier uniquely identifies an encryption key in an information management system. An encryption key identifier may be an integer, a string, an object, binary data, or others. The secured viewing server queries the content access governor with the encryption key identifier for an encryption key. The content access governor looks up its encryption key cache for an encryption key matching the encryption key identifier. If one is found, the content access governor returns the encryption key to the secured viewing server. If one is not found, the content access governor queries a key management server 709 with the encryption key identifier. The content access governor caches an encryption key returned by the key management server and returns the encryption key to the secured viewing server. In step 2008, the secured viewing server decrypts the protected document using the encryption key obtained from the content access governor.

In step 2009, the secured viewing server converts the protected document into Mozilla Foundation® WebGL format while implementing the one or more rights granted and optional policy obligations. WebGL is a JavaScript API for rendering interactive 3D graphics and 2D graphics in a web browser. The conversion process observes the one or more rights granted to the user so that contents in the protected document and features of the protected document that the user does not have rights to are not included in the converted document. An example of content in the protected document that the user may not have a right to is viewing product and manufacturing information (PMI) in the SAP® VDS 3D CAD drawing. An example of a feature of the protected document that the user may not have a right to is exposing details of a component in a 3D CAD drawing. The conversion process may also implement one or more policy obligations when appropriate.

In step 2010, the secured viewing server constructs an HTML document to deliver the converted document while implementing the one or more rights granted and optional policy obligations. The HTML document includes a WebGL library to assist in rendering the converted document if needed. To implement the one or more rights granted to the user, the secured viewing server incorporates HTML or script code that enables a particular web browser feature or function that is consistent with the one or more rights granted. The secured viewing server also incorporates HTML or script code that disables a particular web browser feature or function that is not consistent with the one or more rights granted. In this example, the user is not granted copy or print right to the protected document, therefore the secured viewing server incorporates HTML or script code in the HTML document that disables save and print functions in the web browser. The optional policy obligations may be implemented at the web browser using HTML or script code.

In step 2011, the secured viewing server responses to the open request with the HTML document. In step 2012, the web browser receives the HTML document and loads data and scripts incorporated in the HTML document. Loading scripts in the HTML document also cause some scripts (i.e., code fragments) to be executed. The web browser renders the HTML document. In step 2013, the user views the protected document successfully.

In an example, a user opens a protected document in a document repository with a rights managed application NextLabs® Rights Management Client for iOS on a computing device Apple iPhone®. The protected document is a Microsoft Excel® spreadsheet and the document repository is Dropbox™ cloud storage. The user selects the protected document from a list of protected documents and opens the protected document in the rights managed application.

Figure 21A:
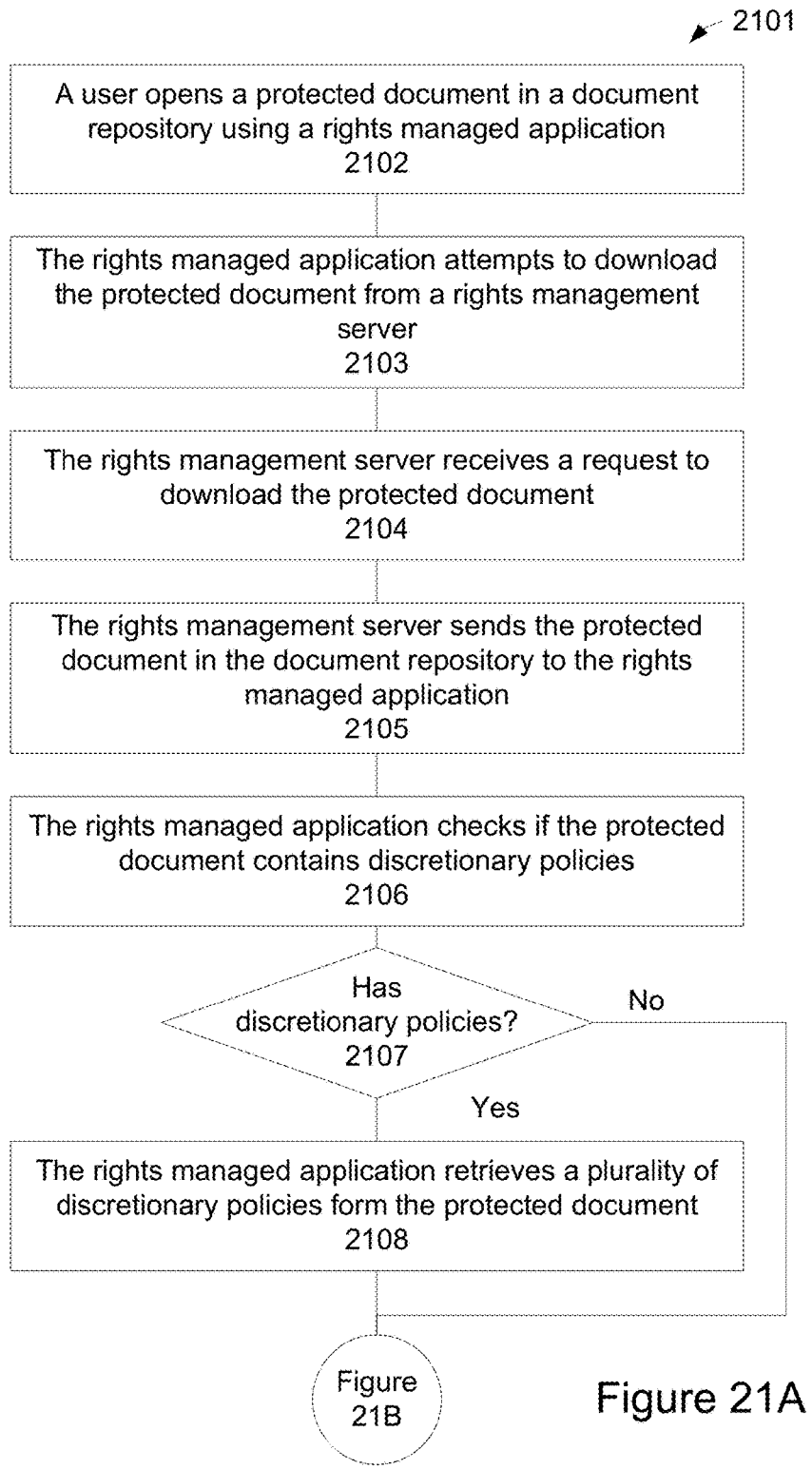
Figure 21B:
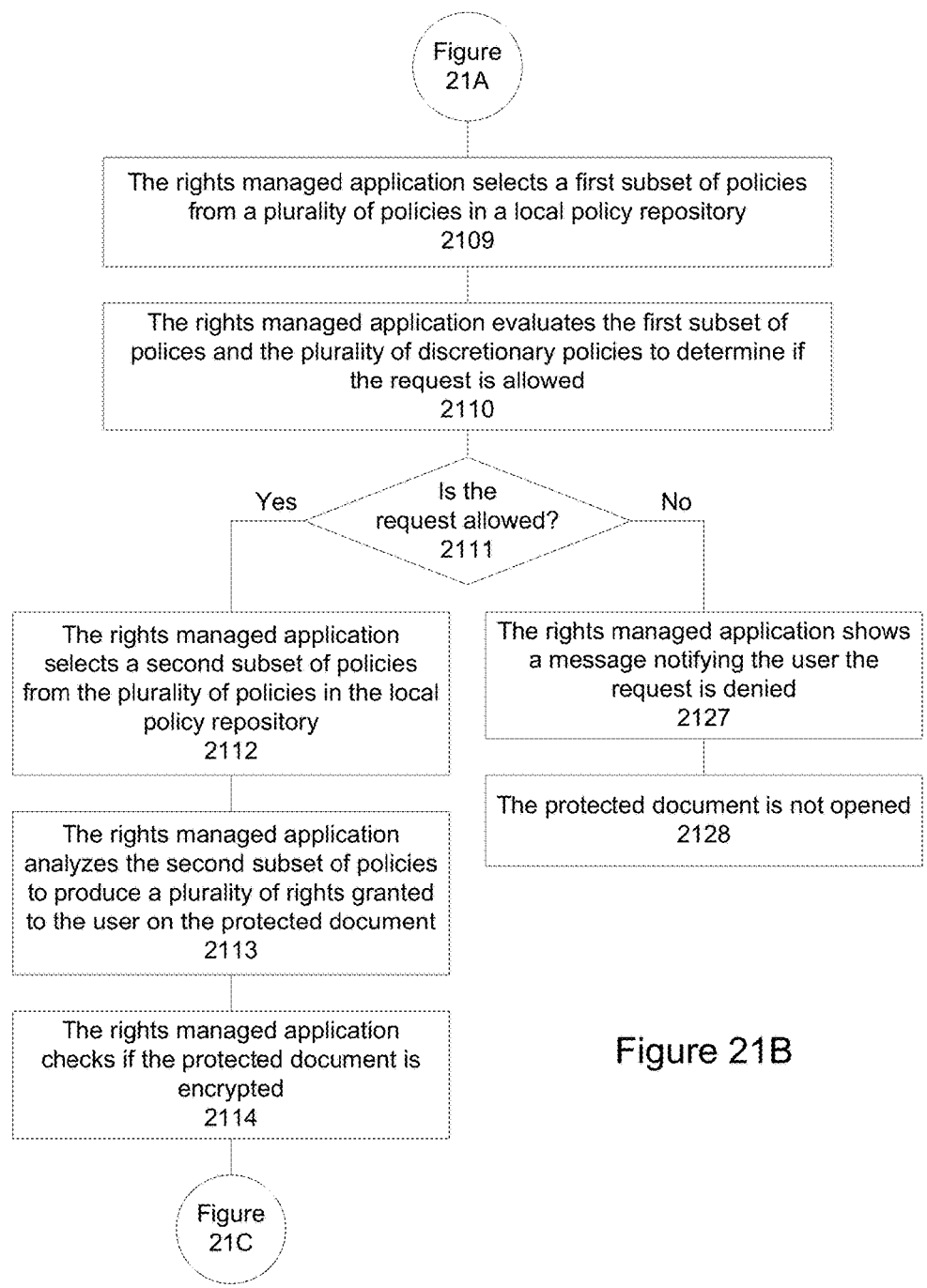

A rights control policy Policy-RC-MOBAPP in this example grants a view right to the user on the protected document. The rights control policy is:
Policy-RC-MOBAPP
GRANT VIEW RIGHT
TO USER=Finance
ON document.confidential=TRUE AND document.salesreport=TRUE Referring to FIGS. 21A-21C, an example flow 2101 shows a user viewing a protected document with a rights managed application 601 and 1102 on a mobile computing device. The user is a member of the Finance group and the rights managed application is a mobile app. In step 2102, a user opens a protected document "2016 Q2 sales report.xlsx" in a document repository 1104 using the rights managed application. The protected document has classifications confidential and sales-report (i.e., matching document.confidential=true and document.salesreport=true). In step 2103, the rights managed application attempts to download the protected document from a rights management server 1103 and 1201 on to the mobile computing device.

In step 2104, the rights management server receives a request from the rights managed application to download the protected document. In step 2105, a repository manager 1202 in the rights management server retrieves the protected document from its cache or from the document repository. If the document repository is a file server, retrieving the protected document may encompass opening the protected document. If the document repository is an application server, retrieving the protected document may encompass copying or downloading the protected document from the application server. If the document repository is a cloud storage, retrieving the protected document may encompass downloading the protected document from the cloud storage. The rights management server sends the protected document to the rights managed application. The rights management server may send the protected document in entirety or in parts to the rights managed application. Sending a protected document in parts to the rights managed application improves initial response time to a user action and allows the rights management server to send the remaining parts of the protected document subsequently.

In an implementation, a rights management server implements access control on download requests and steps 2104 to 2105 are replaced with the following modified steps. In modified step 2104, the rights management server receives a request from the rights managed application to download the protected document. The rights management server queries a content access governor to determine if the user is allowed to open the protected document. The content access governor evaluates a plurality of centralized policies, a plurality of discretionary policies, or a combination of both to determine if the user is allowed to open the protected document. In modified step 2105, if the user is allowed to open the protected document, a repository manager 1202 in the rights management server retrieves the protected document from its cache or from the document repository. The rights management server sends the protected document to the rights managed application. The rights management server may send the protected document in entirety or in parts to the rights managed application. Sending a protected document in parts to the rights managed application improves initial response time to a user action and allows the rights management server to send the remaining parts of the protected document subsequently. If the user is not allowed to open the protected document, the rights management server returns an error status to the rights managed application. In an implementation, the rights management server and the content access governor are separate application programs that run on separate computers. In another implementation, the rights management server and the content access governor are components of an application program.

In another implementation, a rights managed application downloads a protected document from a document repository directly and steps 2103 to 2105 are replaced with the following modified steps. In modified step 2103, the rights managed application downloads the protected document from the document repository on to the mobile computing device. An example of a document repository is Google Drive™. In modified step 2104, the document repository receives a request from the rights managed application to download the protected document. In modified step 2105, the document repository sends the protected document in the document repository to the rights managed application.

In step 2106, the rights managed application checks if the protected document contains discretionary policies. Discretionary policies are typically stored with a protected document. If the protected document contains discretionary policies, processing continues in step 2108 (retrieve discretionary policies). If the protected document does not contain discretionary policies, processing continues in step 2109 (evaluate policies).

In step 2108 (retrieve discretionary policies), the rights managed application retrieves a plurality of discretionary policies form the protected document.

In step 2109 (evaluate policies), the rights managed application selects a first subset of policies from a plurality of policies in a local policy repository relevant to the open operation, the protected document and the user. The plurality of policies in the local policy repository is distributed from a policy server 1106 (i.e., centralized policies) through a policy manager 1204 in the rights management server. In step 2110, the rights managed application evaluates the first subset of policies and the plurality of discretionary policies if there is any to determine if the request is allowed. The first subset of policies includes a policy Policy-RC-MPOBAPP, therefore the request is allowed. Different methods of evaluating centralized policies and discretionary policies are discussed in details further above in this document. The evaluation of the first subset of policies and the plurality of discretionary policies produces a policy effect ALLOW or DENY and optional policy obligations.

In an implementation, a rights managed application evaluates only centralized policies to produce a policy decision. It does not evaluate discretionary policies and steps 2106 to 2108 are not required. Policy evaluation in step 2110 does not include discretionary policies. In another implementation, a rights managed application evaluates only discretionary policies to produce a policy decision. It does not select and evaluate centralized policies from a local policy repository and step 2109 is not required. Policy evaluation in step 2110 does not include centralized policies.

If the request is allowed, processing continues in step 2112 (compose rights granted). If the request is not allowed, processing continues in step 2127 (request is not allowed).

In step 2112 (compose rights granted), the rights managed application selects a second subset of policies from the plurality of policies in the local policy repository relevant to the protected document and the user. In step 2113, the rights managed application analyzes the second subset of policies to produce a plurality of rights granted to the user on the protected document. A rights managed application may implement a method to compose a plurality of rights granted different from that outlined in step 2113 and 2114. Different methods of composing a plurality of rights granted are discussed in details further above in this document. In step 2114, the rights managed application checks if the protected document is encrypted. If the protected document is encrypted, processing continues in step 2116 (decrypt protected document). If the protected document is not encrypted, processing continues in step 2120 (open protected document).

In step 2116 (decrypt protected document), the rights managed application retrieves an encryption key identifier from the protected document. In step 2117, the rights managed application queries the rights management server for an encryption key with the encryption key identifier. If an encryption key associated the encryption key identifier is cached in an encryption manager 1206, the rights management server returns the encryption key from the cache. Otherwise, the encryption manager queries a key management server 1108 with the encryption key identifier for an encryption key. An encryption key returned by the key management server is cached in the encryption manager and the rights management server returns the encryption key to the rights managed application. In step 2118, the rights managed application receives an encryption key associated with the encryption key identifier. In step 2119, the rights managed application decrypts the protected document with the encryption key.

In step 2120 (open protected document), the rights managed application opens the protected document. If the protected document is encrypted, the rights managed application reads the decrypted content of the protected document produced in step 2119.

In step 2121, the rights managed application renders content of the protected document. In step 2122, the rights managed application renders a security overlay over content of the protected document. The security overlay may contain a text string, graphical element, bitmap, or any combination thereof. The security overlay may describe the user, mobile computing device, date, time, protected document, or others. The security overlay may be semi-transparent or opaque.

The security overlay may contain one or more patterns and the one or more patterns may repeat themselves. In an implementation, a security overlay is rendered over content of a protected document thereby blocking content of a protected document if the security overlay is opaque. In another implementation, rendering and content of a security overlay are controlled by a security overlay policy obligation. A security overlay is rendered if a security overlay policy obligation is returned in a policy evaluation step. No security overlay is rendered if a security overlay policy obligation is not returned in a policy evaluation step. A security overlay policy obligation may be specified in a centralized policy or a discretionary policy.

In step 2123, the rights managed application enables features or functionalities of the rights managed application allowed by the plurality of rights granted. For example, if the plurality of rights granted includes a print right, the rights managed application enables printing of the protected document. If the plurality of rights granted includes a copy right, the rights managed application enables saving of the protected document into a different file. If the plurality of rights granted includes a share right, the rights managed application enables sharing of the protected document with another user. In step 2124, the rights managed application implements user interface elements of the rights managed application allowed by the plurality of rights granted. For example, if the plurality of rights granted includes a print right, the rights managed application displays a print menu item or button allowing a user to print the protected document. In step 2125, the rights managed application disables features or functionalities of the rights managed application not allowed by the plurality of rights granted. For example, if the plurality of rights granted does not include a screen capture right, the rights managed application disables screen capture on the rights managed application. In step 2126, the protected document is opened successfully and displayed on the rights managed application.

In step 2127 (request is not allowed), the rights managed application shows a message notifying the user the request is denied. In step 2128, the protected document is not opened.

In an example, a user opens a protected document attached to an email message with a rights managed application NextLabs® Rights Management Client for iOS on a computing device Apple iPhone®. The protected document is an Adobe® PDF file and it is encrypted. The rights managed application retrieves a plurality of discretionary policies from the protected document and send the plurality of discretionary policies to a rights management server to be evaluated. The rights management server evaluates the plurality of discretionary policies and returns a policy effect and a plurality of rights granted to the user on the document.

Figure 22A:
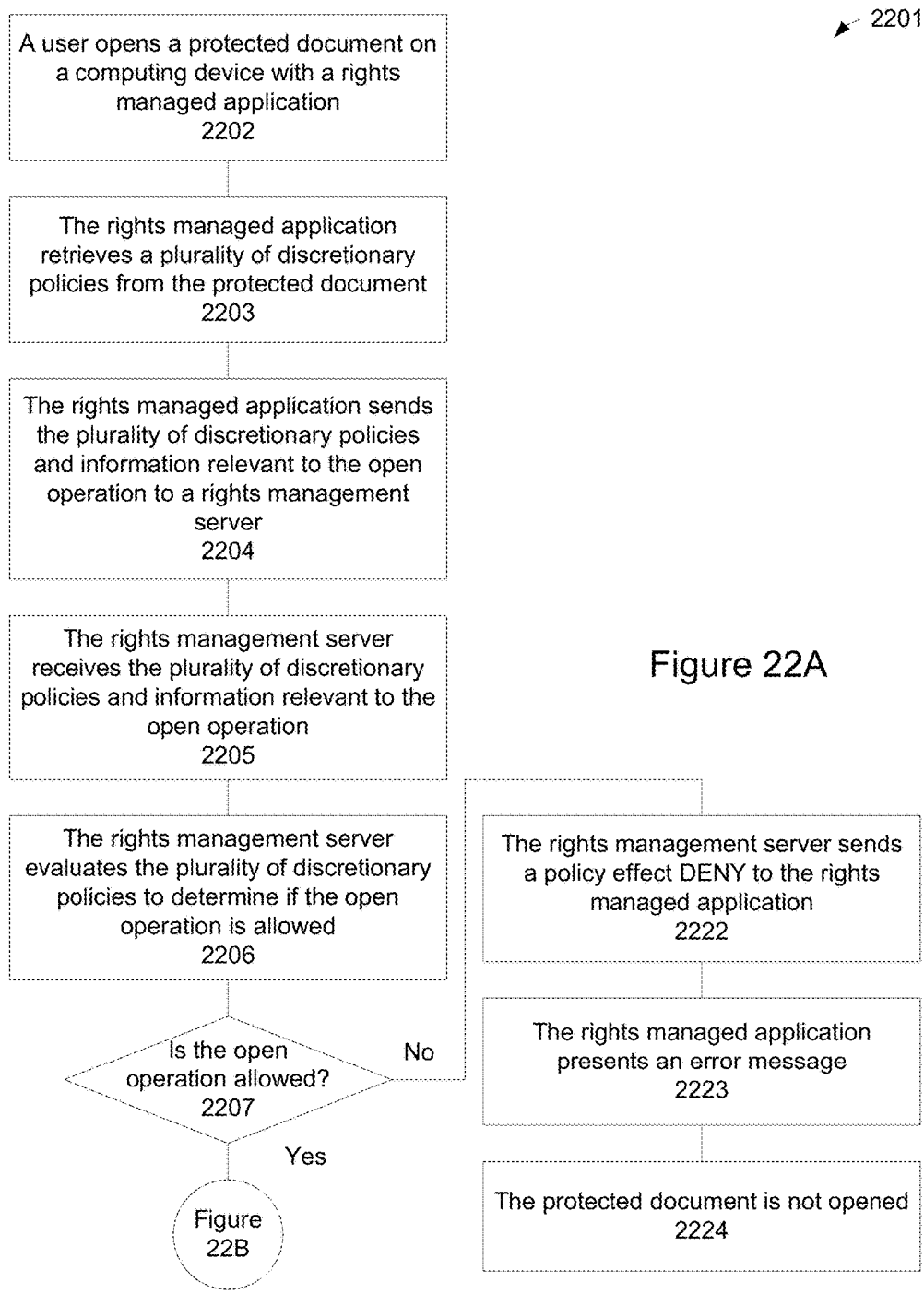
Figure 22C:
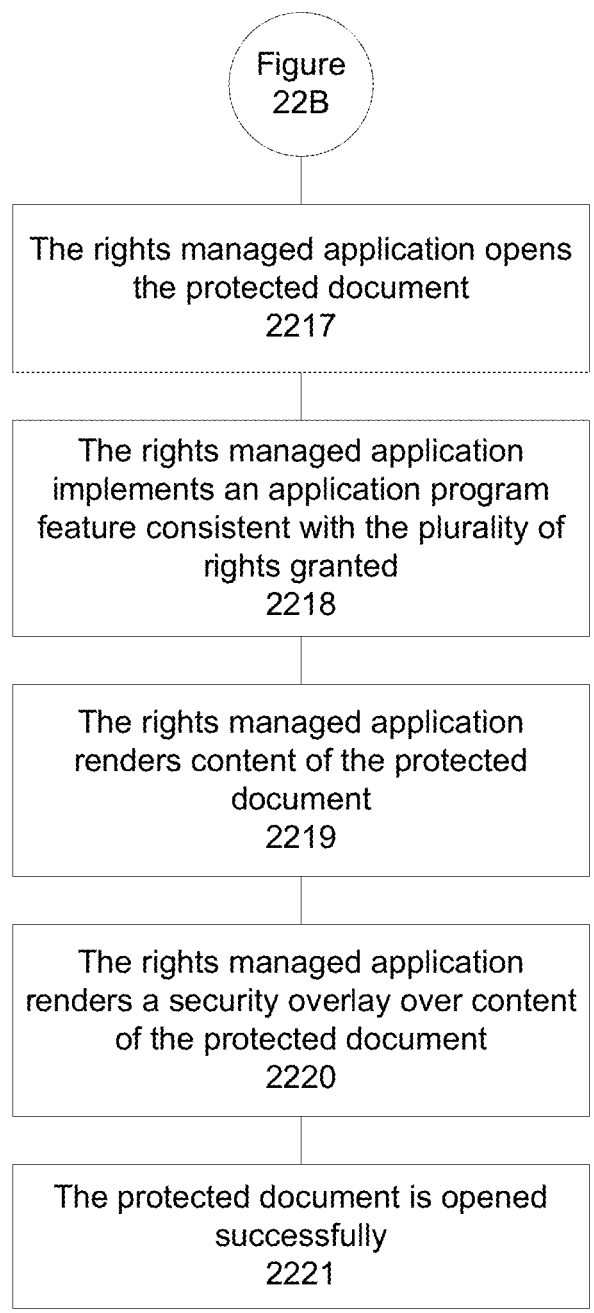
Figure 23A:
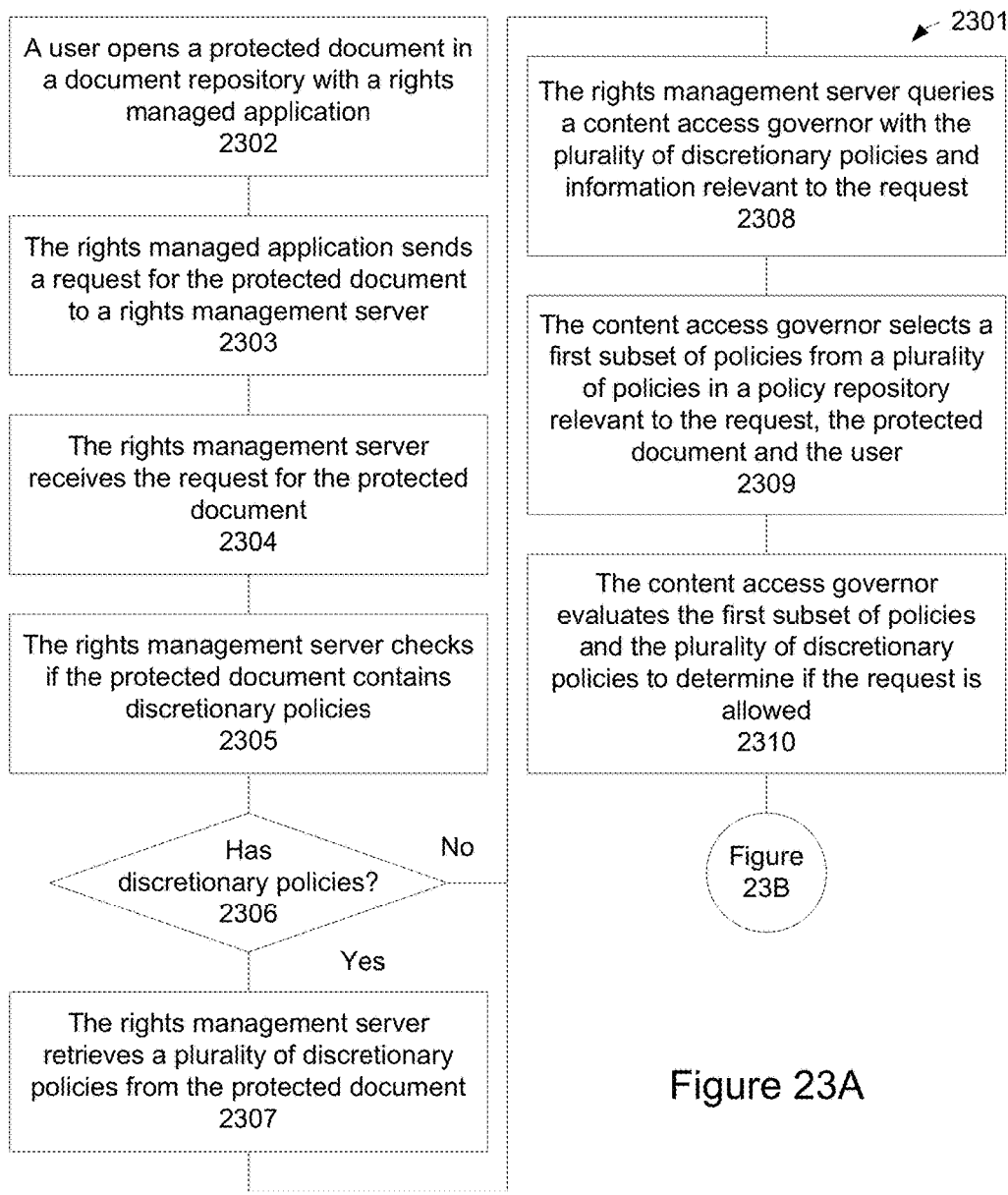
Figure 23B:
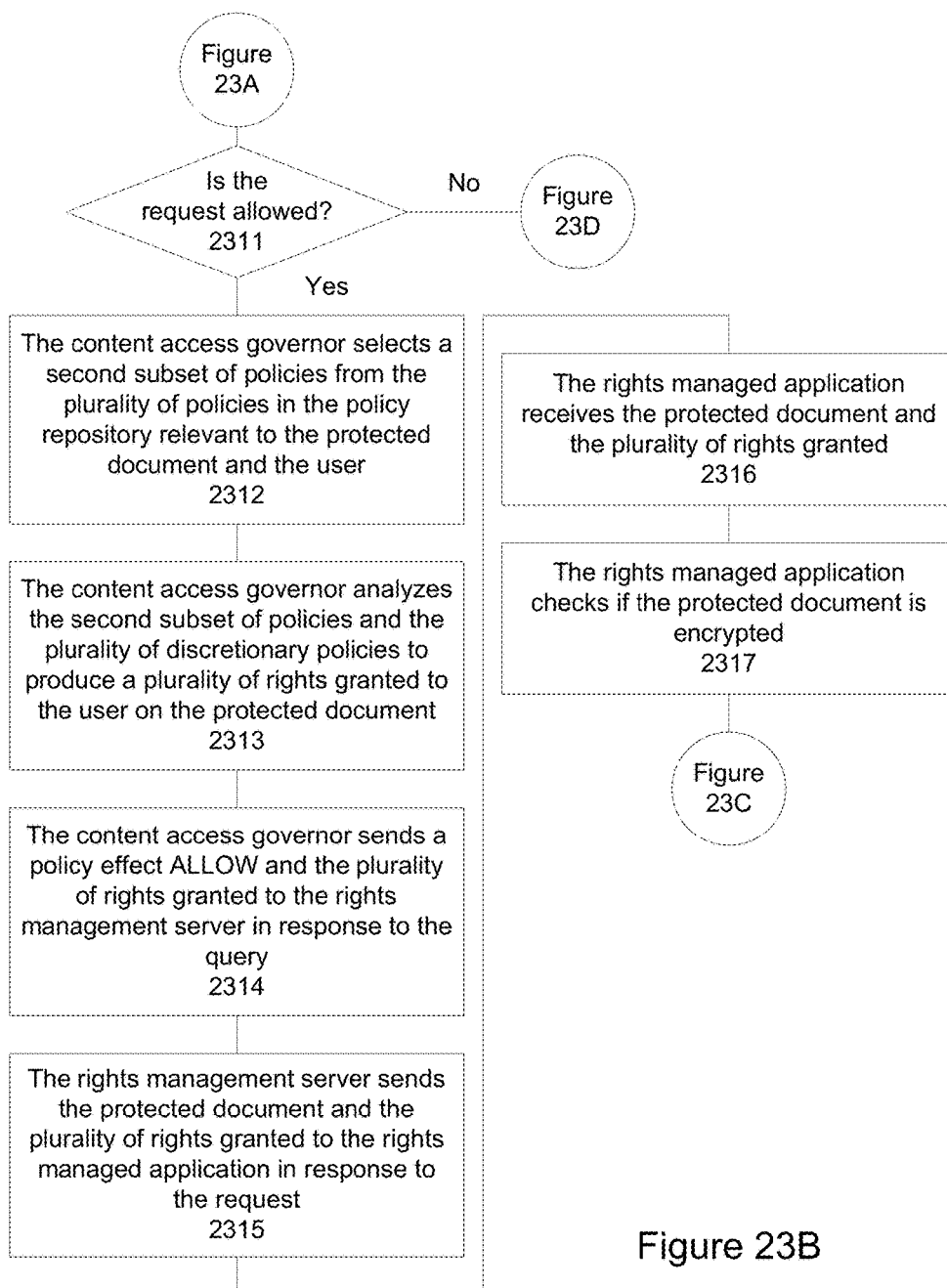
Figure 23D:
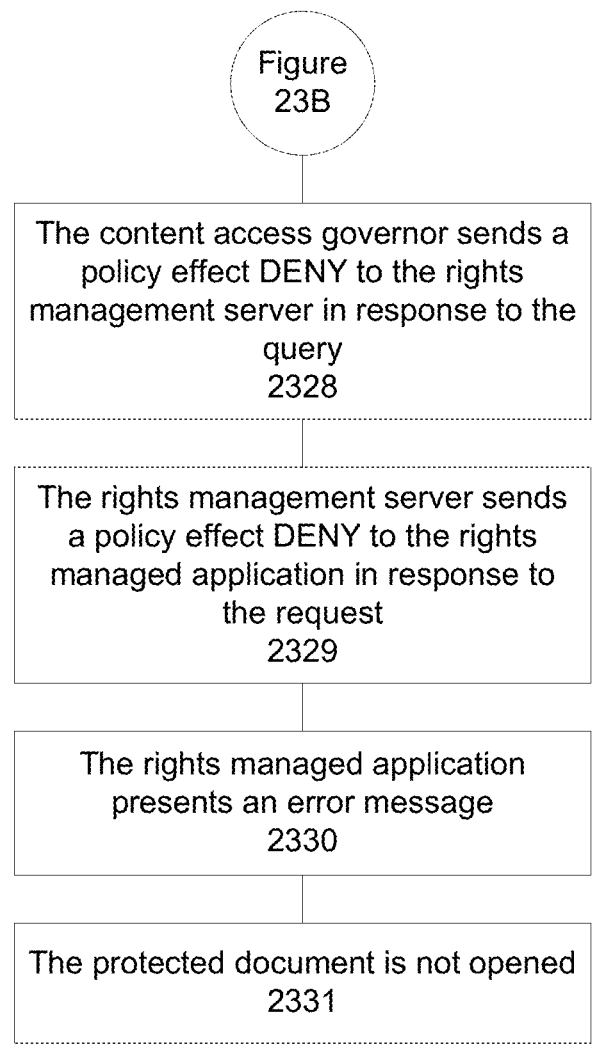

Referring to FIGS. 22A-22C, an example flow 2201 showing a user opening a protected document attached to an email message with a rights managed application 601 and 1102 on a mobile computing device. In step 2202, the user opens the protected document in the email message. The user is viewing the email message with Apple® Mail. The user clicks on the protected document in the email message to show a popup menu. On the popup menu, the user selects the mobile app NextLabs® Rights Management Client for iOS to open the protected document. The user open action produces an open operation in the rights managed application. In step 2203, the rights managed application retrieves a plurality of discretionary policies from the protected document. In step 2204, the rights managed application sends the plurality of discretionary policies and information relevant to the open operation to a rights management server 1103 and 1201. Information relevant to the open operation may include information about the open operation, the protected document and the user.

In step 2205, the rights management server receives the plurality of discretionary policies and information relevant to the open operation. In step 2206, the rights management server evaluates the plurality of discretionary policies to determine if the open operation is allowed. Evaluating the plurality of discretionary policies produces a policy effect ALLOW or DENY and optional policy obligations. In an implementation, a rights management server implements a policy engine 404 of a data protection client 401. Evaluation of the plurality of discretionary policies is performed in the policy engine. In another implementation, a rights management server sends the plurality of discretionary policies and information relevant to the open operation to a content access governor 501. Evaluation of the plurality of discretionary policies is performed in the content access governor. If the open operation is allowed, processing continues in step 2208 (open operation is allowed). If the open operation is not allowed, processing continues in step 2222 (open operation is not allowed).

In step 2208 (open operation is allowed), the rights management server analyzes the plurality of discretionary policies to produce a plurality of rights granted to the user on the protected document. In an implementation where the rights management server implements a policy engine, the analyzes the plurality of discretionary policies is performed in the policy engine. In an implementation where policy evaluation is performed in a content access governor, the analyzes the plurality of discretionary policies is performed in a content access governor. In step 2209, the rights management server sends a policy effect ALLOW and the plurality of rights granted to the rights managed application.

In step 2210, the rights managed application receives the policy effect ALLOW and the plurality of rights granted. In step 2211, the rights managed application checks if the protected document is encrypted. If the protected document is encrypted, processing continues in step 2213 (decrypt protected document). If the protected document is not encrypted, processing continues in step 2217 (open protected document).

In step 2213 (decrypt protected document), the rights managed application retrieves an encryption key identifier from the protected document. In step 2214, the rights managed application queries the rights management server for an encryption key with the encryption key identifier. If an encryption key associated the encryption key identifier is cached in an encryption manager 1206, the rights management server returns the encryption key from the cache. Otherwise, the encryption manager queries a key management server 1108 with the encryption key identifier for an encryption key. An encryption key returned by the key management server is cached in the encryption manager and the rights management server returns the encryption key to the rights managed application. In step 2215, the rights managed application receives an encryption key associated with the encryption key identifier. In step 2216, the rights managed application decrypts the protected document with the encryption key.

In step 2217 (open protected document), the rights managed application opens the protected document. If the protected document is encrypted, the rights managed application reads the decrypted content of the protected document produced in step 2216.

In step 2218, the rights managed application implements an application program feature or functionality consistent with the plurality of rights granted. Implementing an application program feature or functionality consistent with the plurality of rights granted includes: enabling features or functionalities of the rights managed application allowed by the plurality of rights granted; implementing user interface elements of the rights managed application allowed by the plurality of rights granted; disabling features or functionalities of the rights managed application not allowed by the plurality of rights granted; or more. In an example, if the plurality of rights granted includes a print right, the rights managed application enables printing of the protected document. If the plurality of rights granted includes a copy right, the rights managed application enables saving of the protected document into a different file. If the plurality of rights granted includes a share right, the rights managed application enables sharing of the protected document with another user. In another example, if the plurality of rights granted includes a print right, the rights managed application displays a print menu item or button allowing a user to print the protected document. In yet another example, if the plurality of rights granted does not include a screen capture right, the rights managed application disables screen capture on the rights managed application.

In step 2219, the rights managed application renders content of the protected document on the rights managed application. In step 2220, the rights managed application renders a security overlay over content of the protected document. The security overlay may contain a text string, graphical element, bitmap, or any combination thereof. The security overlay may describe the user, mobile computing device, date, time, protected document, or others. The security overlay may be semi-transparent or opaque. The security overlay may contain one or more patterns and the one or more patterns may repeat themselves. In an implementation, a security overlay is rendered over content of a protected document thereby blocking content of a protected document if the security overlay is opaque. In another implementation, rendering and content of a security overlay are controlled by a security overlay policy obligation. A security overlay is rendered if a security overlay policy obligation is returned in a policy evaluation step. No security overlay is rendered if a security overlay policy obligation is not returned in a policy evaluation step. A security overlay policy obligation may be specified in a centralized policy or a discretionary policy. In step 2221, the protected document is opened by the user successfully and displayed on the rights managed application.

In step 2222 (open operation is not allowed), the rights management server sends a policy effect DENY to the rights managed application. In step 2223, the rights managed application presents an error message. In step 2224, the protected document is not opened.

In an example, a user opens a protected document in a document repository with a rights managed application NextLabs® Rights Management Client for iOS on a computing device Apple iPhone®. The protected document is an AutoCAD® 3D drawing and the document repository is Google Drive™ cloud storage. The user selects the protected document from a list of protected documents and opens the protected document in the rights managed application. The rights managed application requests the protected document from a rights management server and access control decision is made at the rights management server or a content access governor. If the user is allowed to open the protected document, the rights management server sends a plurality of rights granted to the user on the protected document to the rights managed application along with the protected document.

A rights control policy Policy-RC-RMS-EVAL in this example grants a view right to the user on the protected document. The rights control policy is:
Policy-RC-RMS-EVAL
GRANT VIEW RIGHT
TO USER=Support-Team
ON document.confidential=TRUE AND document.engineering-document=TRUE Referring to FIGS. 23A-23D, an example flow 2301 shows a user opening a protected document in a rights managed application 601 and 1102 with policy evaluation performed at a rights management server 1103 and 1201. In step 2302, a user opens a protected document in the document repository with a rights managed application. The user is a member of the Support-Team group and the rights managed application is a mobile app. The protected document has classifications confidential and engineering-document (i.e., matching document.confidential=true and document.engineering-document=true). In step 2303, the rights managed application sends a request for the protected document to the rights management server.

In step 2304, the rights management server receives the request for the protected document. In step 2305, the rights management server checks if the protected document contains discretionary policies. If the protected document contains discretionary policies, processing continues in step 2307 (retrieve discretionary policies). If the protected document does not contain discretionary policies, processing continues in step 2308 (evaluate policies).

In step 2307 (retrieve discretionary policies), the rights management server retrieves a plurality of discretionary policies from the protected document.

In step 2308 (evaluate policies), the rights management server queries a content access governor with the plurality of discretionary policies if there is any and information relevant to the request. In step 2309, the content access governor selects a first subset of policies from a plurality of policies in a policy repository relevant to the request, the protected document and the user. The plurality of policies in the local policy repository is distributed from a policy server 1106 (i.e., centralized policies). In step 2310, the content access governor evaluates the first subset of policies and the plurality of discretionary policies if there is any to determine if the request is allowed. The first subset of policies includes a policy Policy-RC-RMS-EVAL, therefore the user is allowed to view the protected document. Different methods of evaluating centralized policies and discretionary policies are discussed in details further above in this document. The evaluation of the first subset of policies and the plurality of discretionary policies produces a policy effect ALLOW or DENY and optional policy obligations. In an implementation, a content access governor evaluates only centralized policies to produce a policy decision. It does not evaluate discretionary policies and steps 2305 to 2307 are not required. Step 2308 queries the content access governor without a plurality of discretionary policies. Policy evaluation in step 2310 does not include discretionary policies. In another implementation, a content access governor evaluates only discretionary policies to produce a policy decision. It does not select or evaluate policies from a local policy repository and step 2309 is not required. Policy evaluation in step 2310 does not include centralized policies.

If the user is allowed to open the protected document, processing continues in step 2312 (compose rights granted). If the user is not allowed to open the protected document, processing continues in step 2328 (open operation is not allowed).

In step 2312 (compose rights granted), the content access governor selects a second subset of policies from the plurality of policies in the policy repository relevant to the protected document and the user. In step 2313, the content access governor analyzes the second subset of policies and the plurality of discretionary policies if there is any to produce a plurality of rights granted to the user on the protected document. A content access governor may implement a method to compose a plurality of rights granted different from that outlined in step 2312 and 2313. Different methods of composing a plurality of rights granted are discussed in details further above in this document. In step 2314, the content access governor sends a policy effect ALLOW and the plurality of rights granted to the rights management server in response to the query. In step 2315, the rights management server sends the protected document and the plurality of rights granted to the rights managed application in response to the request.

In step 2316, the rights managed application receives the protected document and the plurality of rights granted. In step 2317, the rights managed application checks if the protected document is encrypted. If the protected document is encrypted, processing continues in step 2319 (decrypt protected document). If the protected document is not encrypted, processing continues in step 2323 (open protected document).

In step 2319 (decrypt protected document), the rights managed application retrieves an encryption key identifier from the protected document. In step 2320, the rights managed application queries the rights management server for an encryption key with the encryption key identifier. If an encryption key associated the encryption key identifier is cached in an encryption manager 1206, the rights management server returns the encryption key from the cache. Otherwise, the encryption manager queries a key management server 1108 with the encryption key identifier for an encryption key. An encryption key returned by the key management server is cached in the encryption manager and the rights management server returns the encryption key to the rights managed application. In step 2321, the rights managed application receives an encryption key associated with the encryption key identifier. In step 2322, the rights managed application decrypts the protected document with the encryption key.

In step 2323 (open protected document), the rights managed application opens the protected document in the rights managed application. If the protected document is encrypted, the rights managed application reads the decrypted content of the protected document produced in step 2322.

In step 2324, the rights managed application implements an application program feature or functionality consistent with the plurality of rights granted. Implementing an application program feature or functionality consistent with the plurality of rights granted includes: enabling features or functionalities of the rights managed application allowed by the plurality of rights granted; implementing user interface elements of the rights managed application allowed by the plurality of rights granted; disabling features or functionalities of the rights managed application not allowed by the plurality of rights granted; or more. In an example, if the plurality of rights granted includes a print right, the rights managed application enables printing of the protected document. If the plurality of rights granted includes a copy right, the rights managed application enables saving of the protected document into a different file. If the plurality of rights granted includes a share right, the rights managed application enables sharing of the protected document with another user. In another example, if the plurality of rights granted includes a print right, the rights managed application displays a print menu item or button allowing a user to print the protected document. In yet another example, if the plurality of rights granted does not include a screen capture right, the rights managed application disables screen capture on the rights managed application.

In step 2325, the rights managed application renders content of the protected document on the rights managed application. In step 2326, the rights managed application renders a security overlay over content of the protected document. The security overlay may contain a text string, graphical element, bitmap, or any combination thereof. The security overlay may describe the user, mobile computing device, date, time, protected document, or others. The security overlay may be semi-transparent or opaque. The security overlay may contain one or more patterns and the one or more patterns may repeat themselves. In an implementation, a security overlay is rendered over content of a protected document thereby blocking content of a protected document if the security overlay is opaque. In another implementation, rendering and content of a security overlay are controlled by a security overlay policy obligation. A security overlay is rendered if a security overlay policy obligation is returned in a policy evaluation step. No security overlay is rendered if a security overlay policy obligation is not returned in a policy evaluation step. A security overlay policy obligation may be specified in a centralized policy or a discretionary policy. In step 2327, the protected document is opened successfully and display on the rights managed application.

In step 2328 (open operation is not allowed), the content access governor sends a policy effect DENY to the rights management server in response to the query. In step 2329, the rights management server sends a policy effect DENY to the rights managed application in response to the request. In step 2330, the rights managed application presents an error message. In step 2331, the protected document is not opened.

In an implementation, the rights management server and the content access governor are separate application programs that run on separate computers. In another implementation, the rights management server and the content access governor are components of an application program.

In an example, a rights managed application requests policy updates from a policy server when the rights managed application starts. The rights managed application runs on a mobile computing device. The rights managed application is a mobile app NextLabs® Rights Management Client for iOS and the mobile computing device is an Apple iPhone®. The rights managed application connects to a rights management server to obtain policy updates. A policy manager of the rights management server forwards a policy update request to a policy server. When the policy server returns a first plurality of policies to the policy manager, the policy manager translates the first plurality of policies in a first policy syntax into a second plurality of policies in a second policy syntax used by the rights managed application. The rights management server sends the second plurality of policies to the rights managed application in response to the request.

Figure 24:
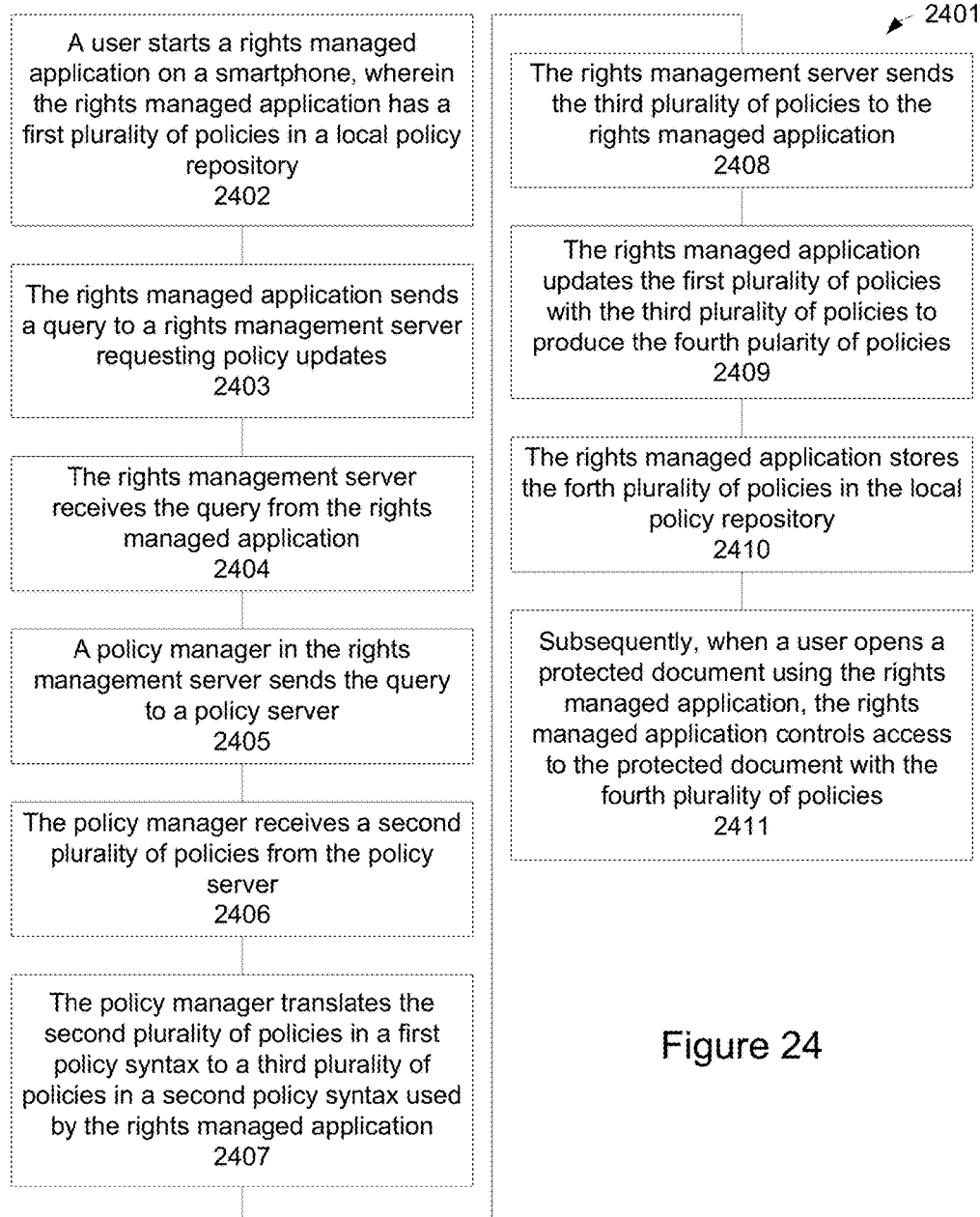
FIG. 24 shows an example flow of a rights management server providing policy updates to a rights managed application.

Referring to FIG. 24, an example flow 2401 shows a rights management server 1103 and 1201 providing policy updates to a rights managed application 1102. In step 2402, a user starts a rights managed application on a smartphone. When the rights managed application starts, it attempts to update a first plurality of policies stored in a local policy repository if a connection to the rights management server may be established. If a connection is not established, the rights managed application will try to establish a connection to a rights management server at a later time to request policy updates. In step 2403, the rights managed application sends a query to a rights management server requesting policy updates.

In step 2404, the rights management server receives the query from the rights managed application. The query is handled by a policy manager 1204 in the rights management server. In step 2405, the policy manager sends the query to a policy server 1106. If the rights managed application and the rights management server communicates in a communication protocol that is different from that used by the rights management server and the policy server, the policy manager translates the query before sending it to the policy server. In step 2406, the policy manager receives a second plurality of policies from the policy server.

In step 2407, the policy manager translates the second plurality of policies in a first policy syntax to a third plurality of policies in a second policy syntax used by the rights managed application. In an example, the first policy syntax includes features that are not supported by the rights managed application and therefore not specified in the second policy syntax. The policy manager removes the features not specified in the second policy syntax while translating the second plurality of policies to the third plurality of policies. In another example, the second plurality of policies specifies rights that are not supported by the rights managed application. The policy manager removes the rights while translating the second plurality of policies to the third plurality of policies. In yet another example, the second plurality of policies specifies information or documents that are not supported by the rights managed application. The policy manager removes the information or documents while translating the second plurality of policies to the third plurality of policies. In yet another example, the second plurality of policies specifies information or documents that may not be reached by the rights managed application. The policy manager removes the information or documents while translating the second plurality of policies to the third plurality of policies.

In step 2408, the rights management server sends the third plurality of policies to the rights managed application. In step 2409, the rights managed application updates the first plurality of policies with the third plurality of policies to produce the fourth plurality of policies. Updating the first plurality of policies may include modifying an existing policy, adding a new policy or removing an existing policy. In step 2410, the rights managed application stores the fourth plurality of policies in the local policy repository.

In step 2411, subsequently, when a user opens a protected document using the rights managed application, the rights managed application controls access to the protected document with the fourth plurality of policies.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   providing a document repository having a plurality of protected documents;
   providing a content access governor having a plurality of policies;
   providing a secured viewing server having access to the content access governor and the document repository;
   connecting to the secured viewing server via a web browser;
   at the web browser, opening a protected document in the document repository by a user;
   at the secured viewing server, receiving a request to open the protected document;
   at the secured viewing server, obtaining a decision on whether the request is allowed from the content access governor;
   at the secured viewing server, if the request is allowed, obtaining a plurality of rights granted to the user on the protected document from the content access governor;
   at the secured viewing server, if the request is allowed, converting the protected document into a converted document that is in a format suitable for display in the web browser;
   at the secured viewing server, if the request is allowed, constructing a code fragment to modify a web browser feature, wherein modifying the web browser feature implements in part the plurality of rights granted to the user on the protected document and comprises:
   at the secured viewing server, determining, based on the plurality of rights, one or more web browser features corresponding to the plurality of rights; and
   at the secured viewing server, constructing the code fragment based on the plurality of rights to be granted at the web browser;
   at the secured viewing server, if the request is allowed, constructing an HTML document to deliver the converted document and the code fragment to the web browser;
   at the secured viewing server, if the request is allowed, sending the HTML document to the web browser in response to the request;
   at the web browser, if the request is allowed, loading the HTML document to display content of the protected document in the web browser, wherein loading the HTML document implements the plurality of rights granted to the user on the protected document, the implemented plurality of rights is based at least in part on executing the constructed code fragment, and the user opens the protected document successfully;
   at the secured viewing server, if the request is not allowed, sending a response to the web browser indicating that the user is not allowed to open the protected document; and
   at the web browser, if the request is not allowed, rendering the response in the web browser, wherein the user failed to open the protected document.

2. The method of claim 1 wherein the document repository is a file server.

3. The method of claim 1 wherein the document repository is an application server.

4. The method of claim 1 wherein the document repository is a cloud storage.

5. The method of claim 1 wherein the plurality of policies controls access to the plurality of protected documents.

6. The method of claim 1 wherein the plurality of policies controls uses of contents of the plurality of protected documents.

7. The method of claim 1 wherein the plurality of policies is provided by a policy server.

8. The method of claim 1 wherein the secured viewing server accepts an HTTPS request from a web browser.

9. The method of claim 1 wherein the document repository, the content access governor and the secured viewing server run on a computer.

10. The method of claim 1 wherein the document repository, the content access governor and the secured viewing server run on separate computers.

11. The method of claim 1 wherein the content access governor and the secured viewing server are components of an application program.

12. The method of claim 1 wherein the web browser connects to the secured viewing server using HTTPS protocol.

13. The method of claim 1 wherein the protected document is encrypted.

14. The method of claim 1 wherein the protected document is not encrypted.

15. The method of claim 1 wherein the at the web browser, opening a protected document in the document repository by a user further comprising:
   clicking on a hypertext link on a web page, wherein the hypertext link refers to the protected document.

16. The method of claim 1 wherein the at the secured viewing server, obtaining a decision on whether the request is allowed from the content access governor further comprising:
   at the secured viewing server, sending a query to the content access governor with information relevant to the request, wherein the information relevant to the request comprises at least information about the request, the protected document, and the user;
   at the content access governor, selecting a subset of policies from the plurality of policies relevant to the request, the protected document and the user;
   at the content access governor, evaluating the subset of policies to produce a decision on whether the request is allowed; and
   at the content access governor, sending the decision to the secured viewing server in response to the query.

17. The method of claim 1 wherein the at the secured viewing server, obtaining a decision on whether the request is allowed from the content access governor further comprising:
   at the secured viewing server, retrieving a plurality of discretionary policies from the protected document;
   at the secured viewing server, sending a query to the content access governor with the plurality of discretionary policies and information relevant to the request, wherein the information relevant to the request comprises at least information about the request and the user;
   at the content access governor, evaluating the plurality of discretionary policies to produce a decision on whether the request is allowed; and
   at the content access governor, sending the decision to the secured viewing server in response to the query.

18. The method of claim 1 wherein the at the secured viewing server, obtaining a decision on whether the request is allowed from the content access governor further comprising:

at the secured viewing server, sending a query to the content access governor with information relevant to the request, wherein the information relevant to the request comprises at least information about the request, the protected document, and the user;

at the content access governor, retrieving a plurality of discretionary policies from the protected document;

at the content access governor, evaluating the plurality of discretionary policies to produce a decision on whether the request is allowed; and at the content access governor, sending the decision to the secured viewing server in response to the query.

19. The method of claim 1 wherein the at the secured viewing server, obtaining a decision on whether the request is allowed from the content access governor further comprising:

at the secured viewing server, retrieving a plurality of discretionary policies from the protected document;

at the secured viewing server, sending a query to the content access governor with the plurality of discretionary policies and information relevant to the request, wherein the information relevant to the request comprises at least information about the request, the protected document, and the user;

at the content access governor, selecting a subset of policies from the plurality of policies relevant to the request, the protected document and the user;

at the content access governor, evaluating the subset of policies and the plurality of discretionary policies to produce a decision on whether the request is allowed; and at the content access governor, sending the decision to the secured viewing server in response to the query.

20. The method of claim 1 wherein the at the secured viewing server, obtaining a decision on whether the request is allowed from the content access governor further comprising:

at the secured viewing server, sending a query to the content access governor with information relevant to the request, wherein the information relevant to the request comprises at least information about the request, the protected document, and the user;

at the content access governor, retrieving a plurality of discretionary policies from the protected document;

at the content access governor, selecting a subset of policies from the plurality of policies relevant to the request, the protected document, and the user;

at the content access governor, evaluating the subset of policies and the plurality of discretionary policies to produce a decision on whether the request is allowed; and at the content access governor, sending the decision to the secured viewing server in response to the query.

21. The method of claim 1 wherein the code fragment constructed at the secured viewing server comprises executable instructions at the web browser.

22. The method of claim 1 wherein the code fragment comprises a script incorporated with the HTML document and loaded onto the web browser.

23. The method of claim 22 wherein the code fragment causes disabling of a feature of the web browser.

24. The method of claim 23 wherein the feature comprises a save feature.

25. The method of claim 23 wherein the feature comprises a print feature.

26. The method of claim 1 wherein the code fragment comprises HTML.

27. The method of claim 1 wherein the code fragment comprises JavaScript.

* * * * *